US012403480B2

(12) United States Patent
Curry et al.

(10) Patent No.: US 12,403,480 B2
(45) Date of Patent: *Sep. 2, 2025

(54) METHOD FOR DISPENSING FLUID

(71) Applicant: BIOTIX, INC., San Diego, CA (US)

(72) Inventors: Scott E. Curry, Carlsbad, CA (US); Arta Motadel, San Diego, CA (US); Peter Paul Blaszcak, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,404

(22) Filed: Jun. 12, 2024

(65) Prior Publication Data

US 2024/0326060 A1 Oct. 3, 2024

Related U.S. Application Data

(63) Continuation of application No. 17/326,089, filed on May 20, 2021, now Pat. No. 12,011,721, which is a continuation of application No. 16/899,466, filed on Jun. 11, 2020, now Pat. No. 11,040,351, which is a continuation of application No. 15/543,224, filed as application No. PCT/US2015/064784 on Dec. 9, (Continued)

(51) Int. Cl.
*B01L 9/00* (2006.01)
*B01L 3/02* (2006.01)

(52) U.S. Cl.
CPC ............. *B01L 9/543* (2013.01); *B01L 3/0275* (2013.01); *B01L 2200/028* (2013.01); *B01L 2200/12* (2013.01); *B01L 2200/141* (2013.01); *B01L 2300/0829* (2013.01)

(58) Field of Classification Search
None
See application file for complete search history.

(56) References Cited

U.S. PATENT DOCUMENTS

D246,466 S 11/1977 Attree et al.
4,087,248 A 5/1978 Miles
(Continued)

FOREIGN PATENT DOCUMENTS

CN 1280671 A 1/2001
CN 1642651 A 7/2005
(Continued)

OTHER PUBLICATIONS

Office Action dated Oct. 21, 2019 in U.S. Appl. No. 29/684,691, filed Mar. 22, 2019, 5 pages.
(Continued)

*Primary Examiner* — Brian R Gordon
(74) *Attorney, Agent, or Firm* — Standley Law Group LLP; Jeffrey S. Standley; Adam J. Smith

(57) ABSTRACT

Provided in part herein are static-defeating apparatus for use in multipipettor systems. Multiple pipette tips can be retained by a static-defeating sheet of material. A multipipettor, having multiple pipettes or nozzles, can engage the pipette tips retained by the sheet. After use, the multipipettor can eject the pipette tips, which sometimes are ejected as a single unit due to the pipette tips being retained by the sheet. In certain embodiments, an apparatus includes a snap plate having one or more holes, and a base rack for ease of mounting.

12 Claims, 58 Drawing Sheets

Related U.S. Application Data

2015, now Pat. No. 10,730,053, which is a continuation-in-part of application No. 14/712,451, filed on May 14, 2015, now Pat. No. 10,137,453, which is a continuation-in-part of application No. 14/566,143, filed on Dec. 10, 2014, now abandoned.

(56) References Cited

U.S. PATENT DOCUMENTS

| | | | | |
|---|---|---|---|---|
| 4,130,978 | A | 12/1978 | Cohen | |
| D264,810 | S | 6/1982 | Voltmann | |
| 4,349,109 | A | 9/1982 | Scordato et al. | |
| D271,239 | S | 11/1983 | Lemieux et al. | |
| 4,511,534 | A | 4/1985 | Bennett et al. | |
| D282,208 | S | 1/1986 | Lowry | |
| D283,162 | S | 3/1986 | Godsey | |
| 4,577,760 | A | 3/1986 | Rainin et al. | |
| 4,676,377 | A | 6/1987 | Rainin et al. | |
| 5,000,921 | A | 3/1991 | Hanaway et al. | |
| 5,156,811 | A | 10/1992 | White | |
| D332,145 | S | 12/1992 | Wada et al. | |
| D332,664 | S | 1/1993 | Sincock | |
| D337,165 | S | 7/1993 | Malinoff | |
| 5,255,979 | A | 10/1993 | Ferrari | |
| 5,324,482 | A | 6/1994 | Scaramella et al. | |
| 5,366,088 | A | 11/1994 | Hill et al. | |
| 5,392,914 | A | 2/1995 | Lemieux et al. | |
| 5,441,702 | A | 8/1995 | Lemieux et al. | |
| 5,487,872 | A | 1/1996 | Hafeman et al. | |
| 5,487,997 | A | 1/1996 | Stolp | |
| D369,415 | S | 4/1996 | Boulton et al. | |
| 5,612,000 | A | 3/1997 | Lemieux | |
| 5,630,988 | A * | 5/1997 | Stolp | B01L 9/543 422/526 |
| 5,779,984 | A | 7/1998 | Kelly et al. | |
| 5,882,603 | A | 3/1999 | Taggart | |
| D411,308 | S | 6/1999 | Pandey et al. | |
| D414,271 | S | 9/1999 | Mendoza | |
| 6,007,779 | A | 12/1999 | Lemieux et al. | |
| D420,142 | S | 2/2000 | Ballin et al. | |
| D420,743 | S | 2/2000 | Monks | |
| 6,019,225 | A | 2/2000 | Kalmakis et al. | |
| 6,164,449 | A | 12/2000 | Lahti | |
| 6,182,719 | B1 * | 2/2001 | Yahiro | G01N 35/1074 422/526 |
| D439,673 | S | 3/2001 | Brophy et al. | |
| D441,091 | S | 4/2001 | Day | |
| 6,238,626 | B1 | 5/2001 | Higuchi et al. | |
| 6,286,678 | B1 | 9/2001 | Petrek | |
| D448,854 | S | 10/2001 | Kuiper et al. | |
| D452,740 | S | 1/2002 | Brennan et al. | |
| 6,358,470 | B1 * | 3/2002 | Higuchi | B01L 9/543 422/63 |
| 6,419,086 | B1 | 7/2002 | Vecchio | |
| 6,426,047 | B1 | 7/2002 | Hamel et al. | |
| D461,554 | S | 8/2002 | Lafond et al. | |
| D464,734 | S | 10/2002 | Berna et al. | |
| D466,219 | S | 11/2002 | Wynschenk et al. | |
| 6,517,782 | B1 | 2/2003 | Horner et al. | |
| 6,534,015 | B1 | 3/2003 | Viot et al. | |
| 6,706,244 | B1 | 3/2004 | Holden et al. | |
| 6,805,840 | B1 | 10/2004 | Tajima | |
| 6,875,405 | B1 | 4/2005 | Mathus et al. | |
| 7,060,226 | B1 | 6/2006 | Jessop et al. | |
| D529,622 | S | 10/2006 | Hadjis et al. | |
| D533,948 | S | 12/2006 | Schaub et al. | |
| D534,658 | S | 1/2007 | Bargh | |
| 7,169,361 | B2 | 1/2007 | Arnold et al. | |
| 7,187,286 | B2 | 3/2007 | Morris et al. | |
| 7,220,590 | B2 | 5/2007 | Moritz et al. | |
| D556,338 | S | 11/2007 | Coulling et al. | |
| D556,339 | S | 11/2007 | Coulling et al. | |
| D562,463 | S | 2/2008 | Berndt et al. | |
| 7,335,337 | B1 | 2/2008 | Smith | |
| D574,505 | S | 8/2008 | Muller-Cohn et al. | |

| | | | | |
|---|---|---|---|---|
| D576,208 | S | 9/2008 | Quercetti | |
| 7,459,128 | B2 | 12/2008 | Karg et al. | |
| D593,207 | S | 5/2009 | Ayliffe | |
| D598,566 | S | 8/2009 | Allaer | |
| 7,628,960 | B2 | 12/2009 | Ruddock | |
| D608,013 | S | 1/2010 | Coulling et al. | |
| D632,404 | S | 2/2011 | Karpiloff | |
| D632,803 | S | 2/2011 | Motadel et al. | |
| 7,906,075 | B2 | 3/2011 | Ueda et al. | |
| 7,968,056 | B2 | 6/2011 | Stockwell | |
| 8,088,593 | B2 | 1/2012 | Burd et al. | |
| D654,186 | S | 2/2012 | Park et al. | |
| D657,473 | S | 4/2012 | Miyashita et al. | |
| 8,148,168 | B2 | 4/2012 | Gjerde et al. | |
| 8,292,117 | B2 | 10/2012 | Guibert et al. | |
| D673,294 | S | 12/2012 | Motadel | |
| D673,296 | S | 12/2012 | Fry et al. | |
| D675,748 | S | 2/2013 | Hilligoss et al. | |
| D677,400 | S | 3/2013 | Bucher et al. | |
| D679,025 | S | 3/2013 | Motadel et al. | |
| D679,830 | S | 4/2013 | May et al. | |
| 8,453,838 | B2 | 6/2013 | Hill et al. | |
| 8,460,622 | B2 | 6/2013 | Motadel et al. | |
| 8,470,265 | B2 | 6/2013 | Curry et al. | |
| D690,027 | S | 9/2013 | Motadel | |
| 8,590,736 | B2 | 11/2013 | Motadel et al. | |
| D697,227 | S | 1/2014 | Motadel | |
| D699,370 | S | 2/2014 | Motadel et al. | |
| D699,371 | S | 2/2014 | Williams et al. | |
| D699,859 | S | 2/2014 | Motadel | |
| D702,854 | S | 4/2014 | Kakuda et al. | |
| D707,847 | S | 6/2014 | Motadel et al. | |
| D709,718 | S | 7/2014 | Snyder | |
| 8,790,578 | B2 | 7/2014 | Sigal et al. | |
| 8,795,606 | B2 | 8/2014 | Blaszcak et al. | |
| 8,798,606 | B2 | 8/2014 | Day et al. | |
| D724,236 | S | 3/2015 | Motadel et al. | |
| 9,089,845 | B2 | 7/2015 | Motadel et al. | |
| 9,108,201 | B2 | 8/2015 | Motadel et al. | |
| D745,698 | S | 12/2015 | Hage et al. | |
| 9,238,227 | B2 | 1/2016 | Motadel et al. | |
| 9,302,262 | B2 | 4/2016 | Motadel et al. | |
| 9,464,739 | B2 | 10/2016 | Chiang et al. | |
| 9,511,364 | B2 | 12/2016 | Andersin | |
| 9,579,656 | B2 | 2/2017 | Finneran | |
| 9,623,171 | B2 | 4/2017 | Okihara et al. | |
| D804,050 | S | 11/2017 | Coulling et al. | |
| 9,878,330 | B2 | 1/2018 | Motadel et al. | |
| D815,753 | S | 4/2018 | Curry et al. | |
| D824,535 | S | 7/2018 | Curry et al. | |
| D833,031 | S | 11/2018 | Curry et al. | |
| 10,137,453 | B2 | 11/2018 | Curry et al. | |
| D839,445 | S | 1/2019 | Motadel et al. | |
| 10,258,992 | B2 | 4/2019 | Curry et al. | |
| D848,638 | S | 5/2019 | Sims et al. | |
| D849,961 | S | 5/2019 | Muller et al. | |
| D849,962 | S | 5/2019 | Curry et al. | |
| 10,300,488 | B2 | 5/2019 | Motadel et al. | |
| D854,185 | S | 7/2019 | Mendez Padilla et al. | |
| D865,216 | S | 10/2019 | Curry et al. | |
| D875,968 | S | 2/2020 | Curry | |
| 10,654,042 | B2 | 5/2020 | Rethwisch et al. | |
| D886,321 | S | 6/2020 | Motadel et al. | |
| D888,280 | S | 6/2020 | Motadel et al. | |
| 10,730,053 | B2 | 8/2020 | Curry et al. | |
| D902,431 | S | 11/2020 | Sims et al. | |
| D905,272 | S | 12/2020 | Curry | |
| D906,538 | S | 12/2020 | Mendez Padilla et al. | |
| D922,610 | S | 6/2021 | Curry et al. | |
| 11,040,351 | B2 | 6/2021 | Curry et al. | |
| 11,179,716 | B2 * | 11/2021 | Wilmer | G01N 35/1074 |
| D956,999 | S | 7/2022 | Curry et al. | |
| D964,592 | S | 9/2022 | Leung | |
| 12,011,721 | B2 | 6/2024 | Curry et al. | |
| 2002/0053245 | A1 * | 5/2002 | Carl | B01L 3/0279 73/864.14 |
| 2002/0168300 | A1 * | 11/2002 | Bramwell | B01L 9/543 211/74 |

(56) References Cited

U.S. PATENT DOCUMENTS

| | | | | |
|---|---|---|---|---|
| 2003/0017604 | A1* | 1/2003 | Hitch | G01N 35/1065 422/922 |
| 2003/0064508 | A1 | 4/2003 | Kwasnoski et al. | |
| 2003/0129089 | A1 | 7/2003 | Arnold et al. | |
| 2003/0152494 | A1 | 8/2003 | Moritz et al. | |
| 2004/0033168 | A1 | 2/2004 | Hughes et al. | |
| 2005/0136546 | A1 | 6/2005 | Berndt et al. | |
| 2005/0265900 | A1* | 12/2005 | Gard | G01N 35/109 422/400 |
| 2006/0093530 | A1 | 5/2006 | Ueda | |
| 2006/0257292 | A1 | 11/2006 | Motadel et al. | |
| 2007/0017870 | A1 | 1/2007 | Belov et al. | |
| 2008/0240999 | A1 | 10/2008 | Timpson et al. | |
| 2008/0284602 | A1 | 11/2008 | Morris et al. | |
| 2009/0007702 | A1 | 1/2009 | Yiu | |
| 2009/0092521 | A1* | 4/2009 | Gent | B01L 9/543 422/400 |
| 2009/0255949 | A1 | 10/2009 | Motadel et al. | |
| 2010/0080734 | A1 | 4/2010 | Brophy et al. | |
| 2010/0089938 | A1 | 4/2010 | Motadel et al. | |
| 2010/0119418 | A1 | 5/2010 | Clements et al. | |
| 2010/0221151 | A1 | 9/2010 | Motadel et al. | |
| 2010/0266457 | A1 | 10/2010 | Rethwisch et al. | |
| 2010/0314051 | A1 | 12/2010 | Barger et al. | |
| 2011/0183433 | A1 | 7/2011 | Motadel et al. | |
| 2011/0236278 | A1 | 9/2011 | Motadel et al. | |
| 2012/0257953 | A1 | 10/2012 | Williams et al. | |
| 2012/0258026 | A1* | 10/2012 | Naumann | B01L 3/0234 422/521 |
| 2013/0108522 | A1 | 5/2013 | Cohen et al. | |
| 2013/0161225 | A1 | 6/2013 | Lepot | |
| 2013/0161226 | A1 | 6/2013 | Motadel et al. | |
| 2013/0315800 | A1 | 11/2013 | Yin et al. | |
| 2013/0323140 | A1 | 12/2013 | Motadel et al. | |
| 2014/0205518 | A1 | 7/2014 | Malinoski et al. | |
| 2014/0234182 | A1 | 8/2014 | Motadel et al. | |
| 2014/0314637 | A1 | 10/2014 | Motadel et al. | |
| 2015/0017078 | A1 | 1/2015 | Fattinger et al. | |
| 2015/0110690 | A1 | 4/2015 | Smith et al. | |
| 2015/0283548 | A1 | 10/2015 | Motadel et al. | |
| 2016/0001292 | A1 | 1/2016 | Motadel et al. | |
| 2016/0101422 | A1 | 4/2016 | Bucher et al. | |
| 2016/0167041 | A1 | 6/2016 | Curry et al. | |
| 2016/0288126 | A1 | 10/2016 | Motadel et al. | |
| 2016/0319329 | A1 | 11/2016 | Figueroa et al. | |
| 2017/0008001 | A1 | 1/2017 | Motadel et al. | |
| 2017/0080432 | A1 | 3/2017 | Curry et al. | |
| 2017/0136467 | A1 | 5/2017 | Johns et al. | |
| 2017/0282187 | A1* | 10/2017 | Yiu | B01L 9/543 |
| 2017/0282188 | A1* | 10/2017 | Yiu | B01L 9/543 |
| 2017/0297030 | A1 | 10/2017 | Motadel et al. | |
| 2018/0117595 | A1 | 5/2018 | Curry et al. | |
| 2018/0221884 | A1 | 8/2018 | Mendez et al. | |
| 2018/0304269 | A1 | 10/2018 | Motadel et al. | |
| 2019/0255533 | A1* | 8/2019 | Wilmer | G01N 35/1074 |
| 2019/0299217 | A1 | 10/2019 | Motadel et al. | |
| 2019/0344258 | A1 | 11/2019 | Motadel et al. | |
| 2020/0023369 | A1* | 1/2020 | Happ | B01L 9/543 |
| 2020/0122136 | A1 | 4/2020 | Blaszczak et al. | |
| 2020/0298243 | A1 | 9/2020 | Curry et al. | |
| 2022/0152616 | A1* | 5/2022 | Cote | B01L 3/0275 |

FOREIGN PATENT DOCUMENTS

| | | | |
|---|---|---|---|
| CN | 102151590 | A | 8/2011 |
| CN | 102384982 | A | 3/2012 |
| EP | 1 110 613 | A1 | 6/2001 |
| WO | 95/08392 | A1 | 3/1995 |
| WO | 99/26723 | A2 | 6/1999 |
| WO | 00/24513 | A1 | 5/2000 |
| WO | 01/70401 | A1 | 9/2001 |
| WO | 02/072261 | A2 | 9/2002 |
| WO | 03/064271 | A2 | 8/2003 |
| WO | 2006/133440 | A2 | 12/2006 |
| WO | 2009/126945 | A2 | 10/2009 |
| WO | 2010/085669 | A2 | 7/2010 |
| WO | 2013/181163 | A1 | 12/2013 |
| WO | 2016/094553 | A1 | 6/2016 |

OTHER PUBLICATIONS

Office Action dated Oct. 23, 2014 in U.S. Appl. No. 13/769,212, filed Feb. 15, 2013 and published as US 2013-0161226 on Jun. 27, 2013, 11 pages.

Office Action dated Oct. 28, 2016 in U.S. Appl. No. 14/746,711, filed Jun. 22, 2015 and published as US 2015-0283548 on Oct. 8, 2015, 19 pages.

Office Action dated Sep. 3, 2020 in U.S. Appl. No. 16/899,466, filed Jun. 11, 2020, and published as US-2020-0298243-A1 on Sep. 24, 2020, 16 pages.

Office Action dated Sep. 5, 2019 in U.S. Appl. No. 15/543,224, filed Jul. 12, 2017 and published as US 2018-0117595 on May 3, 2018, 20 pages.

Office Action dated Sep. 17, 2018 in U.S. Appl. No. 29/592,989, filed Feb. 3, 2017, 6 pages.

Office Action dated Sep. 24, 2015 in U.S. Appl. No. 14/746,711, filed Jun. 22, 2015 and published as US 2015-0283548 on Oct. 8, 2015, 17 pages.

Office Action dated Sep. 25, 2012 in U.S. Appl. No. 12/692,426, filed Jan. 22, 2010 and published as US 2010-0221151 on Sep. 2, 2010, 10 pages.

Office Action received dated Aug. 19, 2020 in U.S. Appl. No. 29/684,691, filed Mar. 22, 2019, 5 pages.

U.S. Appl. No. 61/044,243, filed Apr. 11, 2008 by Arta Motadel, 41 pages.

Office Action dated Oct. 4, 2021 in U.S. Appl. No. 29/783,945, filed May 17, 2021, 7 pages.

EarthOx Pipette Tips 100 μL w/Filter—Low Retention (96 Tips/Rack) https://www.amazon.com/EarthOx-Pipette-Tips-100-Filter/dp/B07NBXJS4P/ref=sr_1_6?dchild, Jun. 23, 2016, 1 page.

Office Action dated Apr. 11, 2022 in U.S. Appl. No. 29/783,945, filed May 17, 2021, 6 pages.

https://www.amazon.com/Eppendorf-022491903-Quality-Pipette-Microlitter/dp/B005GVHHTU/ref=, Jan. 14, 2016, 1 page.

https://www.fishersci.se/shop/products/axygen-robotic-pipetter-tips-15/p-4356795, Jul. 27, 2019, 1 page.

Bioexpress Tip Eject, [online] Retrieved Jul. 19, 2018 from URL: https://www.bioexpress.com/assetsvc/asset/en_US/id/11301722/contents, 2 pages.

Ex Parte Quayle Action received dated Jun. 4, 2020 in U.S. Appl. No. 29/684,691, filed Mar. 22, 2019, 5 pages.

https://www.hamiltoncompany.com/automated-liquid-handling/consumables/co-retips/piercing-co-re-tips, Jul. 9, 2020, 1 page.

International Preliminary Report on Patentability mailed on Aug. 4, 2011 in International Patent Application No. PCT/US2010/021838, filed on Jan. 22, 2010, 7 pages.

International Preliminary Report on Patentability mailed on Jun. 22, 2017 in International Patent Application No. PCT/2015/064784, filed on Dec. 9, 2015, 16 pages.

International Search Report and Written Opinion mailed on May 18, 2016 in International Patent Application No. PCT/2015/064784, filed on Dec. 9, 2015, 21 pages.

International Search Report and Written Opinion mailed on Sep. 2, 2010 in International Patent Application No. PCT/US2010/021838, filed on Jan. 22, 2010, 11 pages.

Office Action dated Mar. 11, 2020 in U.S. Appl. No. 15/543,224, filed Jul. 12, 2017 and published as US 2018-0117595 on May 3, 2018, 8 pages.

Office Action dated Apr. 6, 2016 in U.S. Appl. No. 14/746,711, filed Jun. 22, 2015 and published as US 2015-0283548 on Oct. 8, 2015, 17 pages.

Office Action dated Apr. 11, 2019 in U.S. Appl. No. 15/543,224, filed Jul. 12, 2017 and published as US 2018-0117595 on May 3, 2018, 13 pages.

(56) References Cited

OTHER PUBLICATIONS

Office Action dated Apr. 19, 2017 in U.S. Appl. No. 14/746,711, filed Jun. 22, 2015 and published as US 2015-0283548 on Oct. 8, 2015, 15 pages.
Office Action dated Apr. 26, 2012 in U.S. Appl. No. 29/354,397, filed Jan. 22, 2010, 11 pages.
Office Action dated Apr. 3, 2015 in U.S. Appl. No. 13/769,212, filed Feb. 15, 2013 and published as US 2013-0161226 on Jun. 27, 2013, 9 pages.
Office Action dated Aug. 7, 2019 in U.S. Appl. No. 29/654,517, filed Jun. 25, 2018, 6 pages.
Office Action dated Aug. 24, 2020 in U.S. Appl. No. 29/719,779, filed Jan. 7, 2020, 6 pages.
Office Action dated Aug. 27, 2018 in U.S. Appl. No. 15/852,620, filed Dec. 22, 2017 and published as US 2018-0304269 on Oct. 25, 2018, 8 pages.
Office Action dated Aug. 27, 2018 U.S. Appl. No. 29/548,015, filed Dec. 9, 2015, 2 pages.
Office Action dated Dec. 13, 2017 in U.S. Appl. No. 29/601,729, filed Apr. 25, 2017, 7 pages.
Office Action dated Dec. 13, 2017 in U.S. Appl. No. 29/601,730, filed Apr. 25, 2017, 6 pages.
Office Action dated Dec. 18, 2017 in U.S. Appl. No. 29/527,027, filed May 14, 2015, 5 pages.
Office Action dated Dec. 28, 2018 in U.S. Appl. No. 29/592,989, filed Feb. 3, 2017, 4 pages.
Office Action dated Feb. 5, 2021 in U.S. Appl. No. 29/719,779, filed Jan. 7, 2020, 5 pages.
Office Action dated Feb. 12, 2014 in U.S. Appl. No. 29/445,143, filed Feb. 7, 2013, 8 pages.
Office Action dated Feb. 13, 2012 in U.S. Appl. No. 12/692,426, filed Jan. 22, 2010 and published as US 2010-0221151 on Sep. 2, 2010, 11 pages.
Office Action dated Feb. 19, 2021 in U.S. Appl. No. 16/899,466, filed Jun. 11, 2020 and published as US-2020-0298243-A1 on Sep. 24, 2020, 9 pages.
Office Action dated Feb. 26, 2013 in U.S. Appl. No. 12/692,426, filed Jan. 22, 2010 and published as US 2010-0221151 on Sep. 2, 2010, 7 pages.
Office Action dated Jan. 2, 2019 in U.S. Appl. No. 29/548,015, filed Dec. 9, 2015, 6 pages.
Office Action dated Jan. 9, 2019 in U.S. Appl. No. 15/852,620, filed Dec. 22, 2017 and published as US 2018-0304269 on Oct. 25, 2018, 8 pages.
Office Action dated Jan. 25, 2018 in U.S. Appl. No. 29/527,027, filed May 14, 2015, 3 pages.
Office Action dated Jul. 27, 2018 in U.S. Appl. No. 14/712,451, filed May 14, 2015 and published as US 2016-0167041 on Jun. 16, 2016, 8 pages.
Office Action dated Jul. 31, 2017 in U.S. Appl. No. 29/527,027, filed May 14, 2015, 7 pages.
Office Action dated Jun. 13, 2016 in U.S. Appl. No. 14/712,451, filed May 14, 2015 and published as US 2016-0167041 on Jun. 16, 2016, 18 pages.
Office Action dated Jun. 13, 2019 in U.S. Appl. No. 29/592,989, filed Feb. 3, 2017, 4 pages.
Office Action dated Jun. 22, 2018 in U.S. Appl. No. 15/277,923, filed Sep. 27, 2016 and published as US 2017-0080432 on Mar. 23, 2017, 12 pages.
Office Action dated Jun. 25, 2013 in U.S. Appl. No. 29/445,143, filed Feb. 7, 2013, 11 pages.
Office Action dated Mar. 26, 2018 in U.S. Appl. No. 29/601,729, filed Apr. 25, 2017, 5 pages.
Office Action dated Mar. 27, 2014 in U.S. Appl. No. 13/769,212, filed Feb. 15, 2013 and published as US 2013-0161226 on Jun. 27, 2013, 12 pages.
Office Action dated May 17, 2018 in U.S. Appl. No. 29/601,730, filed Apr. 25, 2017, 5 pages.
Office Action dated May 26, 2017 in U.S. Appl. No. 14/712,451, filed May 14, 2015 and published as US 2016-0167041 on Jun. 16, 2016, 19 pages.
Office Action dated May 4, 2020 in in U.S. Appl. No. 15/543,224, filed Jul. 12, 2017 and published as US 2018-0117595 on May 3, 2018, 5 pages.
Office Action dated Nov. 3, 2016 in U.S. Appl. No. 14/712,451, filed May 14, 2015 and published as US 2016-0167041 on Jun. 16, 2016, 15 pages.
Office Action dated Nov. 8, 2012 in U.S. Appl. No. 29/354,397, filed Jan. 22, 2010, 9 pages.
Office Action dated Nov. 8, 2017 in U.S. Appl. No. 14/712,451, filed May 14, 2015 and published as US 2016-0167041 on Jun. 16, 2016, 20 pages.
Office Action dated Nov. 26, 2018 in U.S. Appl. No. 15/277,923, filed Sep. 27, 2016 and published as US 2017-0080432 on Mar. 23, 2017, 9 pages.
Office Action dated Nov. 28, 2018 in U.S. Appl. No. 15/543,224, filed Jul. 12, 2017 and published as US 2018-0117595 on May 3, 2018, 18 pages.
Office Action dated Oct. 1, 2015 in U.S. Appl. No. 14/712,451, filed May 14, 2015 and published as US 2016-0167041 on Jun. 16, 2016, 24 pages.
Office Action dated Oct. 5, 2017 in U.S. Appl. No. 15/637,148, filed Jun. 29, 2017 and published as US 2017-0297030 on Oct. 19, 2017, 9 pages.
Office Action dated Oct. 10, 2019 in U.S. Appl. No. 29/654,517, filed Jun. 25, 2018, 5 pages.

* cited by examiner

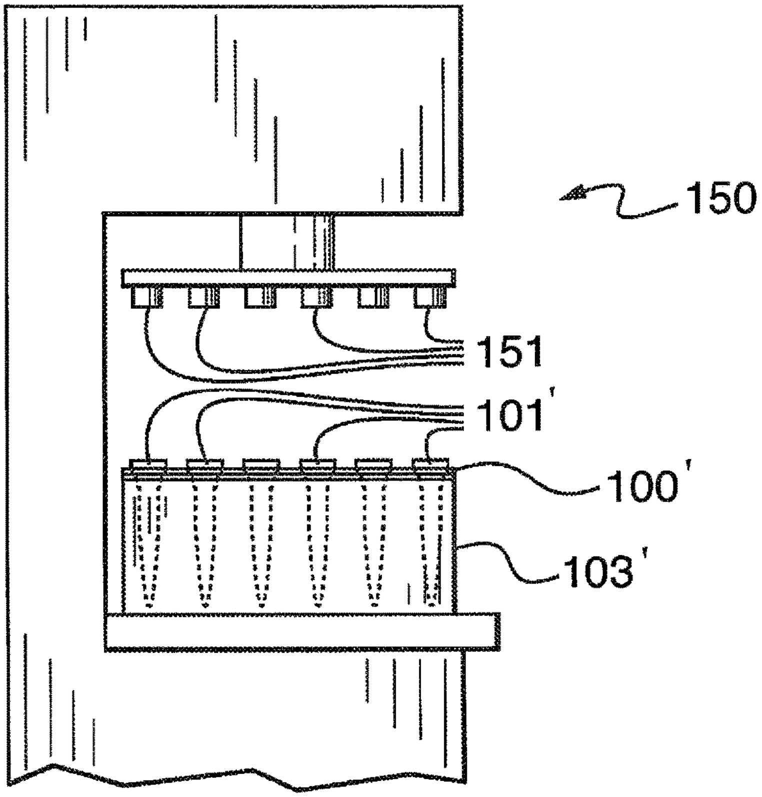
FIG. 3
FIG. 4
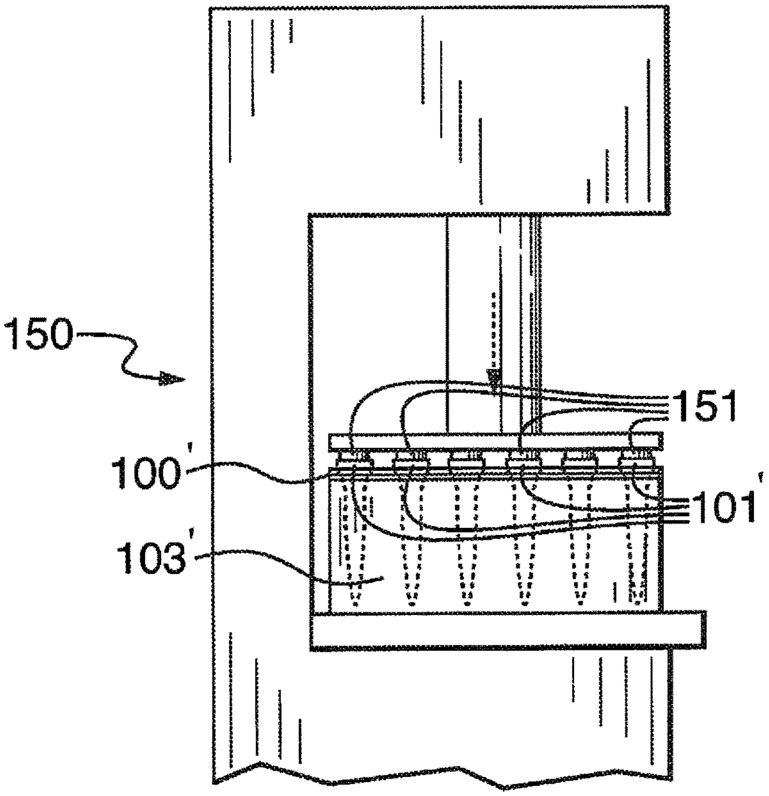

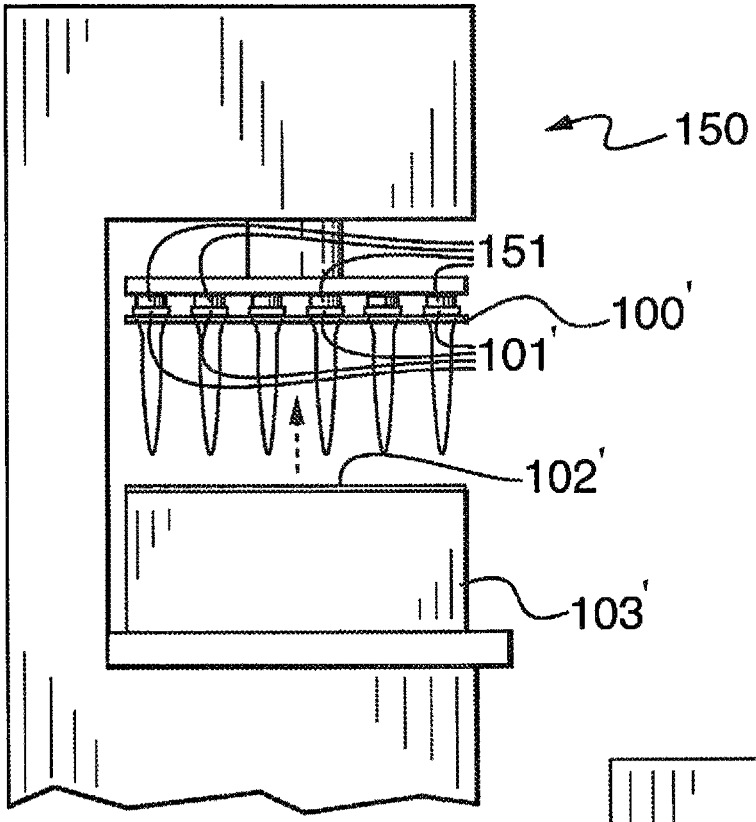
FIG. 5
FIG. 6
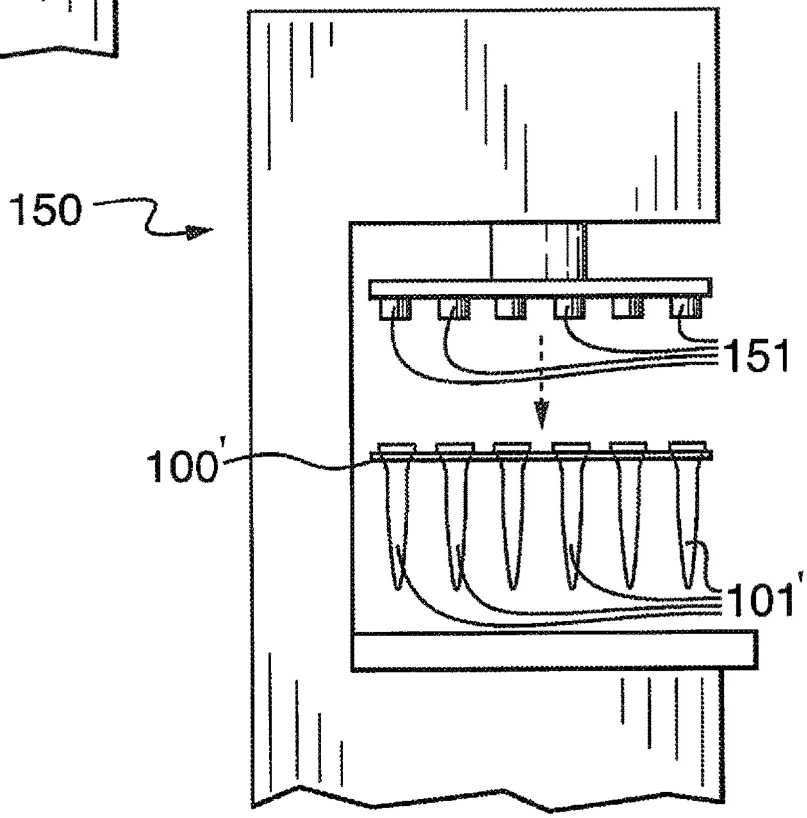

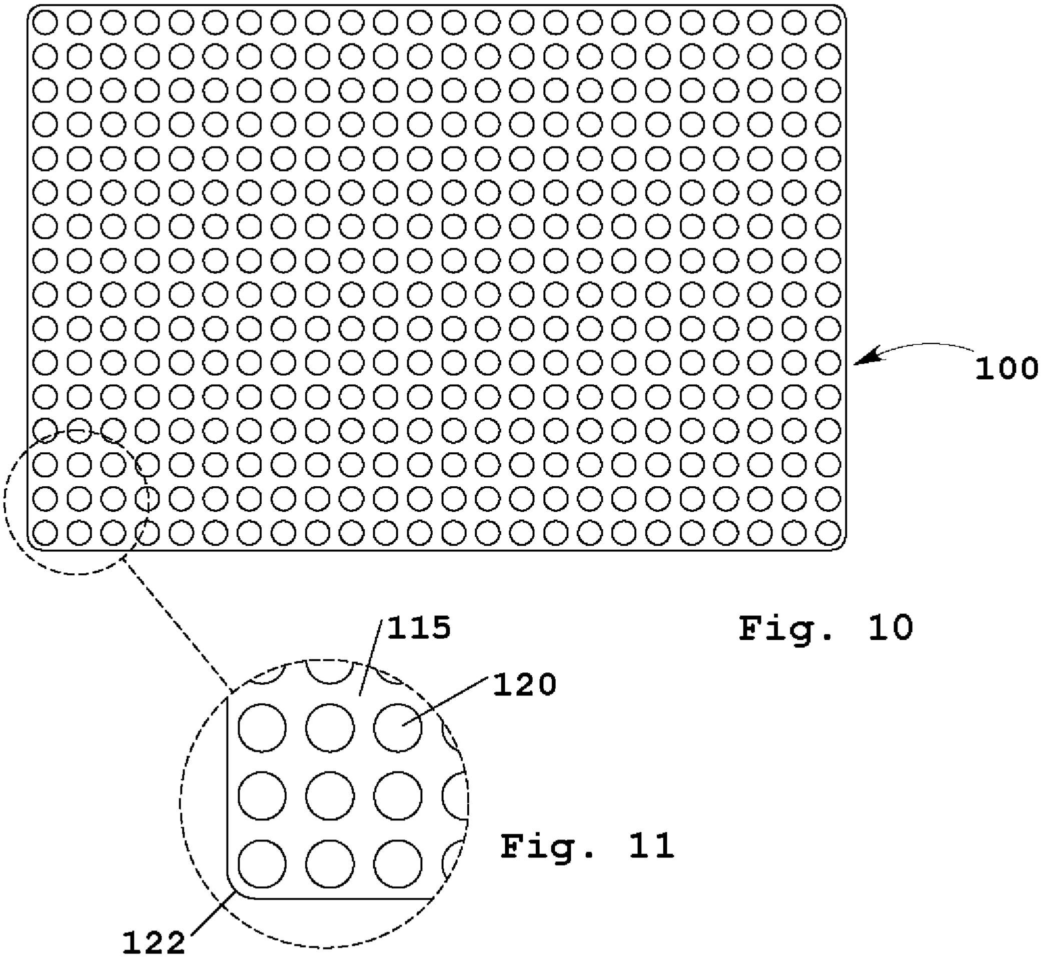
Fig. 10
Fig. 11
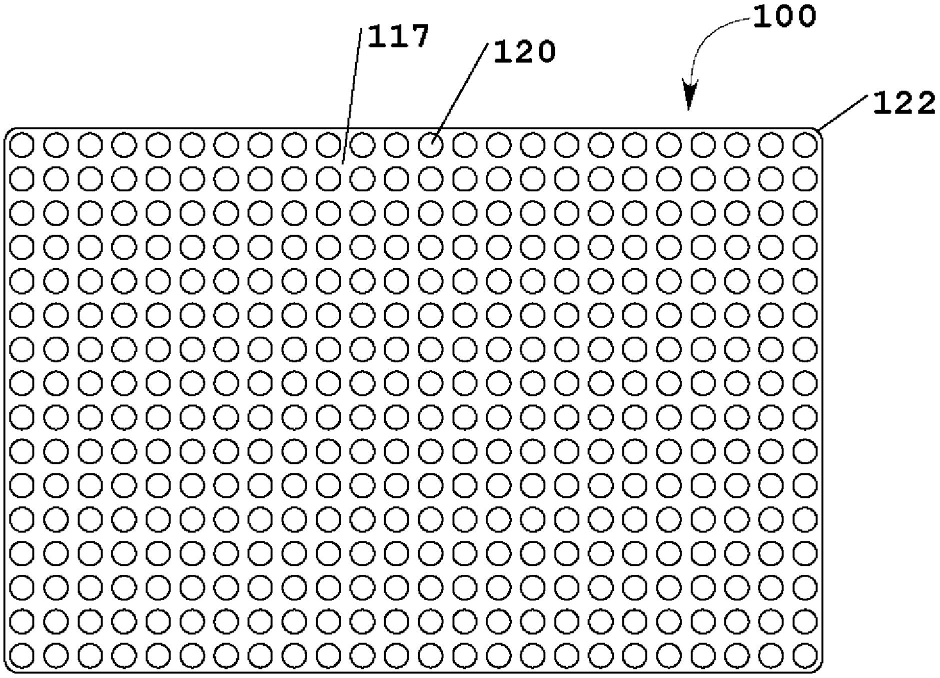
Fig. 12

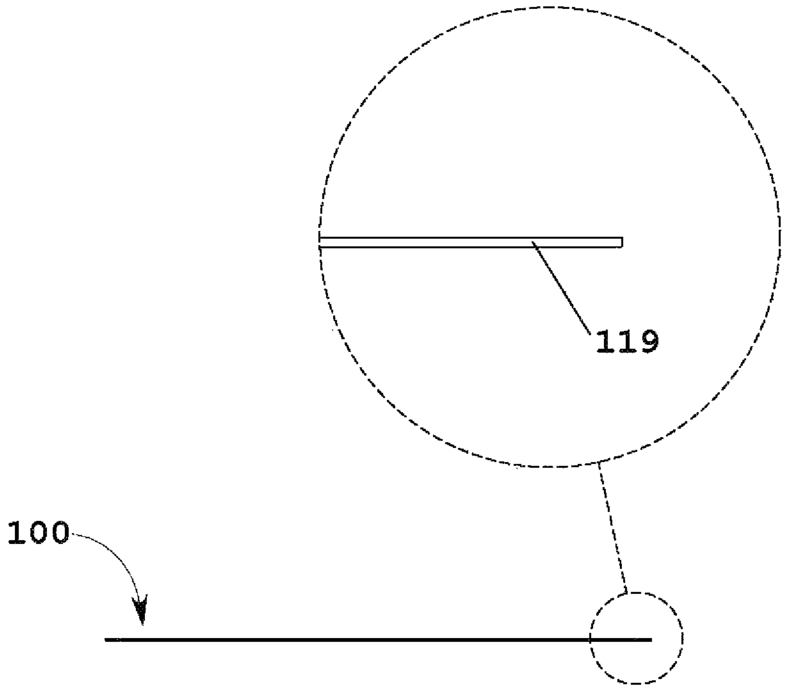
Fig. 14
Fig. 13
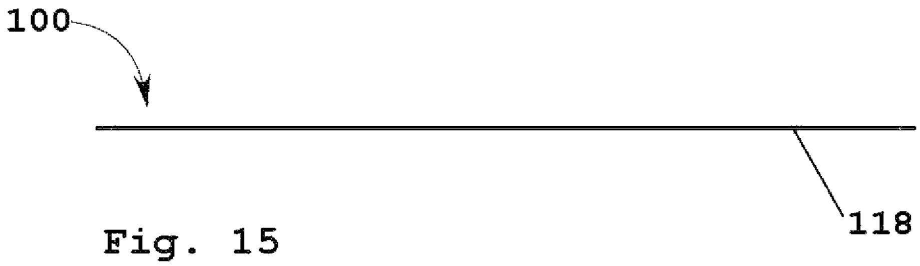
Fig. 15

METHOD FOR DISPENSING FLUID

RELATED PATENT APPLICATIONS

This patent application is a continuation of U.S. patent application Ser. No. 17/326,089 filed on May 20, 2021, entitled PIPETTE TIP STATIC-DEFEATING DEVICE, naming Scott Curry et al. as inventors, now US Pat. No. 12,011,721, which is a continuation of U.S. patent application Ser. No. 16/899,466 filed on Jun. 11, 2020, entitled METHOD FOR DISPENSING FLUID, naming Scott Curry et al. as inventors, now U.S. Pat. No. 11,040,351, which is a continuation of U.S. patent application Ser. No. 15/543,224 filed on Jul. 12, 2017, entitled STATIC-DEFEATING APPARATUS FOR PIPETTE TIPS, naming Scott Curry et al. as inventors, now U.S. Pat. No. 10,730,053, which is a 35 U.S.C. 371 national application of Patent Cooperation Treaty patent application no. PCT/2015/064784 filed on Dec. 9, 2015, entitled STATIC-DEFEATING APPARATUS FOR PIPETTE TIPS, naming Scott Curry et al. As inventors, which is a continuation-in-part of U.S. patent application Ser. No. 14/712,451 filed on May 14, 2015, entitled STATIC-DEFEATING APPARATUS FOR PIPETTE TIPS, naming Scott Curry et al. as inventors, now U.S. Pat. No. 10,137,453, which is a continuation-in-part of U.S. patent application Ser. No. 14/566,143 filed on Dec. 10, 2014, entitled STATIC-DEFEATING APPARATUS FOR PIPETTE TIPS, naming Scott Curry as inventor, now abandoned. This patent application also is related to U.S. design patent application Ser. No. 29/527,027 filed on May 14, 2015, entitled PIPETTE TIP SHEET APPARATUS AND ASSEMBLIES, naming Scott Curry et al. as inventors, now patent no. D815753. The entire content of the foregoing patent applications, including all text and drawings, is incorporated herein by reference for all purposes.

FIELD

The technology relates in part to static-defeating apparatus for use with pipette tips. Such apparatus can be utilized in conjunction with pipette tip fluid dispensing devices, which sometimes are manually operated devices or automated devices.

BACKGROUND

Static cling is a problem affecting fluid dispensing devices. Certain pipetting devices, or dispensers, draw fluid into disposable pipette tips for fluid delivery. These devices often include up to 1536 separate pipettes or nozzles aligned in an array. Each pipette or nozzle typically is paired to a separate pipette tip, and the pipette tips often are disposable and unconnected to one another.

Pipette tip fluid dispensing devices can fail as a result of improper pipette tip ejection and/or pipette tip loading. For automated devices, ejection and loading failures can lead to a lengthy and costly shutdown of the entire device. While many pipetting devices have an automatic eject mechanism for pipette tips, the auto-eject mechanism can fail for one or more of the pipette tips. Without being limited by theory, ejection failure can be caused by static charge building up on one or more pipette tips, which can cause charged pipette tips to adhere to the pipette or nozzle on which it was attached. The static-induced adhesion is strong enough to overcome the weight of the pipette tip, which leads to ejection failure. Another type of failure associated with pipette tip loading occurs when a pipette tip is knocked sideways in a rack in which it is contained, preventing a device from picking up a new set of pipette tips. Without being limited by theory, pipette tips can be knocked out of position by static forces.

SUMMARY

Provided in certain aspects are static-defeating apparatus for use in conjunction with a multiple pipette system that do not impinge on the function of pipettes or pipette tips utilized in the system. Also provided in certain aspects is a sheet configured to retain an array of pipette tips, which sheet includes a first surface, a second surface and an array of holes, each of which pipette tips in the array of pipette tips comprises an exterior surface, an interior surface, a proximal region, a distal region, a proximal opening and a distal opening; each of which holes in the array of holes in the sheet has a diameter or an effective diameter; and the diameter or the effective diameter is equal to, or substantially equal to, (i) an outer diameter of the pipette tip exterior surface, and/or (ii) the pipette tip proximal opening diameter. A sheet can be provided with or without retained pipette tips (e.g., with pipette tips, or without pipette tips, retained in holes of the sheet).

Provided in certain aspects is an assembly that includes a sheet described herein and a retained array of pipette tips. Also provided in certain aspects is an assembly that includes two or more sheets described herein, with or without retained pipette tips. Provided also in certain aspects is a pipette tip reload system that includes a sheet or assembly of sheets and an array or arrays of pipette tips retained by the sheet(s). Also provided in certain embodiments is a pipette tip tray that includes a rack, a pipette tip receptacle plate affixed to the rack, and a sheet described herein in association with a surface of the pipette tip receptacle plate.

Also provided in certain aspects is a method for dispensing fluid that includes (a) engaging nozzles of a pipette tip dispensing device with pipette tips retained by a sheet, in an assembly, in a reload component, or in a tray, as described herein; and (b) dispensing fluid from pipette tips in engagement with the nozzles, wherein the pipette tips in engagement with nozzles are retained by the sheet. Provided also in certain aspects is a method for manufacturing a sheet as described herein that includes (a) providing a sheet material having no holes, and (b) introducing the holes in the sheet.

Certain embodiments are described further in the following description, examples, claims and drawings.

BRIEF DESCRIPTION OF THE DRAWINGS

The drawings illustrate certain embodiments of the technology and are not limiting. For clarity and ease of illustration, the drawings are not made to scale and, in some instances, various aspects may be shown exaggerated or enlarged to facilitate an understanding of particular embodiments.

FIG. 3 shows a first step of a static-defeating apparatus in use, according to an embodiment.

FIG. 4 shows a second step of a static-defeating apparatus in use, according to an embodiment.

FIG. 5 shows a third step of a static-defeating apparatus in use, according to an embodiment.

FIG. 6 shows a fourth step of a static-defeating apparatus in use, according to an embodiment.

FIG. 10 shows a top view of the pipette tip retention sheet embodiment shown in FIG. 7, and FIG. 11 shows an enlarged view of a portion of the sheet shown in FIG. 10. FIG. 12 shows a bottom view of the sheet shown in FIG. 7. FIG. 13 and FIG. 15 show a short side view and a long side view, respectively, of the sheet shown in FIG. 7, and FIG. 14 shows an enlarged view of a portion of the sheet shown in FIG. 13.

49

Figure 2:
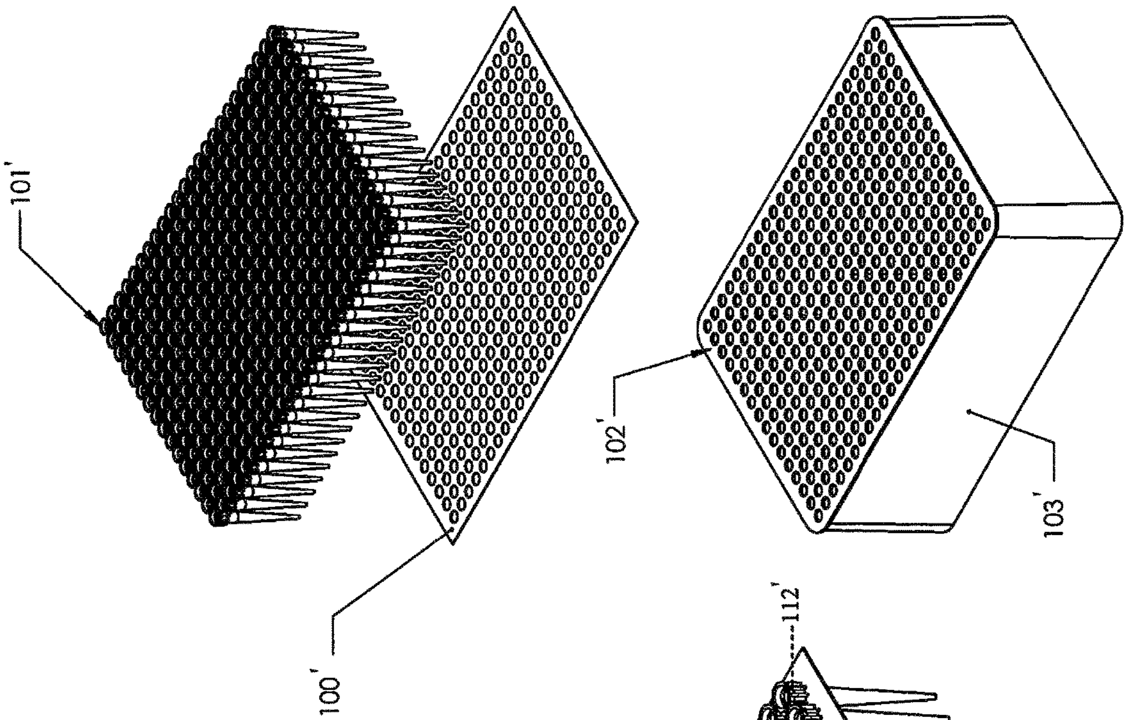
FIG. 2 is an exploded view of a static-defeating apparatus, according to an embodiment.

Certain features of drawings are described in the following table.

| Callout | Feature |
|---|---|
| 100' | Static-defeating sheet embodiment (also referred to as pipette tip retention sheet) |
| 100 | Static-defeating sheet embodiment (also referred to as pipette tip retention sheet) |
| 101' | Pipette tip embodiment |
| 101 | Pipette tip embodiment |
| 101A | Pipette tip distal region |
| 101B | Pipette tip distal terminus |
| 101C | Pipette tip distal opening |
| 101D | Pipette tip proximal region |
| 101E | Pipette tip proximal terminus |
| 101F | Pipette tip proximal opening |
| 101G | Pipette tip interior surface |
| 101H | Pipette tip exterior surface |
| 101I | Reserved |
| 101J | Pipette tip flange |
| 101* | Pipette tip embodiment |
| 101A* | Pipette tip distal region |
| 101D* | Pipette tip proximal region |
| 101E* | Pipette tip proximal terminus |
| 101L* | Pipette tip flange |
| 101M* | Pipette tip rib |
| 101N* | Pipette tip volumetric grade line |
| 101P* | Pipette tip internal filter |
| 102' | Snap plate embodiment (also referred to as a pipette tip receptacle plate) |
| 102 | Snap plate embodiment (also referred to as a pipette tip receptacle plate) |
| 103' | Rack base embodiment |
| 103 | Rack base embodiment |
| 104 | Tray |
| 105 | Array of pipette tips |
| 107 | Rack footing |
| 112' | Pipette tip grooves or ridges embodiment (also referred to as pipette tip ribs) |
| 112 | Pipette tip grooves or ridges embodiment (also referred to as pipette tip ribs) |
| 115 | Sheet first surface (top surface) |
| 117 | Sheet second surface (bottom surface) |
| 118 | Sheet edge, long side |
| 119 | Sheet edge, short side |
| 120 | Sheet hole |
| 122 | Sheet corner |
| 130 | Interior edge of sheet hole |
| 150 | Pipette tip fluid dispenser |
| 151 | Pipettes (also referred to as nozzles) |
| 200 | Sheet embodiment comprising round holes and x-shaped voids |
| 202 | Hole |
| 203 | Interior edge of sheet hole |

-continued

| Callout | Feature |
|---|---|
| 204 | X-shaped void |
| 205 | Sheet first surface |
| 207 | Sheet edge |
| 210 | Sheet embodiment comprising round holes and diamond-shaped voids |
| 212 | Hole |
| 213 | Interior edge of sheet hole |
| 214 | diamond-shaped void |
| 215 | Sheet first surface |
| 217 | Sheet edge |
| 220 | Sheet embodiment comprising diamond-shaped holes |
| 222 | Hole |
| 225 | Sheet first surface |
| 230 | Sheet embodiment comprising square-shaped holes |
| 232 | Hole |
| 235 | Sheet first surface |
| 240 | Sheet embodiment comprising triangle-shaped holes |
| 242 | Hole |
| 245 | Sheet first surface |
| 250 | Sheet embodiment comprising star-shaped holes |
| 252 | Hole |
| 255 | Sheet first surface |
| 260 | Sheet embodiment comprising polygon-shaped holes |
| 262 | Hole |
| 265 | Sheet first surface |
| 270 | Sheet embodiment comprising pipette tip joining agent disposed annularly at portions around holes |
| 272 | Hole |
| 275 | Sheet first surface |
| 277 | Annularly disposed portion (e.g., adhesive or sheet surface) configured to join pipette tip proximal terminus |
| 280 | Sheet embodiment comprising hole-to-edge offsets of varying widths |
| 282A<br>282A'<br>282A"<br>282B<br>282B'<br>282B" | Hole |
| 285 | Sheet first surface |
| 287 | Sheet corner |
| j<br>j' | Hole-to-edge offset distance: edge short side |
| k<br>k' | Hole-to-edge offset distance: edge long side |
| 288 | Sheet edge, long side |
| 289 | Sheet edge, short side |
| 290 | Sheet embodiment comprising hole-to-edge offsets of varying widths |
| 292A<br>292A'<br>292A"<br>292B<br>292B'<br>292B" | Hole |
| 293 | Sheet internal first alignment member (optional) |
| 294 | Sheet edge first alignment member (optional) |
| 295 | Sheet first surface |
| 297 | Sheet corner |
| 298 | Sheet edge, long side |
| 299 | Sheet edge, short side |
| 300 | Sheet assembly comprising array of pipette tips inserted in holes; sheet in flat orientation |
| 320<br>320a<br>320b | Sheet assembly embodiments comprising array of pipette tips inserted in 282"A" holes in sheet embodiment 280 |
| 325a<br>325b | Sheet assembly embodiments comprising array of pipette tips inserted in 282"B" holes in sheet embodiment 280 |
| 330<br>330a<br>330b | Sheet assembly embodiments comprising array of pipette tips inserted in 292"A" holes in sheet embodiment 290 |
| 340a<br>340b | Sheet assembly embodiments comprising array of pipette tips inserted in 292"B" holes in sheet embodiment 290 |
| 350 | Sheet assembly variant with sheet in flexed orientation |
| 360 | Sheet embodiment comprising hole-to-edge offsets of varying widths |
| 362 | Hole |

-continued

| Callout | Feature |
|---|---|
| 365 | Sheet first surface |
| 367 | Sheet corner |
| 368 | Sheet edge, long side |
| 369 | Sheet edge, short side |
| e<br>e' | Hole-to-edge offset distance: edge short side |
| d<br>d' | Hole-to-edge offset distance: edge long side |
| 370<br>370a<br>370b<br>370c<br>370d | Sheet assembly embodiments comprising array of pipette tips retained by sheet embodiment 360; assembly 370a is rotated 180 degrees horizontally with respect to assembly 370b |
| 380 | Sheet embodiment comprising hole-to-edge offsets of varying widths |
| 382 | Hole |
| 384 | Sheet first alignment member (optional) |
| 385 | Sheet first surface |
| 387 | Sheet corner |
| 388 | Sheet edge, long side |
| 389 | Sheet edge, short side |
| g<br>g' | Hole-to-edge offset distance: edge short side |
| f<br>f' | Hole-to-edge offset distance: edge long side |
| 390<br>390a<br>390b<br>390c<br>390d | Sheet assembly embodiments comprising array of pipette tips retained by sheet embodiment 380; assembly 390a is rotated 180 degrees horizontally with respect to assembly 390b |
| 400 | Sheet assembly comprising array of pipette tips joined to sheet second surface; sheet in flat orientation |
| 450 | Sheet assembly variant with sheet in flexed orientation |
| 500 | Multiple sheet assembly comprising multiple sheet elements in flat orientation |
| 510 | Sheet element |
| 520 | Sheet element internal boundary |
| 600 | Multiple sheet assembly comprising pipette tip arrays |
| 700 | Multiple sheet assembly in coiled orientation |
| 800 | Multiple sheet assembly comprising pipette tip arrays in coiled orientation |
| 900 | Pipette tip tray assembly (shown without optional lid) |
| 1000 | Sheet assembly comprising array of pipette tips joined to sheet second surface; sheet in flat orientation |
| 1010 | Sheet having no holes in association with pipette tips |
| 1017 | Sheet second surface |
| 1100 | Horizontally nested arrangement including two units of assembly 300 |
| 1150 | Multiple sheet nested assembly embodiment comprising assemblies 320a, 320b, 325a and 325b |
| 1151 | Top layer |
| 1152 | Second layer |
| b | Spacing distance between sheets 280 |
| 1160 | Multiple sheet nested assembly embodiment comprising assemblies 330a, 330b, 340a and 340b |
| 1161 | Top layer |
| 1162 | Second layer |
| c | Spacing distance between sheets 290 |
| 1170 | Multiple sheet nested assembly embodiment comprising assemblies 370a, 370b, 370c and 370d |
| 1171 | Top layer |
| 1172 | Second layer |
| 1180 | Multiple sheet nested assembly embodiment comprising assemblies 390a, 390b, 390c and 390d |
| 1181 | Top layer |
| 1182 | Second layer |
| 1200 | Vertically nested arrangement including four units of assembly 300 |
| 1300 | Horizontally nested arrangement including two units of sub-assembly 1301 |
| 1301 | Assembly (also referred to as a "sub-assembly") having pipette tip retention sheet and array of pipette tips |
| 1302 | Pipette tip retention sheet |
| 1303 | Pipette tip retention sheet edge |
| 1304 | First alignment member |
| 1305 | Corner of pipette tip retention sheet |
| 1315 | First surface of pipette tip retention sheet |

-continued

| Callout | Feature |
|---|---|
| 1317 | Second surface of pipette tip retention sheet |
| 1350 | Vertically nested arrangement including four units of sub-assembly 1301 |
| 1400, 1403 | Rack base |
| 1405 | Rack second alignment member |
| 1407 | Rack base footing |
| 1410 | Bottom of rack base interior |
| 1411 | Long side of rack base interior |
| 1412 | Short side of rack base interior |
| 1413 | Proximal edge of rack base |
| 1414 | Recess wall of rack base |
| 1415 | Recess ledge of rack base |
| 1416 | Exterior sidewall of rack base |
| 1450 | Pipette tip tray assembly that includes sub-assembly 330a |
| 1500, 1503 | Rack base |
| 1505 | Rack second alignment member |
| 1507 | Rack base footing |
| 1510 | Bottom of rack base interior |
| 1511 | Long side of rack base interior |
| 1512 | Short side of rack base interior |
| 1513 | Proximal edge of rack base |
| 1514 | Recess wall of rack base |
| 1515 | Recess ledge of rack base |
| 1516 | Exterior sidewall of rack base |
| 1550 | Pipette tip tray assembly that includes sub-assembly 390a |
| 1600, 1603 | Rack base |
| 1605 | Second alignment member |
| 1607 | Rack base footing |
| 1610 | Bottom of rack base interior |
| 1611 | Long side of rack base interior |
| 1612 | Short side of rack base interior |
| 1613 | Proximal edge of rack base |
| 1614 | Recess wall of rack base |
| 1615 | Recess ledge of rack base |
| 1616 | Exterior sidewall of rack base |
| 1650 | Pipette tip tray assembly that includes sub-assembly 1301 |

DETAILED DESCRIPTION

Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Sheets

Provided in certain embodiments is a sheet configured to retain an array of pipette tips, comprising a first surface, a second surface and an array of holes. Each of the pipette tips in the array of pipette tips comprises an exterior surface, an interior surface, a proximal region, a distal region, a proximal opening and a distal opening, and each of the holes in the array of holes in the sheet has a diameter or an effective diameter. The diameter or the effective diameter is equal to, or substantially equal to, (i) an outer diameter of the pipette tip exterior surface, and/or (ii) the pipette tip proximal opening diameter. A sheet often is configured to retain the pipette tips with the center of the proximal opening of each pipette tip, and the center of the distal opening of each pipette tip, concentric with the center of each hole.

Figure 45:
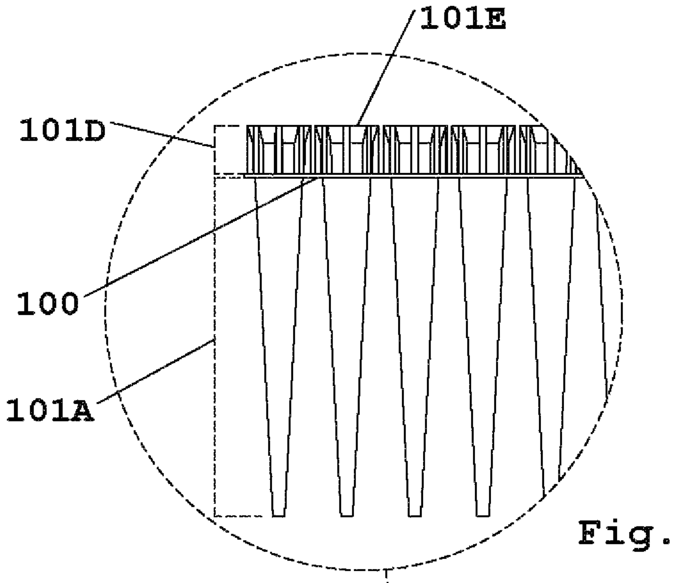
FIG. 45 shows an enlarged view of a portion of the assembly shown in FIG. 44.
Figure 44:
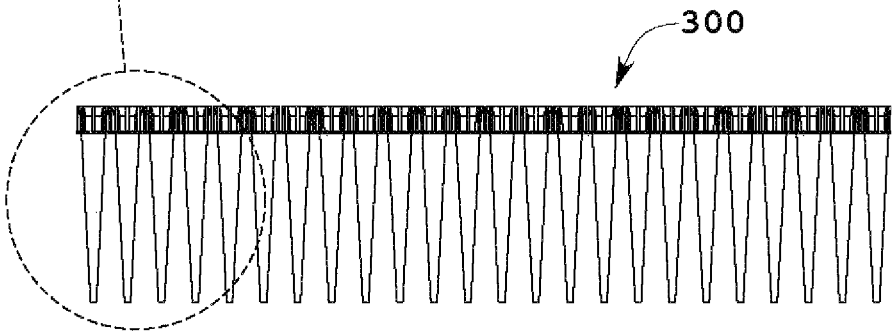
FIG. 44 shows a long side view of the assembly shown in FIG. 36.
Figure 46:
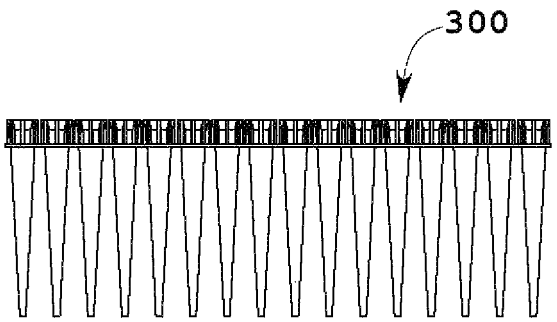
FIG. 46 shows a short side view of the assembly shown in FIG. 36.

The interior of each of the holes comprises an interior edge of the sheet that defines the interior edge of the hole, which is referred to herein as a “hole edge.” In a sheet comprising an array of engaged pipette tips, at least a portion of a hole edge is in contact with at least a portion of an external surface of a pipette tip in a contact zone on the pipette tip. Each hole edge sometimes is configured to contact a portion of an exterior surface of a pipette tip in the contact zone. In certain embodiments, each hole edge contacts an exterior surface in a contact zone of a pipette tip at (i) a portion of a pipette tip proximal region, (ii) a portion of a pipette tip distal region, or (iii) a junction between the proximal region and the distal region of a pipette tip (e.g., an example of embodiment (iii) is shown in FIG. 45). A contact zone sometimes is a single annular region of a pipette tip exterior surface. A sheet often does not include a structure the projects from the first sheet surface and/or the second sheet surface that contacts a portion of a pipette tip, and a contact zone often consists of hole edge portions of a sheet and an exterior surface of a pipette tip. In certain embodiments, a pipette tip engaged in a hole of a sheet includes one or more axially disposed ribs (e.g., a pipette tip sometimes does not include one or more annular ribs). A rib sometimes includes a longitudinal wall surface extending from the pipette tip body, a longitudinal edge surface parallel to the longitudinal wall surface and not in contact with the pipette tip body, and proximal and distal rib edge termini at the end of the rib. A hole edge of a sheet sometimes does not contact a longitudinal edge surface of a pipette tip rib, and in some embodiments, contacts a portion of a longitudinal edge surface of a pipette tip. In certain embodiments, a first surface of a sheet (top surface) contacts distal rib edge termini of pipette tips engaged by the sheet. Pipette tips engaged by a sheet sometimes do not include an annularly disposed shoulder flange, and sometimes do not include one or more sealing rings.

Circular holes in a sheet generally are defined by a diameter and non-circular holes in a sheet generally are defined by an effective diameter. An effective diameter of a non-circular hole is defined by the largest virtual circle that fits within the hole and does not extend beyond the hole perimeter. Non-limiting examples of non-circular holes include oval, quadrilateral, square, rectangular, trapezoid, rhomboid, parallelogram, triangular, star, polygon, pentagon and/or hexagon holes. A non-circular hole sometimes contacts an exterior surface of a pipette at two or more points, and sometimes at about 3, 4, 5, 6, 7, 8, 9 or 10 or more points. Certain non-circular holes sometimes include linear and/or curved sides, and sometimes include pointed and/or curved edges. A curved side or curved edge can include any radius suitable for (i) the hole to receive a pipette tip, and/or (ii) a pipette tip retained by a sheet to receive a nozzle (i.e., pipette) of a fluid dispenser device. All holes in a sheet sometimes are the same shape and size, and sometimes one or more holes (e.g., a first subset of holes) in a sheet differ from other holes (e.g., a second subset of holes) in the sheet by shape and/or size.

Figure 7:
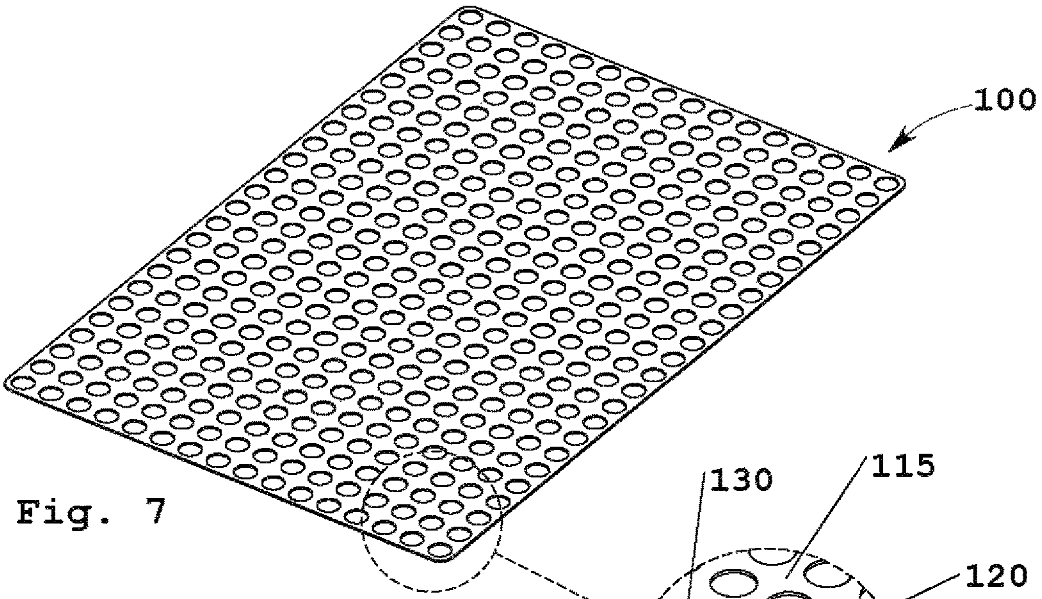
FIG. 7 shows a top perspective view of an embodiment of a static-defeating apparatus, also referred to herein as a pipette tip retention sheet.
Figure 8:
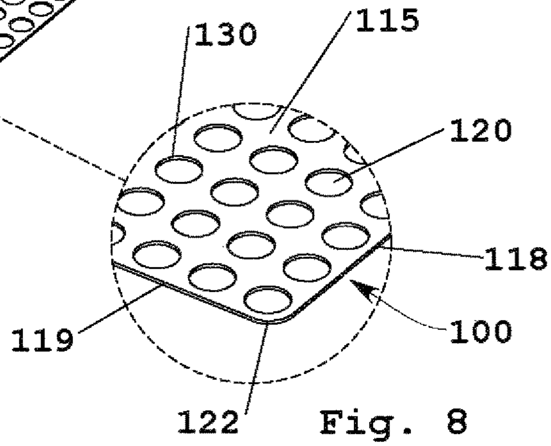
FIG. 8 shows an enlarged view of a portion of the sheet shown in FIG. 7.
Figure 9:
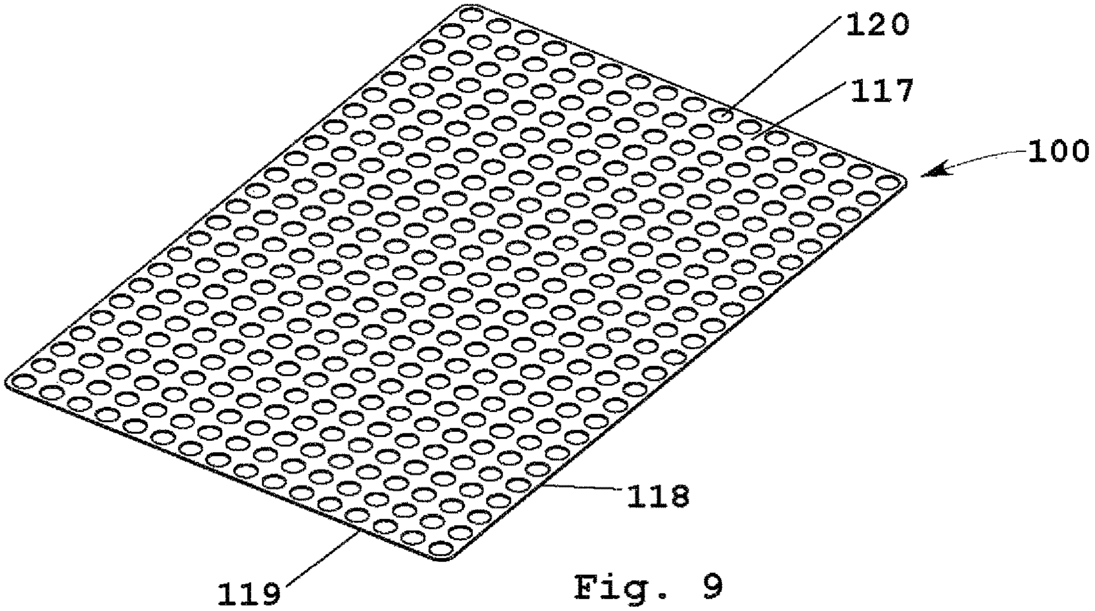
FIG. 9 shows a bottom perspective view of the pipette tip retention sheet embodiment shown in FIG. 7.
Figure 16:
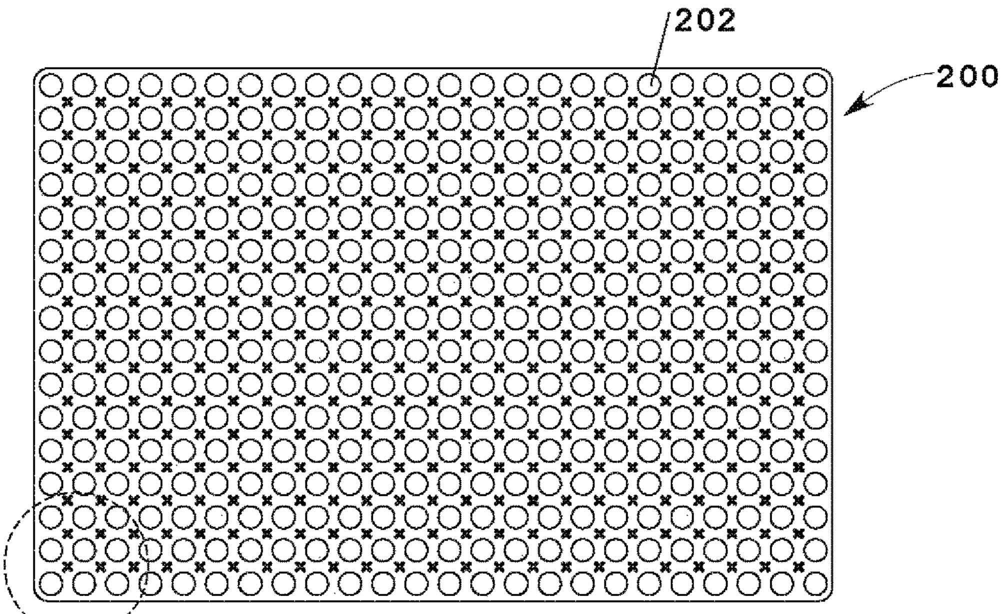
FIG. 16 shows a top view of a pipette tip retention sheet embodiment having X-shaped voids.
Figure 17:
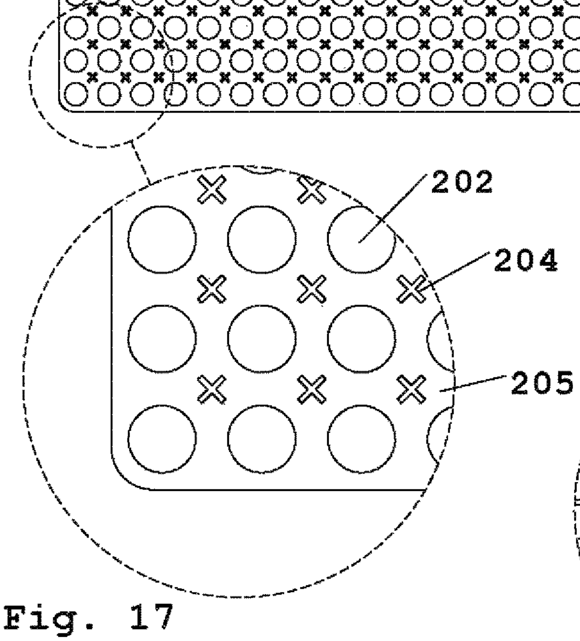
FIG. 17 shows an enlarged view of a portion of the sheet shown in FIG. 16. The bottom view of the sheet embodiment having X-shaped voids is the same as the top view of the sheet shown in FIG. 16.
Figure 19:
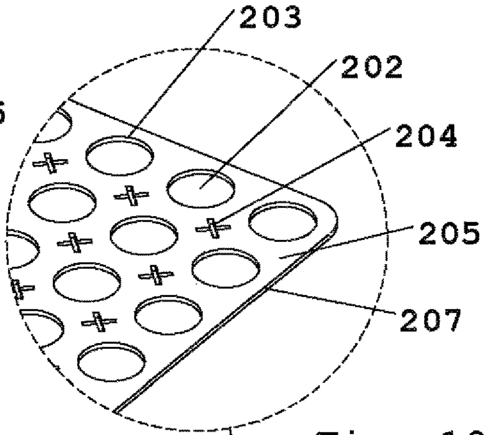
FIG. 19 shows an enlarged view of a portion of the sheet shown in FIG. 18. The bottom perspective view of the sheet embodiment having X-shaped voids is the same as the top perspective view shown in FIG. 18. The short side view and the long side view of the sheet embodiment having X-shaped voids shown in FIG. 16 is the same as the views shown in FIG. 13 and FIG. 15, respectively, for a different sheet embodiment.
Figure 18:
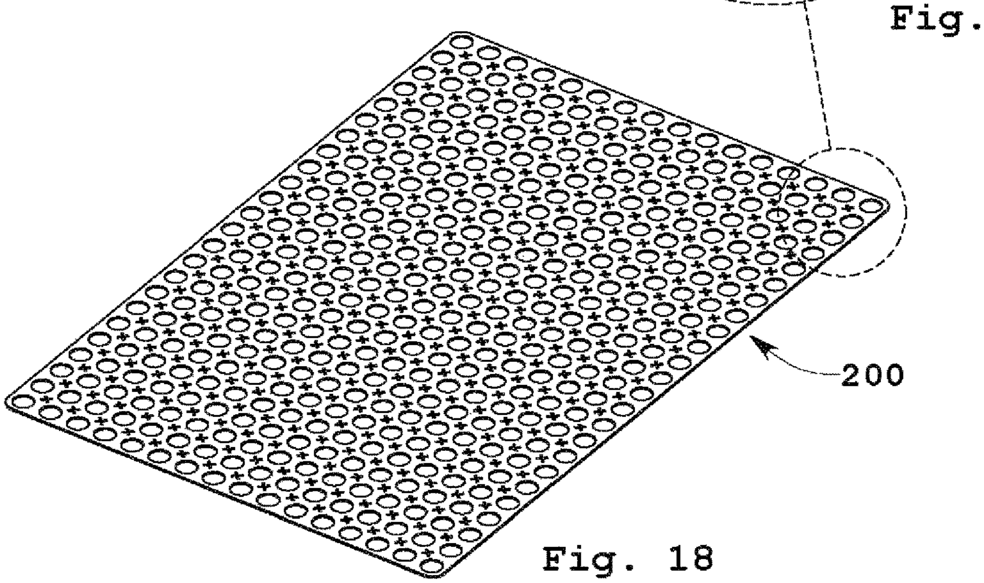
FIG. 18 shows a top perspective view of the sheet embodiment shown in FIG. 16.
Figure 20:
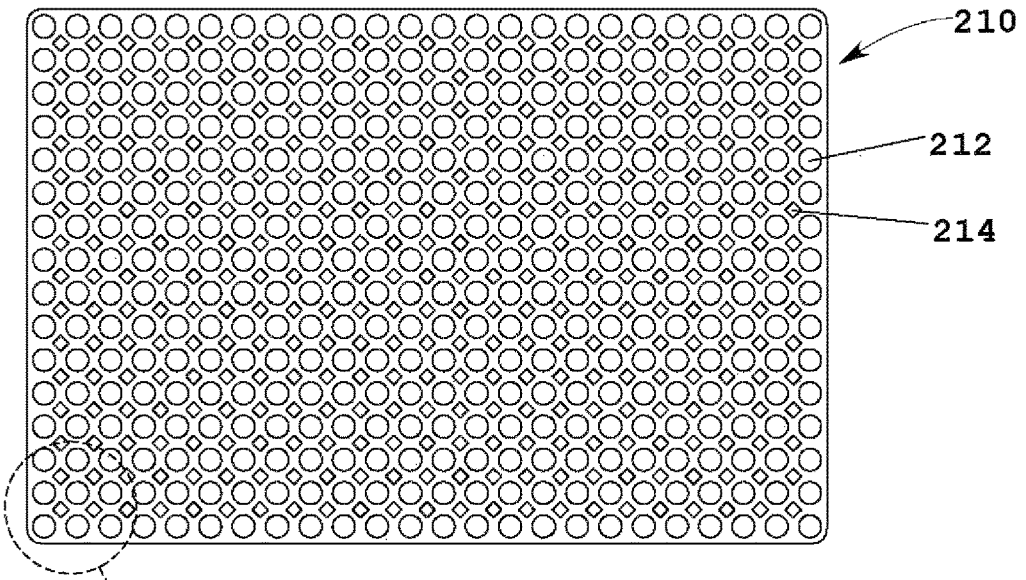
FIG. 20 shows a top view of a pipette tip retention sheet embodiment having diamond-shaped voids.
Figure 21:
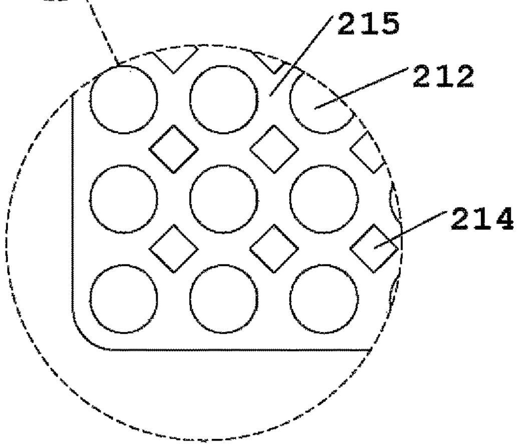
FIG. 21 shows an enlarged view of a portion of the sheet shown in FIG. 20. The bottom view of the sheet embodiment having diamond-shaped voids is the same as the top view of the sheet shown in FIG. 20.
Figure 23:
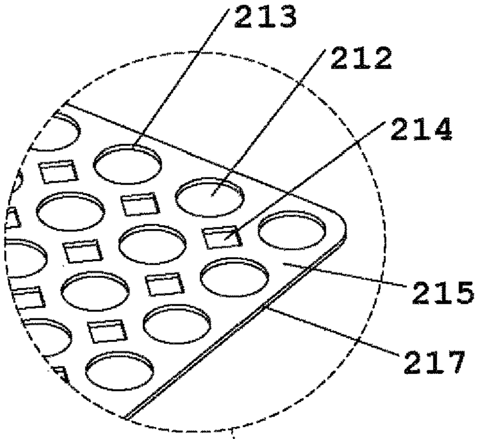
FIG. 23 shows an enlarged view of a portion of the sheet shown in FIG. 22. The bottom perspective view of the sheet embodiment having diamond-shaped voids is the same as the top perspective view shown in FIG. 22. The short side view and the long side view of the sheet embodiment having diamond-shaped voids shown in FIG. 20 is the same as the views shown in FIG. 13 and FIG. 15, respectively, for a different sheet embodiment.
Figure 22:
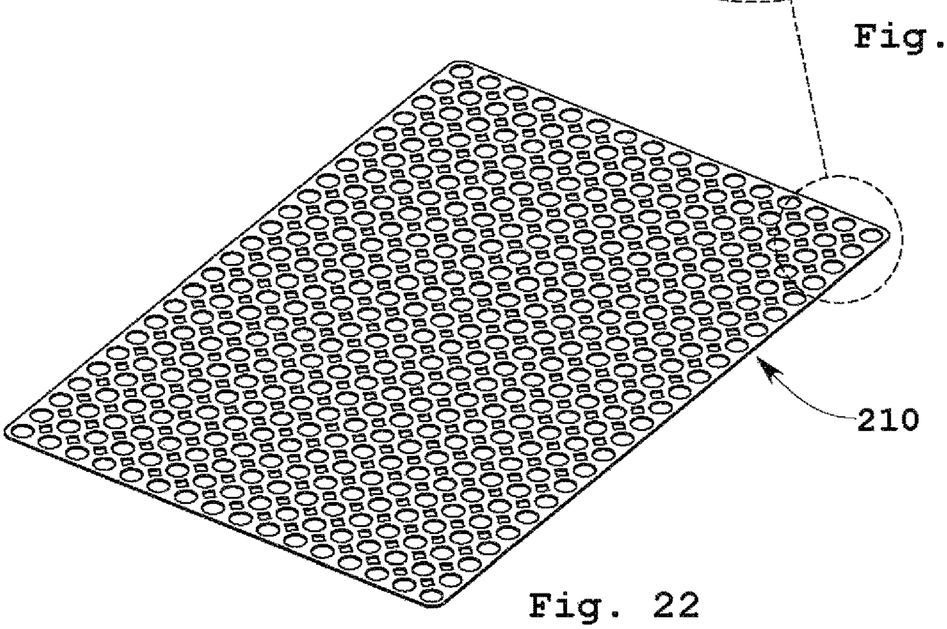
FIG. 22 shows a top perspective view of the sheet embodiment shown in FIG. 20.

Certain non-limiting examples of sheets are shown in the drawings. For example, FIG. 2 and FIG. 7 show a top perspective view of an embodiment of a static-defeating apparatus, which also is referred to as a pipette tip retention sheet or static-defeating material (e.g., sheet 100'; sheet 100). FIG. 8 to FIG. 14 show other views of sheet 100. Features of sheet 100 include circular holes 120, interior hole edges 130 in the holes (i.e., hole edges), first surface 115 (e.g., top surface), second surface 117 (e.g., bottom surface), long edge 118, short edge 119 and corner 122.

For embodiments in which an edge of a hole of the sheet contacts a wall of a pipette tip at a contact zone, the diameter or the effective diameter of each of the holes sometimes is less than, sometimes is equal to, or sometimes is greater than, the outer diameter of the pipette tip exterior surface that contacts the hole edge at the contact zone. Where the diameter or the effective diameter of each of the holes is “X”, and the outer diameter of the pipette tip exterior surface in contact with a hole edge is “Y”, the difference by subtraction between X and Y (i.e., X minus Y or Y minus X) sometimes is about 0.01 inches or less. A difference by subtraction between X and Y generally is determined when pipette tips are not engaged in holes of a sheet (e.g., when the diameter or effective diameter of a hole is less than the external diameter of a pipette tip at the contact zone). In certain embodiments, the difference by subtraction between X and Y sometimes is about 0.009 inches or less, 0.008 inches or less, 0.007 inches or less, 0.006 inches or less, 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less.

In certain embodiments, the diameter or effective diameter of each hole in a sheet is less than the external diameter of each pipette tip that can be engaged with each hole at the contact zone of the pipette tip, and the difference by subtraction between X and Y is about 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less, where the difference is determined when the pipette tips are not in association with the sheet.

A distance between a point on a hole edge surface and a point on an external surface of a pipette tip near the point on the hole edge surface can be defined as a point-to-point distance. A point-to-point difference can be determined for a hole having a diameter or effective diameter that is larger or smaller than the external diameter of a pipette tip at a contact zone. A minimum point-to-point distance between a hole edge surface and an external surface of a pipette tip in the contact zone of the pipette tip generally is the shortest distance between any point on the hole edge and any point on the external surface of the pipette tip in the contact zone. A minimum point-to-point distance between a hole edge surface and an external surface of a pipette tip in the contact zone sometimes is about 0.01 inches or less, 0.009 inches or less, 0.008 inches or less, 0.007 inches or less, 0.006 inches or less, 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less. A point-to-point difference generally is determined when pipette tips are not engaged in holes of a sheet (e.g., when the external diameter of a pipette tip is greater than the diameter or effective diameter of a hole of a sheet).

In certain embodiments, the diameter or effective diameter of each hole in a sheet is less than the external diameter of each pipette tip that can be engaged with each hole at the contact zone of the pipette tip, and the minimum point-to-point distance between a hole edge surface and an external surface of a pipette tip in the contact zone is about 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less, where the minimum point-to-point distance is determined when the pipette tips are not in association with the sheet.

In certain embodiments, a hole edge thickness in a sheet defines a wall surface, and the wall surface sometimes is about perpendicular to (i.e., an angle of 90 degrees or about 90 degrees), or at a non-perpendicular angle to, the first surface of the sheet (i.e., the top surface of the sheet; the proximal surface of the sheet). A hole edge wall oriented at a non-perpendicular angle with respect to a first surface of a sheet can be about 90.25 degrees to about 160 degrees with respect to the first surface (e.g., about 95, 100, 105, 110, 115, 120, 125, 130, 135, 140, 145, 150 or 155 degrees with respect to the first surface), or can be about 89.75 degrees to about 30 degrees with respect to the first surface (e.g., about 35, 40, 45, 50, 55, 60, 65, 70, 75, 80 or 85 degrees with respect to the first surface), in some embodiments. A hole edge wall often is flat or substantially flat and sometimes is curved. A hole edge wall sometimes is not tapered, is not non-perpendicular, and is perpendicular or about perpendicular to the first surface of the sheet.

Pipette tips sometimes are retained in a sheet by friction between the exterior wall of each of the pipette tips and the edge of each hole in contact with each pipette tip. An interior edge of a hole, or portion thereof, sometimes is configured to contact the pipette tip exterior surface by an interference fit. The edge of each of the holes comprises an adhesive in some embodiments, which can facilitate retention of pipette tips in the sheet, and in some embodiments, the edge of each of the holes does not include an adhesive.

Figure 35:
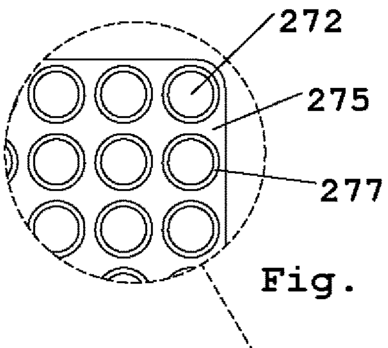
FIG. 35 shows an enlarged view of a portion of the sheet shown in FIG. 34. The short side view and the long side view of the sheet embodiment shown in FIG. 34 is the same as the views shown in FIG. 13 and FIG. 15, respectively.
Figure 34:
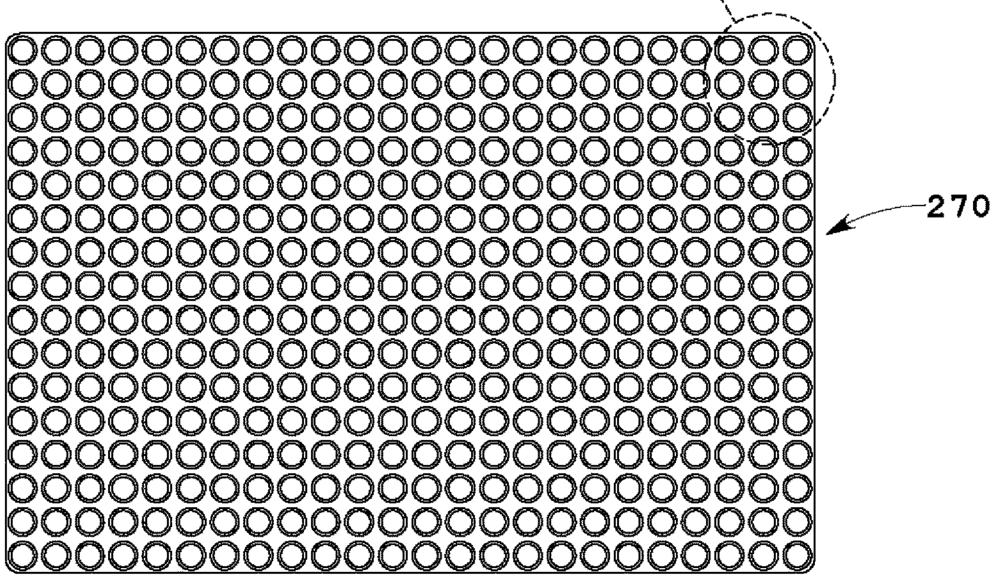
FIG. 34 shows a bottom view of a pipette tip retention sheet embodiment having circular holes configured to receive pipette tips, around which holes is disposed a region (e.g., annular region) suitable for joining a proximal terminus of a pipette tip to the second surface of the sheet.
Figure 36:
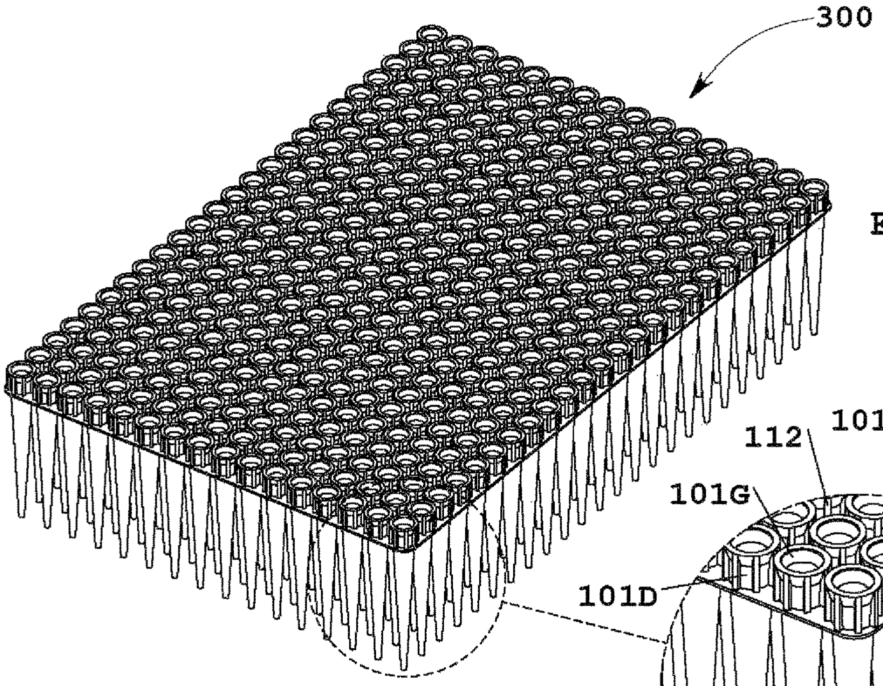
FIG. 36 shows a top perspective view of an assembly comprising a pipette tip retention sheet embodiment having circular holes and an array of pipette tips disposed in and retained by edges of the sheet in the holes.
Figure 37:
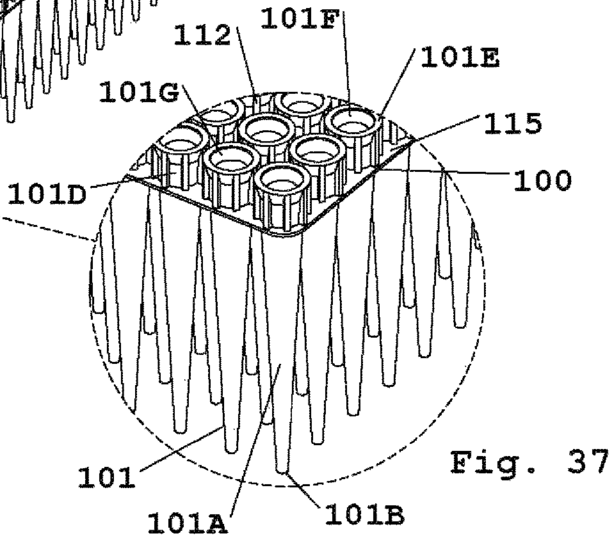
FIG. 37 shows an enlarged view of a portion of the assembly shown in FIG. 36.
Figure 39:
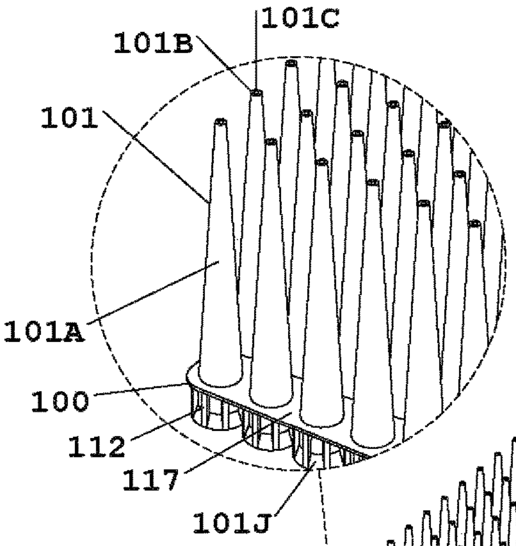
FIG. 39 shows an enlarged view of a portion of the assembly shown in FIG. 38.
Figure 38:
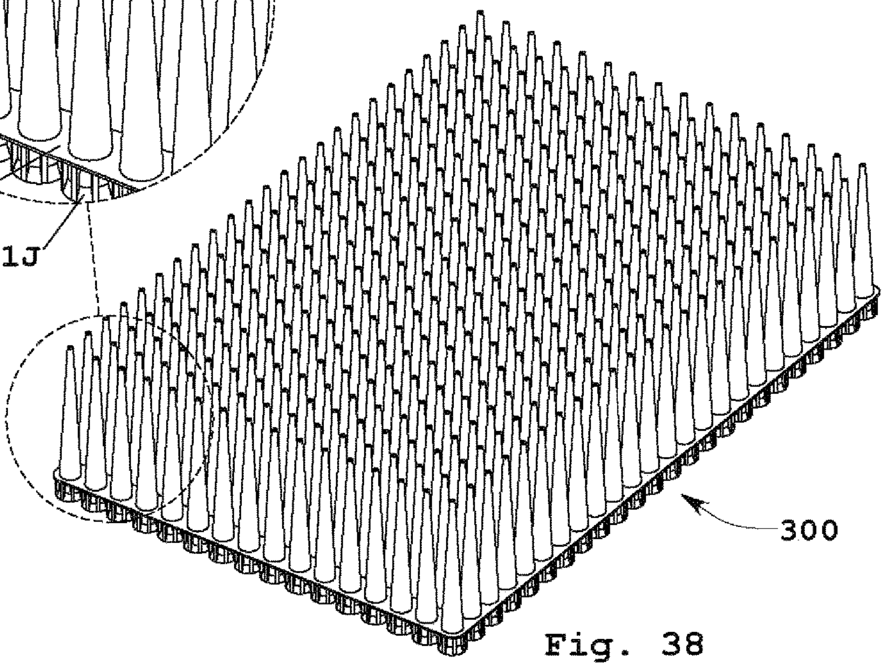
FIG. 38 shows a bottom perspective view of the assembly shown in FIG. 36
Figure 40:
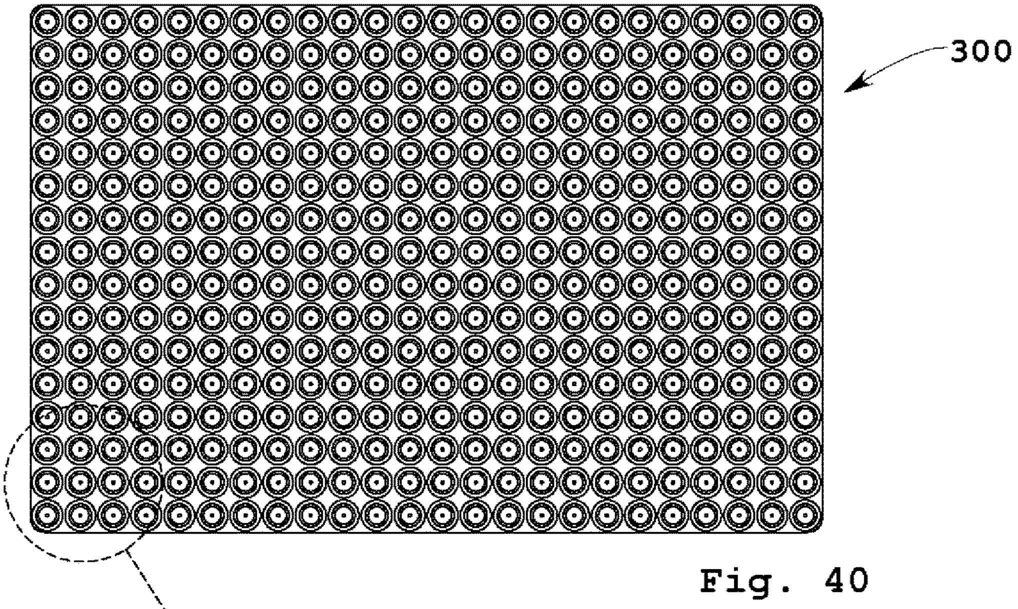
FIG. 40 shows a top view of the assembly shown in FIG. 36
Figure 41:
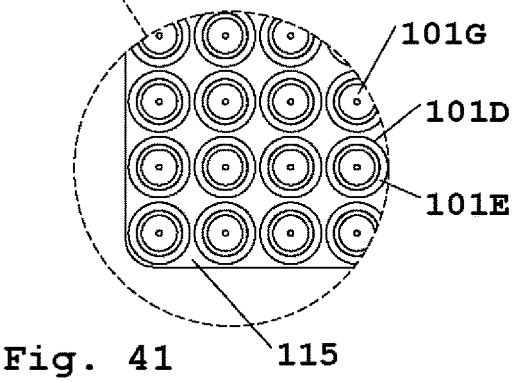
FIG. 41 shows an enlarged view of a portion of the assembly shown in FIG. 40.
Figure 43:
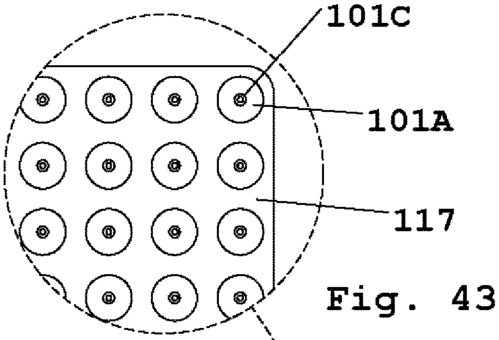
FIG. 43 shows an enlarged view of a portion of the assembly shown in FIG. 42.
Figure 42:
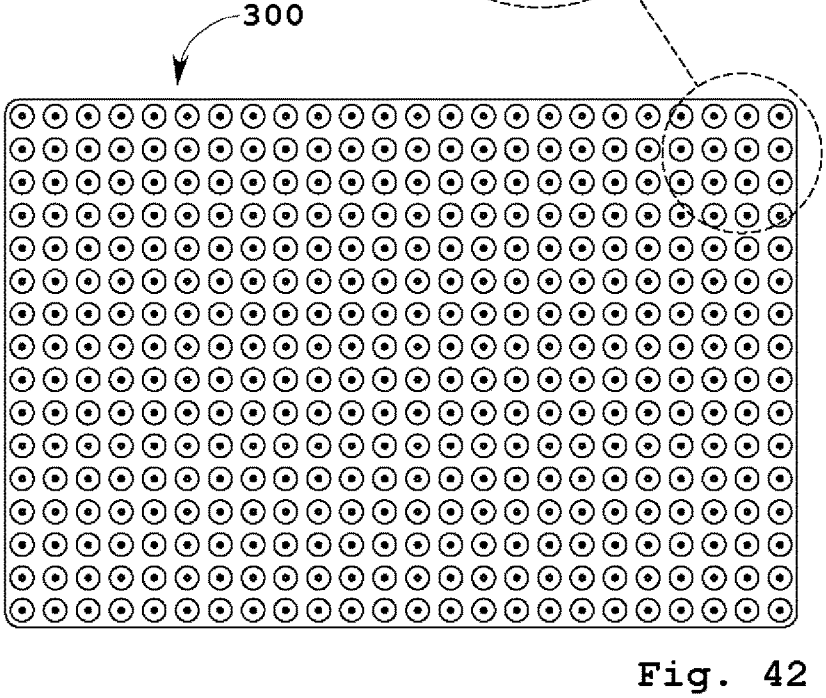
FIG. 42 shows a bottom view of the assembly shown in FIG. 36

In certain embodiments, a portion around each of the holes on the second surface of the sheet (i.e., bottom surface of the sheet) is configured to contact the proximal region terminus of each pipette tip. Pipette tips can be joined to the second surface of a sheet using any suitable method. The portion around each of the holes on the second surface sometimes comprises an adhesive, which can facilitate retention of pipette tips in the sheet. In certain embodiments, a sheet includes an adhesive covering all or substantially all of the second surface, where the adhesive is any adhesive suitable for joining pipette tips to the second surface (e.g., contact adhesive). In some embodiments, pipette tips are joined to the second surface of the sheet not using an adhesive, and sometimes pipette tips are welded (e.g., sonically welded) to the second surface of a sheet. A particular non-limiting example of a sheet embodiment is shown in FIG. 34 and FIG. 35. Sheet embodiment 270 includes an annular portion 277 surrounding each hole 272 on the second surface 275 of the sheet, that can contact, and join with, a proximal region terminus of a pipette tip.

For embodiments in which a proximal region terminus surface of a pipette tip is joined to a second surface of a sheet, the diameter or the effective diameter of each of the holes sometimes is less than, sometimes is equal to, or sometimes is greater than, the diameter of the pipette tip proximal opening (e.g., the outer diameter of the pipette tip proximal opening). Where the diameter or the effective diameter of each of the holes is "X", and the diameter of the pipette tip proximal opening is "Z" (e.g., the outer diameter of the pipette tip proximal opening is "Z"), the difference by subtraction between X and Z (i.e., X minus Z or Z minus X) sometimes is about 0.01 inches or less. In certain embodiments the difference by subtraction between X and Z sometimes is about 0.009 inches or less, 0.008 inches or less, 0.007 inches or less, 0.006 inches or less, 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less.

Figure 24:
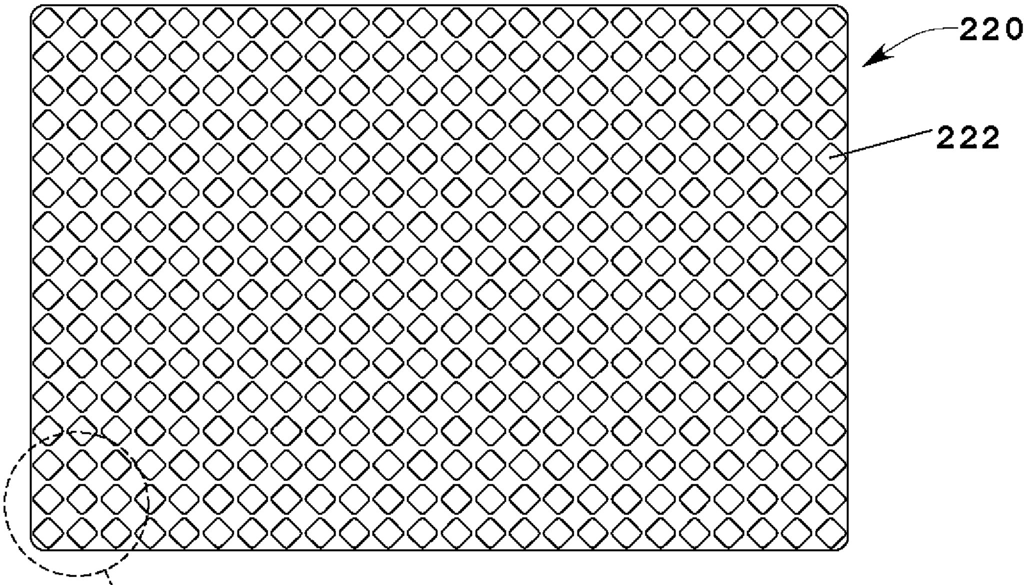
FIG. 24 shows a top view of a pipette tip retention sheet embodiment having diamond-shaped holes configured to receive pipette tips.
Figure 25:
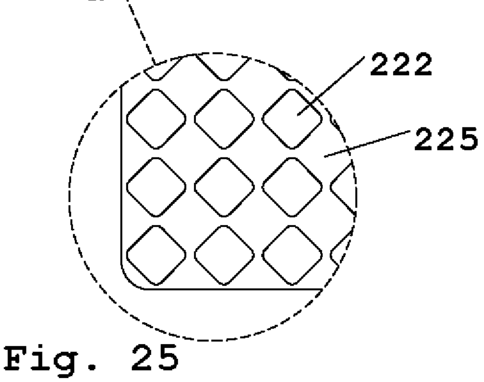
FIG. 25 shows an enlarged view of a portion of the sheet shown in FIG. 24. The bottom view of the sheet embodiment having diamond-shaped holes is the same as the top view of the sheet shown in FIG. 24. The short side view and the long side view of the sheet embodiment having diamond-shaped holes shown in FIG. 24 is the same as the views shown in FIG. 13 and FIG. 15, respectively, for a different sheet embodiment.
Figure 27:
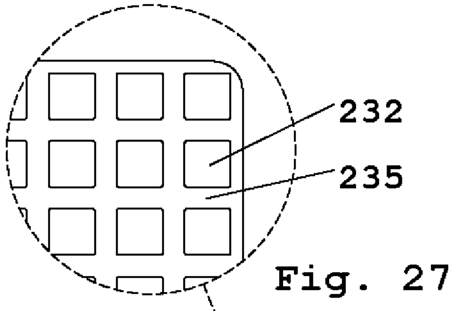
FIG. 27 shows an enlarged view of a portion of the sheet shown in FIG. 26. The bottom view of the sheet embodiment having square-shaped holes is the same as the top view of the sheet shown in FIG. 26. The short side view and the long side view of the sheet embodiment having square-shaped holes shown in FIG. 26 is the same as the views shown in FIG. 13 and FIG. 15, respectively, for a different sheet embodiment.
Figure 26:
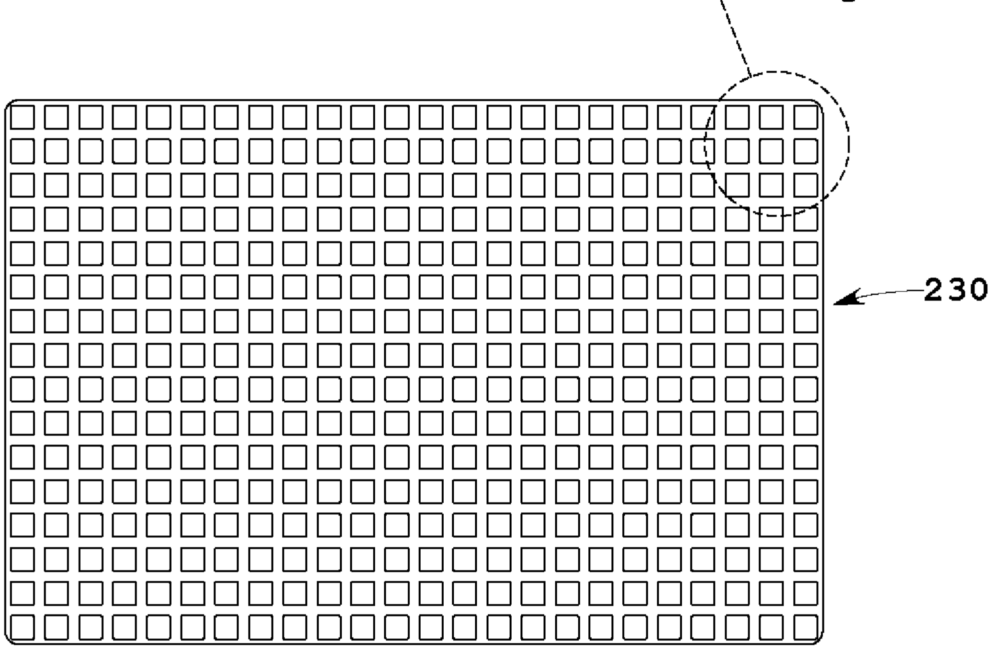
FIG. 26 shows a top view of a pipette tip retention sheet embodiment having square-shaped holes configured to receive pipette tips.
Figure 28:
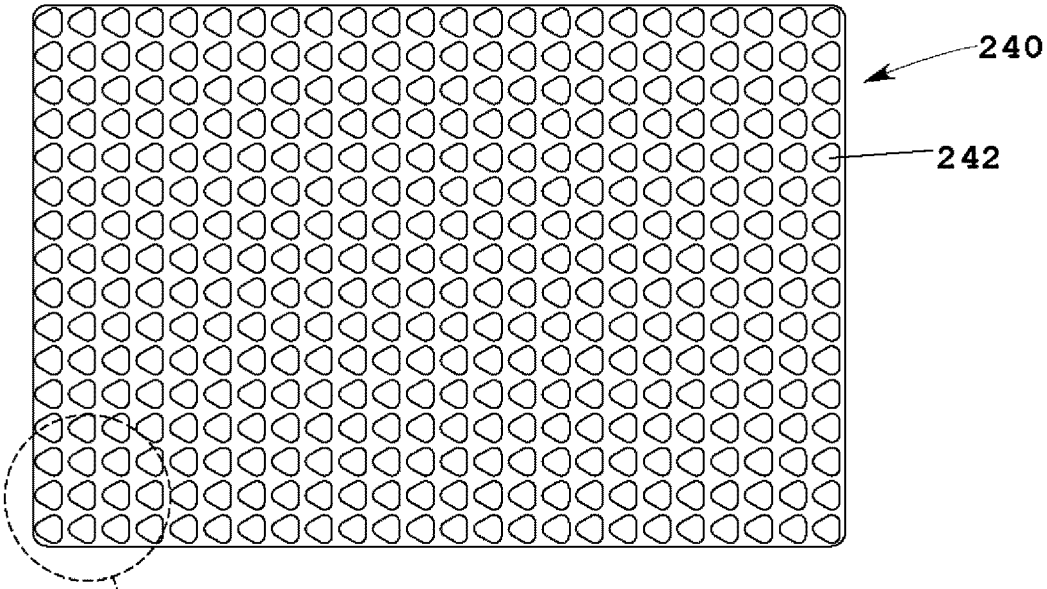
FIG. 28 shows a top view of a pipette tip retention sheet embodiment having triangle-shaped holes configured to receive pipette tips.
Figure 29:
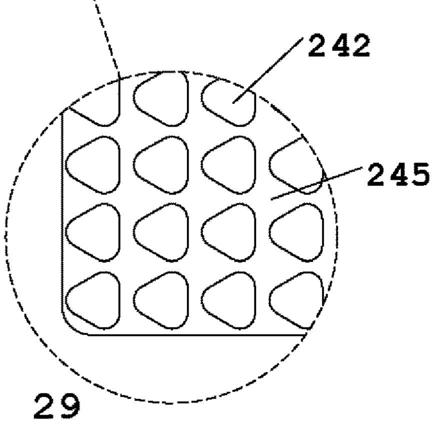
FIG. 29 shows an enlarged view of a portion of the sheet shown in FIG. 28. The bottom view of the sheet embodiment having triangle-shaped holes is the same as the top view of the sheet shown in FIG. 28. The short side view and the long side view of the sheet embodiment having triangle-shaped holes shown in FIG. 28 is the same as the views shown in FIG. 13 and FIG. 15, respectively, for a different sheet embodiment.
Figure 31:
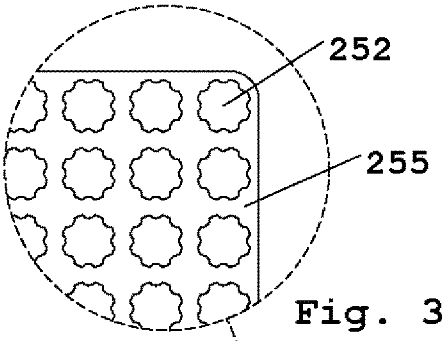
FIG. 31 shows an enlarged view of a portion of the sheet shown in FIG. 30. The bottom view of the sheet embodiment having star-shaped holes is the same as the top view of the sheet shown in FIG. 30. The short side view and the long side view of the sheet embodiment having star-shaped holes shown in FIG. 20 is the same as the views shown in FIG. 13 and FIG. 15, respectively, for a different sheet embodiment.
Figure 30:
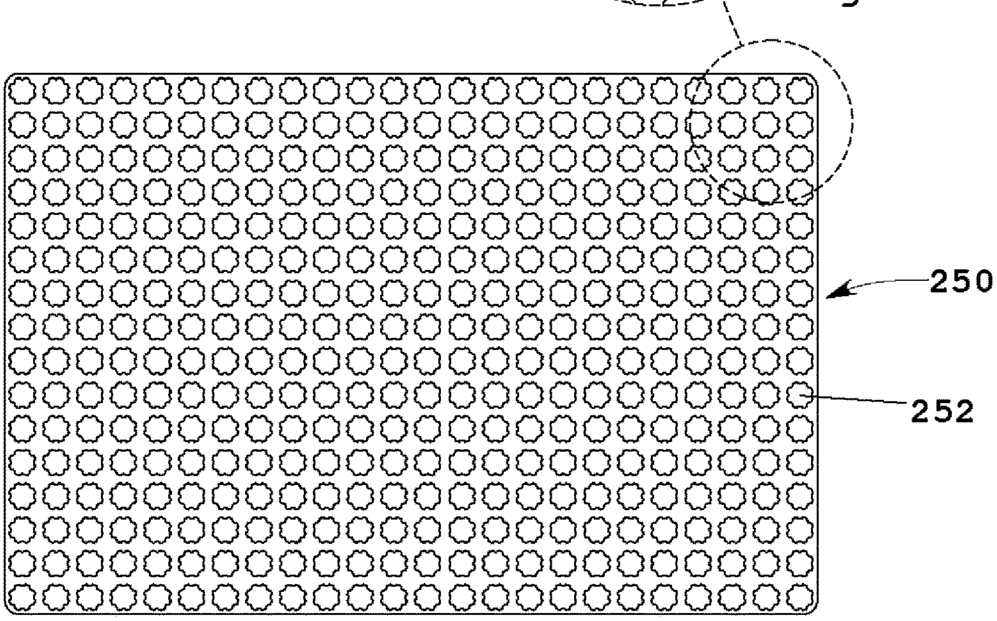
FIG. 30 shows a top view of a pipette tip retention sheet embodiment having star-shaped holes configured to receive pipette tips.
Figure 32:
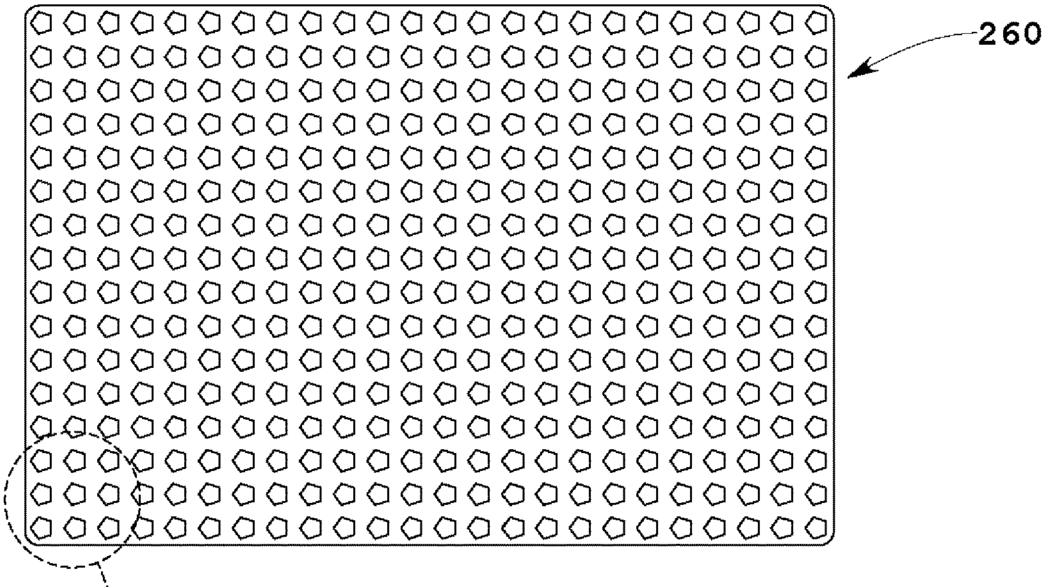
FIG. 32 shows a top view of a pipette tip retention sheet embodiment having polygon-shaped holes configured to receive pipette tips.
Figure 33:
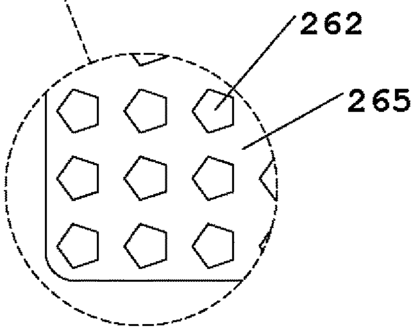
FIG. 33 shows an enlarged view of a portion of the sheet shown in FIG. 32. The bottom view of the sheet embodiment having polygon-shaped holes is the same as the top view of the sheet shown in FIG. 32. The short side view and the long side view of the sheet embodiment having polygon-shaped holes shown in FIG. 32 is the same as the views shown in FIG. 13 and FIG. 15, respectively, for a different sheet embodiment.

Certain non-limiting examples of sheets having non-circular holes are shown in FIG. 24 to FIG. 33. For example, FIG. 24 and FIG. 25 show sheet 220 that includes diamond-shaped holes 222 each having linear sides and curved corners (e.g., rounded corners). FIG. 26 and FIG. 27 show sheet 230 that includes square-shaped holes 232 each having linear sides and non-rounded corners (e.g., pointed corners). FIG. 28 and FIG. 29 show sheet 240 that includes triangle-shaped holes 242 having linear sides and curved corners (e.g., rounded corners). FIG. 30 and FIG. 31 show sheet 250 that includes star-shaped holes 252 each having linear and curved elements and provide at least eight (8) points of contact with a pipette tip. FIG. 32 and FIG. 33 show sheet 260 that includes polygon-shaped holes 262 (e.g., pentagon-shaped holes) each having linear sides and non-rounded corners (e.g., pointed corners).

The distance between the center of a hole in a sheet to the center of an adjacent hole in a sheet is referred to herein as a "center-to-center" distance. In certain embodiments, the center-to-center distance is the same for all holes in the sheet (e.g., the center-to-center distance is uniform for all holes in the sheet). In some embodiments, the center-to-center distance for two or more holes in a sheet (e.g., a first subset of holes) is different than the center-to-center distance for two or more other holes in the sheet (e.g., a second subset of holes). The center-to-center distance is any suitable distance for a sheet to retain pipette tips of a given size. In certain embodiments, the center-to-center distance between each hole to an adjacent hole is about 0.05 inches or greater (e.g., about 0.07 inches to about 0.40 inches; about 0.08 inches to about 0.36 inches; about 0.12 inches (e.g., for a 384 pipette tip array); about 0.354 inches (e.g., for a 96 pipette tip array); about 0.089 inches (e.g., for a 1536 pipette tip array)).

A sheet sometimes includes one or more voids, and sometimes a sheet includes holes for being in association with pipette tips and no voids. In some embodiments, a sheet includes one or more portions of reduced thickness on the first surface or the second surface, or the first surface and the second surface, and sometimes a sheet includes no regions of reduced thickness. A void or portion of reduced thickness, if present, sometimes is located between four "quadrilaterally" arranged holes in a sheet. Four "quadrilaterally" arranged holes are a group of four adjacent holes in which the center of each hole coincides with each point of a virtual quadrilateral superimposed over the holes. The virtual quadrilateral can be any suitable quadrilateral, which often is a square, sometimes is a rectangle, and at times is a trapezoid, rhombus or parallelogram. Four "quadrilaterally" arranged holes typically define a cross point at the intersection of two virtual lines, where each virtual line intersects the centers of two diagonal holes. The center of a void or a portion of reduced thickness sometimes coincides with such a cross point. This cross point also is located in the same manner for "quadrilaterally arranged pipette tip proximal openings" addressed herein. The perimeter of a void or a portion of reduced thickness sometimes is defined by a circle, oval, quadrilateral, square, rectangular, trapezoid, rhombus, parallelogram, triangle, star, X-shape, Y-shape, Z-shape, C-shape, S-shape, sigmoid, polygon, pentagon and/or hexagon. The perimeter of a non-circular void, or perimeter of a non-circular portion of reduced thickness, sometimes includes linear and/or curved sides, and sometimes includes pointed and/or curved edges. For embodiments in which a sheet includes voids, the sheet sometimes is netted (e.g., the sheet is or includes a netting; the sheet is or includes a net) and/or the sheet sometimes is webbed (e.g., the sheet is or includes a webbing; the sheet is or includes a web). Without being limited by theory, an interference fit between edges of a hole, or portions thereof, with a pipette tip, can cause stress in the sheet around the hole and can deform the sheet. Inclusion of voids in a sheet can relieve such stress and allow a sheet to remain flat, or substantially flat, when holes in the sheet retain pipette tips by an interference fit.

Certain non-limiting examples of sheet embodiments that include voids are shown in FIG. 16 to FIG. 23. FIG. 16 to FIG. 19 show sheet 200 that includes circular holes 202, internal hole edges 203, X-shaped voids 204, first surface 205 and long edge 207. FIG. 20 to FIG. 23 show sheet 210 that includes circular holes 212, diamond-shaped voids 214 having linear sides and pointed corners, first surface 215 and long edge 217. Each diamond shaped void alternatively could include one or more curved sides (e.g., where each curve follows the contour of adjacent circular holes) and/or alternatively could include curved corners (e.g., rounded corners).

In some embodiments, a sheet provided for association with pipette tips sometimes does not include holes. Such a sheet sometimes is a continuous sheet (e.g., a sheet having a surface not interrupted by holes or voids (e.g., a foil sheet without holes or voids); a sheet not including perforations; a sheet not including slits), sometimes is not a continuous sheet, sometimes includes voids (e.g., voids not concentric with pipette tip openings (described herein)), sometimes does not include voids, sometimes is a netting (e.g., a net or web), and sometimes is not a netting. In some embodiments, a second surface of a sheet that does not include holes for association with pipette tips is joined to the proximal terminus of pipette tips in an array of pipette tips. In such embodiments, the sheet often is configured to be pierced by nozzles that engage pipette tips in the array. In certain embodiments, a sheet that does not include holes for association with pipette tips is configured to be pierced, to receive the exterior wall of pipette tips in an array of pipette tips, and to retain pipette tips in the array.

A sheet that does not include holes in association with pipette tips sometimes includes regions of reduced thickness, where such regions often are located at portions of the sheet that (i) are pierced by a pipette tip, or (ii) are pierced by a nozzle of a fluid dispensing device. Such regions of reduced thickness often are of a thickness that permits piercing by a pipette tip or fluid dispensing device using commercially available processes.

A sheet that does not include holes in association with pipette tips sometimes includes a punch-through structure configured to (i) receive a nozzle of a fluid dispensing device, or (ii) receive a pipette tip. A punch-through structure sometimes is a perforated shape (e.g., a perforated circle) or a slit (e.g., X-shaped slit, Y-shaped slit, I-shaped slit). A punch-through structure sometimes is configured to retain material in association with the sheet when a nozzle or pipette tip is inserted into the sheet. In certain embodiments, a punch-through structure can include perforations that define a first part of a shape (e.g., a circle) and a second part of the shape may not include perforations. The perforations in such a punch-through structure can break away upon insertion of a nozzle or pipette tip and generate a flap, and the second part of the shape can function as a tab that retains the flap in association with the sheet, thereby reducing the possibility that the flap dissociates from the sheet. For embodiments in which the sheet has a continuous surface (e.g., no perforations; no slits), the sheet often comprises or is manufactured from a material that permits (i) a nozzle to pierce the sheet and engage a pipette tip associated with the sheet, or (ii) or pipette tip to pierce the sheet and be retained by the sheet (e.g., aluminum foil).

In certain embodiments, a sheet comprises a uniform thickness, or a substantially uniform thickness. Sometimes a sheet includes regions of reduced thickness (e.g., hollowed portions) and/or includes voids as described herein. The thickness of a sheet at a hole (e.g., the vertical thickness of a hole edge with respect to the first surface of the sheet (i.e., the top surface of the sheet)) sometimes is about 0.0001 inches to about 0.25 inches (e.g., about 0.005 inches to about 0.015 inches; about 0.006 inches to about 0.014 inches; about 0.007 inches to about 0.013 inches; about 0.008 inches to about 0.012 inches; about 0.009 inches to about 0.011 inches; about 0.01 inches in thickness).

Figure 138:
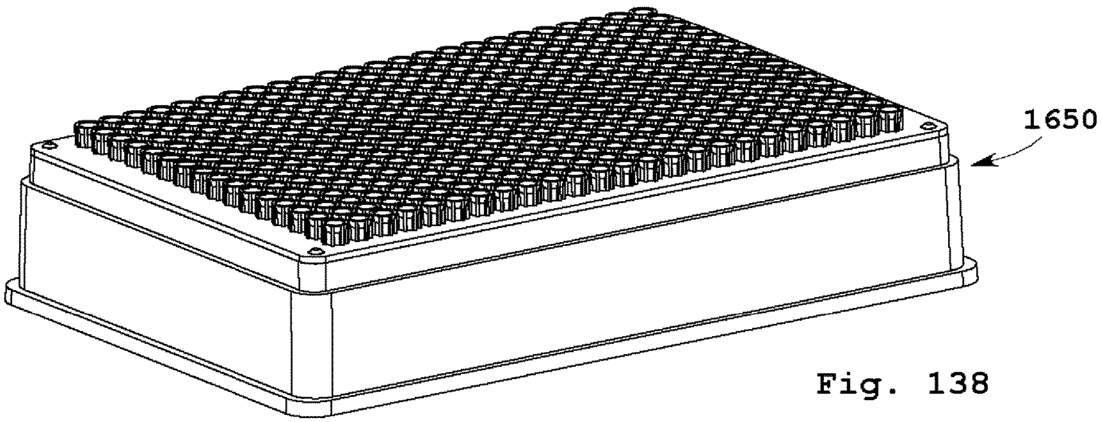
FIG. 138 shows a top perspective view of an assembly having a tray and one unit of the assembly having the retention sheet and pipette tips shown in FIG. 135.

The thickness of a sheet at holes in the sheet sometimes is the same thickness or about the same thickness as for a pipette tip receptacle plate that can be joined to a rack base, and sometimes such a sheet is utilized as a receptacle plate (e.g., FIG. 138). In such embodiments, the thickness of a sheet at a hole sometimes is about 0.01 inches to about 0.25 inches (e.g., about 0.01 inches thick to about 0.1 inches thick; about 0.03 inches thick to about 0.7 inches thick, about 0.04 inches thick to about 0.06 inches thick; about 0.02, 0.03, 0.04, 0.05, 0.06, 0.07, 0.08 or 0.09 inches thick).

A sheet sometimes includes or is constructed from a foil (e.g., aluminum foil), and the thickness of such a sheet at a hole sometimes is about 0.0001 inches to about 0.05 inches thick (e.g., about 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04 inches thick), and sometimes is about 0.0001 inches to about 0.001 inches thick.

A sheet sometimes is of a thickness and is manufactured from a material that permits flexibility. A sheet sometimes can bend and can be flexed with application of a force to a portion of a sheet (e.g., FIGS. 47, 48, 60 and 61). The force sometimes is the force of gravity, and sometimes the force is manually applied. A sheet, in some embodiments, can deflect or flex about 1 inch to about 3 inches or more (e.g., about 2 inches to about 2.75 inches; about 2.5 inches) under the force of gravity when pipette tips are retained by the sheet (e.g., for an array of 384 pipette tips retained by the sheet having a long edge length of about 4.25 inches). A sheet can have any suitable long edge length, which sometimes is about 4 inches to about 4.5 inches (e.g., about 4.25 inches in length). Deflection or flexion for a sheet having or not having pipette tips is determined by fixing a first shorter side of a sheet, applying a force to the opposite second shorter side of the sheet (e.g., application of the force of gravity), and measuring the distance along an axis perpendicular to the sheet surface between the first shorter side and the second shorter side (i.e., the axis perpendicular to the sheet surface when the sheet is in a flat or planar orientation). In embodiments for which a sheet readily flexes (e.g., flexes at least 1 inch under the force of gravity), such a sheet is not typically considered rigid and pipette tips retained by such a sheet typically are not rigidly retained.

A sheet sometimes includes a polymer and/or is manufactured from a polymer material. Non-limiting examples of polymers include low density polyethylene (LDPE), high-density polyethylene (HDPE), polypropylene (PP), polyester (PE), high impact polystyrene (HIPS), polyvinyl chloride (PVC), amorphous polyethylene terephthalate (APET), polycarbonate (PC) and the like. A sheet sometimes comprises or is manufactured from a metal (e.g., aluminum; aluminum foil (e.g., aluminum foil comprising adhesive on one surface (e.g., contact adhesive on one surface)) and other materials.

A sheet sometimes includes an electrically conductive material, which can be any suitable material that can contain movable electric charges. An electrically conductive material sometimes is, or includes, a conductive metal, non-limiting examples of which include platinum (Pt), palladium (Pd), copper (Cu), nickel (Ni), silver (Ag) and gold (Au). An electrically conductive metal may be in any form in or on a sheet suitable for managing static charge, such as metal flakes, metal powder, metal strands or coating of metal, for example. An electrically conductive material sometimes is or includes carbon. A sheet sometimes includes about 5% to about 40% or more carbon by weight (e.g., 7-10%, 9-12%, 11-14%, 13-16%, 15-18%, 17-20%, 19-22%, 21-24%, 23-26%, 25-28%, 27-30%, 29-32%, 32-34%, 33-36%, or 35-38% carbon by weight).

A sheet sometimes includes one or more antimicrobial materials (also referred to as "antimicrobial substances"). An antimicrobial material may be coated on a surface (e.g., first surface and/or second surface) and/or impregnated in a material used to manufacture a sheet, in some embodiments. An antimicrobial material sometimes is a metal, non-limiting examples of which include silver, gold, platinum, palladium, copper, iridium, tin, antimony, bismuth, zinc cadmium, chromium, and thallium. An antimicrobial material sometimes is an inorganic particle (e.g., barium sulfate, calcium sulfate, strontium sulfate, titanium oxide, aluminum oxide, silicon oxide, zeolites, mica, talcum, and kaolin), a halogenated hydrocarbon (e.g., halogenated derivatives of salicylanilides, carbanilides, bisphenols, halogenated mono- and poly-alkyl and aralkyl phenols, chlorinated phenols, resorcinol derivatives, diphenyl ethers, anilides of thiophene carboxylic acids, chlorhexidines), quaternary salts (e.g., ammonium compounds), sulfur active compounds and the like.

A sheet sometimes is configured to permit one pipette tip, or a group of pipette tips, to be used separately from other pipette tips associated with the sheet. A sheet sometimes includes perforations around one pipette tip, or around a group of pipette tips, that permit the one pipette tip or the group of pipette tips to be separated and used separately from other pipette tips associated with the sheet. In certain embodiments, a pipette tip fluid dispenser includes fewer nozzles than the number of pipette tips associated with a sheet. In such embodiments, nozzles of the dispenser can be caused to engage a subset of the pipette tips associated with the sheet, and nozzles engaged with the subset of pipette tips can be caused to separate from the sheet (e.g., tear away from the sheet) the subset of pipette tips along with the portion of the sheet associated with the subset of pipette tips and defined by perforations. Similar embodiments can be employed for a single-nozzle fluid dispenser for a single pipette tip associated with a sheet. In some embodiments, a sheet includes, or is manufactured from, a material configured to tear under a force applied by fluid dispensing device, and a sheet need not include perforations in such embodiments. In such embodiments, a sheet sometimes includes, or is manufactured from, a foil (e.g., aluminum foil) or a netting or webbing that can tear under a force applied by a fluid dispensing device.

A sheet sometimes includes a portion around one or more holes, or a portion in or around a region that will be pierced by a pipette tip or nozzle of a fluid dispensing device, having a color (hereafter "a colored portion") different than another adjacent portion of the sheet. The colored portion sometimes is annularly disposed around a hole or a portion to be associated with a pipette tip (e.g., annular portion 277 in FIG. 35 sometimes is a colored portion). A sheet comprising colored portions can include one or more colors (e.g., 2, 3, 4, 5, 6, 7, 8, 9, 10 different colors). Color(s) can be provided in any suitable arrangement or pattern on a sheet and can be provided in any suitable manner (e.g., by an ink, a dye (e.g., and ink or dye in an adhesive).

Sheet Assemblies

A sheet described herein can be provided in an assembly that includes an array of pipette tips, where each pipette tip in the array is in association with a hole in the sheet. In some embodiments, an assembly consists of a sheet and an array of pipette tips. In certain embodiments, all of the holes in the sheet are in association with pipette tips, and in some embodiments, a subset (e.g., a first subset) of the holes in the sheet are in association with pipette tips and another subset (e.g., a second subset) of the holes in the sheet are not in association with pipette tips. Certain embodiments are directed in part to a static-defeating apparatus that includes a plurality of pipette tips, each having a length, and a static-defeating material, having a plurality of material holes; where: the plurality of pipette tips are inserted through the plurality of material holes, and the pipette tips and the static-defeating material adhere to each other.

A pipette tip sometimes is in association with a hole of a sheet when a portion of an exterior wall of the pipette tip is in contact with an internal edge, or portion of the internal edge, of the hole. One point, one section, multiple sections, or multiple points of a hole edge can make up a portion of a hole edge in contact with a pipette tip. Pipette tips sometimes are reversibly retained in the holes of the sheet and sometimes are irreversibly retained in the holes. As addressed herein, a pipette tip sometimes is retained in a hole by frictional engagement or compression (e.g., by an interference fit between an exterior surface of the tip and an internal edge, or portion of an internal edge, of a hole). Any geometry that generates friction between a hole edge, or portion thereof, and an exterior surface of a pipette tip sufficient to retain the pipette tip in the hole can be utilized. Sometimes, the frictional force between the hole edge, or portion thereof, and the exterior surface of a pipette tip is greater than the force of gravity when the first surface of the sheet (i.e., the top surface) is oriented downwards. Any geometry that generates compression between a hole edge, or portion thereof, and an exterior surface of a pipette tip sufficient to retain the pipette tip in the hole can be utilized. A sheet member sometimes deforms around a pipette tip in a compression fit. In certain embodiments, a pipette tip can be retained in a hole by an adhesive or by a weld (e.g., sonic weld). An internal edge of a hole can be in association with any suitable position on the exterior wall of a pipette tip, and sometimes is in association with an external surface of a pipette tip distal region, pipette tip proximal region or pipette tip flange. An internal edge of a hole sometimes is in association with a smooth or substantially smooth portion of a pipette tip. An internal edge of a hole sometimes is in association with a non-smooth portion of a pipette tip (e.g., in association with ribs on a proximal region of a pipette tip or textured surface of a pipette tip). An internal edge of a hole sometimes is smooth or substantially smooth, and sometimes is textured. In certain embodiments, an external surface of a pipette tip that contacts an internal edge of a hole in a sheet sometimes is smooth or substantially smooth, and sometimes is textured.

Thus, pipette tips in an array of pipette tips are inserted in, and retained by, edges of holes in a pipette retention sheet described herein, in certain embodiments. The pipette tips retained by holes of the sheets often are in reversible association with the sheet, and often are not integrated in the sheet (e.g., not molded into the sheet, not adhered to the sheet). The entirety of the edge (i.e., the entire edge circumference) or a portion of the edge (i.e., portion of the edge circumference) of each hole generally is in association with the outer diameter of each pipette tip retained by a sheet in such embodiments. In such embodiments, pipette tips are retained in holes of a sheet by friction, and sometimes by an interference fit between each hole edge, or portion thereof, and its contact zone counterpart on the exterior surface of each pipette tip. The frictional force between the hole edge, or portion thereof, and the exterior surface of a pipette tip often is greater than the force of gravity exerted on the pipette tips when the first surface of the sheet (i.e., the top surface) is oriented downwards towards the ground and parallel to the ground. The frictional force between the hole edge, or portion thereof, and the exterior surface of a pipette tip often is greater than motion and ejection forces exerted by a fluid handling device (e.g., a robotic fluid handling device). In such embodiments, the diameter or the effective diameter of each of the holes (e.g., defined by "X") is less than or equal to the outer diameter of the pipette tip exterior surface in contact with a hole edge (e.g., outer diameter of pipette tip contact zone defined by "Y"). The difference by subtraction between X and Y (i.e., Y minus X) sometimes is about 0.01 inches or less, where the difference by subtraction between X and Y is determined when pipette tips are not engaged in holes of the sheet. In certain embodiments, the difference by subtraction between X and Y sometimes is about 0.009 inches or less, 0.008 inches or less, 0.007 inches or less, 0.006 inches or less, 0.005 inches or less, 0.004 inches or less, 0.003 inches or less, 0.002 inches or less, 0.001 inches or less, 0.0009 inches or less, 0.0008 inches or less, 0.0007 inches or less, 0.0006 inches or less, 0.0005 inches or less, 0.0004 inches or less, 0.0003 inches or less, 0.0002 inches or less, or 0.0001 inches or less. In certain embodiments, distal rib edge termini at the end of ribs on each of the pipette tips in an array of pipette tips retained by a sheet are in contact with a first surface of the sheet (e.g., top surface). Some or all of such features described in this paragraph are applicable to assemblies comprising pipette tips and a sheet shown in FIG. 1 to FIG. 48, FIG. 62 to FIG. 75, and FIG. 88 to FIG. 138.

A pipette tip sometimes is in association with a hole of a sheet when the terminus of the proximal region of the pipette tip is in contact with the second surface of the sheet (e.g., the bottom surface of the sheet) and the proximal opening is positioned under the hole of the sheet. In such embodiments, portions around the holes on the second surface often are joined to the proximal terminus of the pipette tips. Portions around the holes on the second surface sometimes have the same texture, or a different texture, as the other portions of the second surface of the sheet, and sometimes portions around the holes are smooth, substantially smooth, textured, roughened or coarse. Portions around the holes on the second surface can be joined to the proximal terminus of pipette tips by any suitable joint, as described herein.

Figure 1:
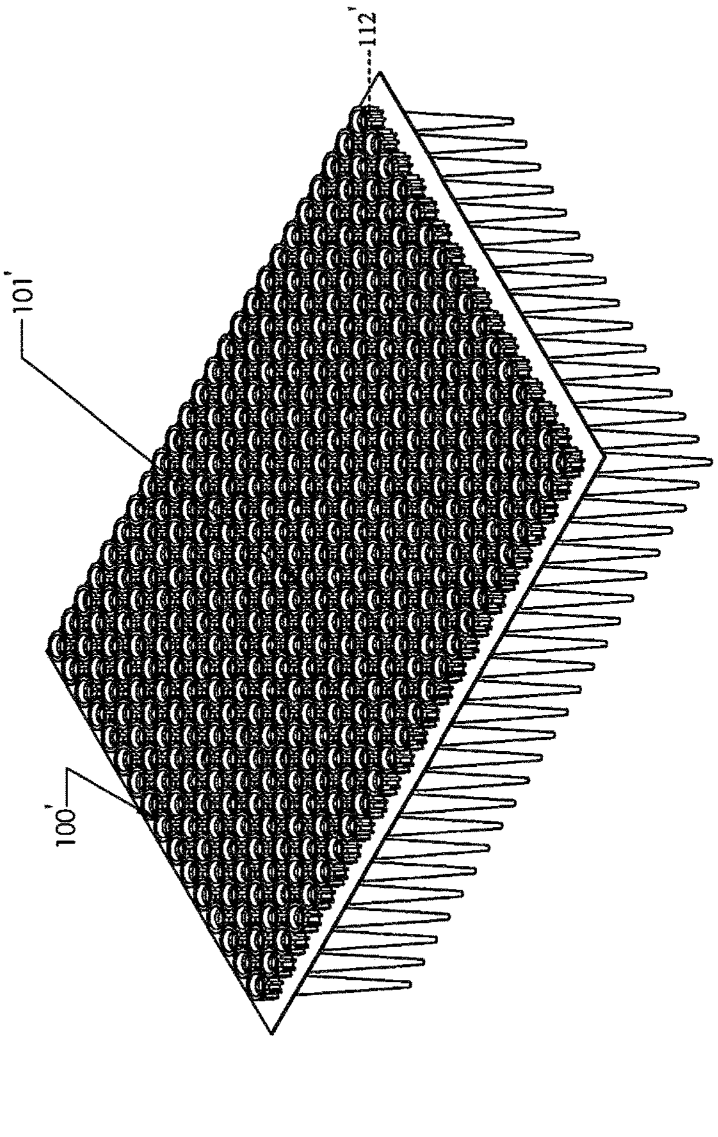
FIG. 1 is a perspective view of a static-defeating apparatus, according to an embodiment.

Certain examples of assemblies that include a sheet and an array of pipette tips are shown in FIG. 1 and in FIG. 36 to FIG. 61. FIG. 1 is a perspective view of a static-defeating apparatus, according to an embodiment. In this view, an array of pipette tips (i.e., an array that includes pipette tips 101') can be seen embedded in a sheet of static-defeating material 100'.

Figure 47:
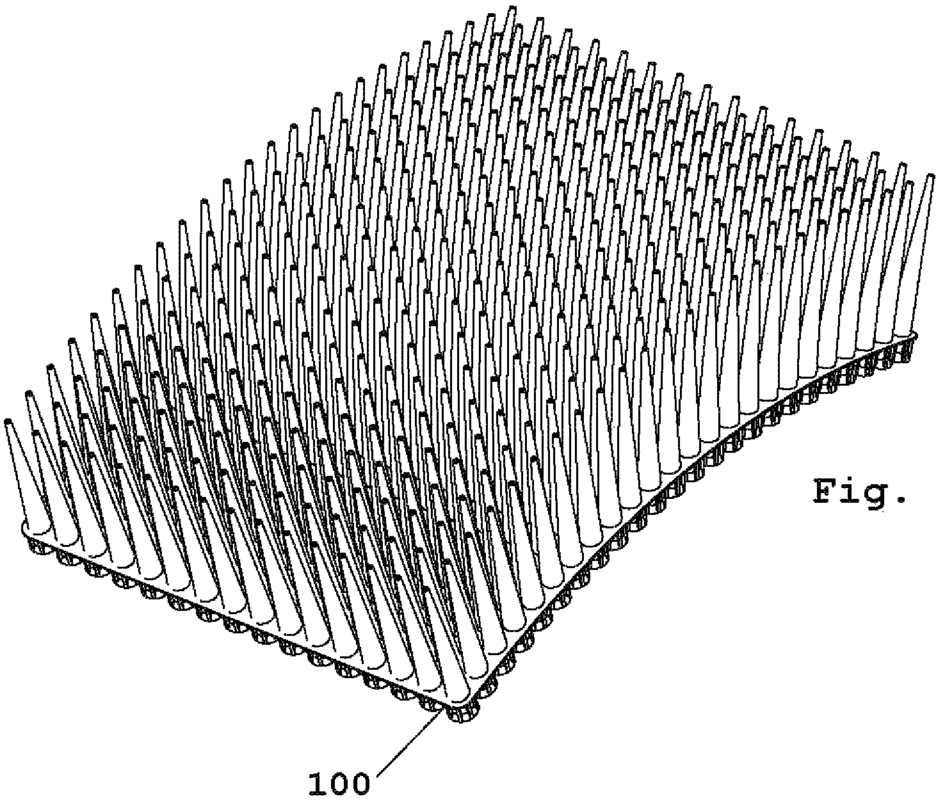
FIG. 47 shows a bottom perspective view of a variant of the assembly shown in FIG. 36, where the sheet in FIG. 47 is flexed and is curved, and where the sheet shown in FIG. 36 is not flexed and is flat or planar.
Figure 48:
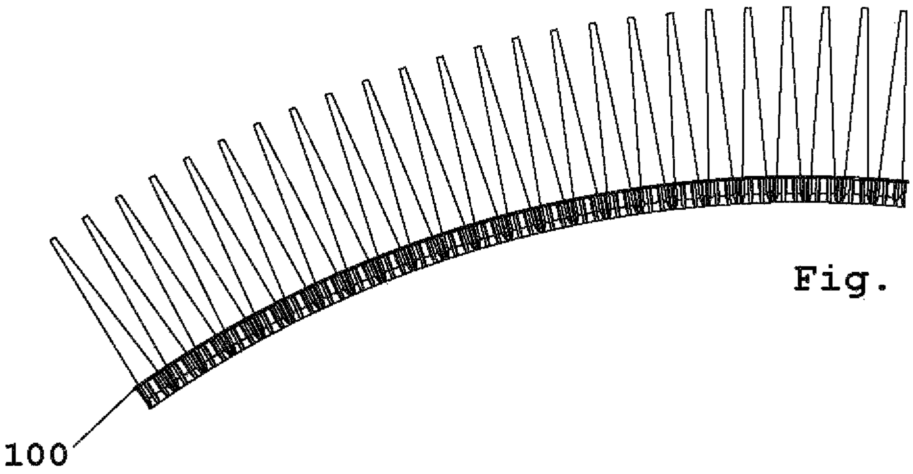
FIG. 48 shows a side view of the assembly shown in FIG. 47.
Figure 60:
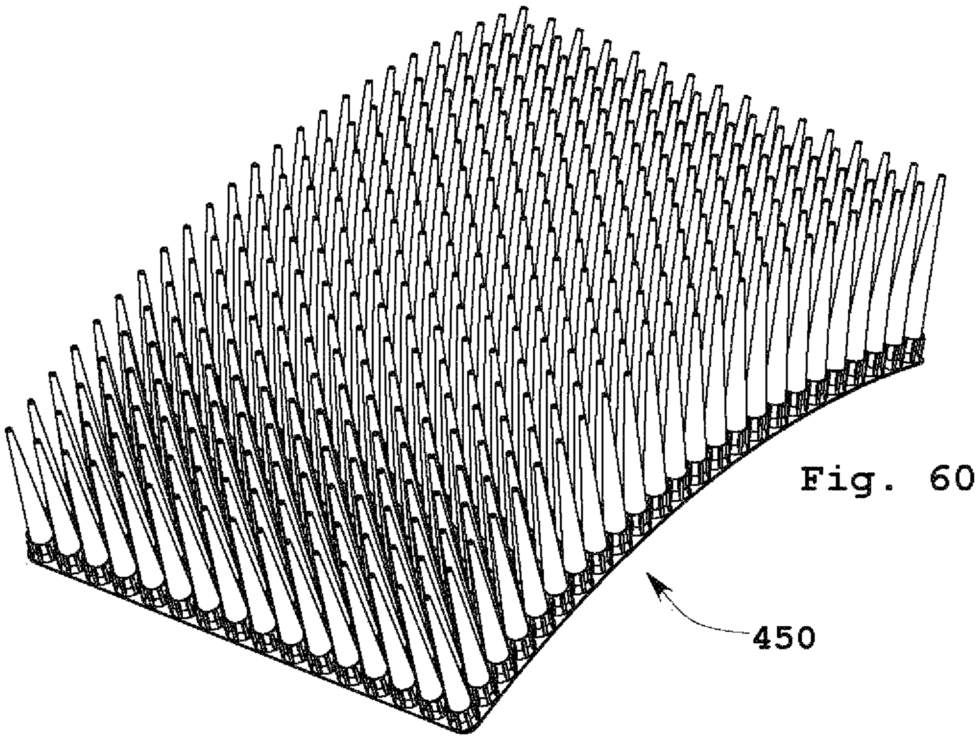
FIG. 60 shows a bottom perspective view of a variant of the assembly shown in FIG. 49, where the sheet in FIG. 60 is flexed and is curved, and where the sheet shown in FIG. 49 is not flexed and is flat or planar.
Figure 61:
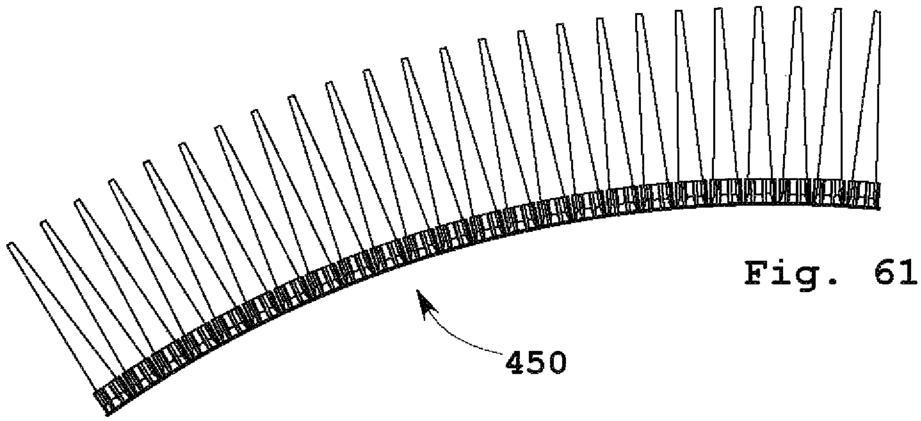
FIG. 61 shows a side view of the assembly shown in FIG. 60.

FIG. 36 to FIG. 48 show a sheet assembly embodiment 300 containing an array of pipette tips retained by an interaction between internal edges of the holes 130 in sheet 100 and a portion of the external surface of each of pipette tips 101. Each pipette tip 101 includes pipette tip distal region 101A, pipette tip distal terminus 101B, pipette tip distal opening 101C, pipette tip proximal region 101D, pipette tip proximal terminus 101E, pipette tip proximal opening 101F, pipette tip interior surface 101G, pipette tip exterior surface 101H and pipette tip flange 101J. FIG. 47 and FIG. 48 show a sheet assembly 300 in a flexed orientation (shown as sheet assembly 350), where the retention force between the sheet and the pipette tips is sufficient to retain the pipette tips in the pipette tip array under the force of gravity (e.g., the force of gravity is oriented downward and vertically). FIG. 49 to FIG. 61 show a sheet assembly 400 containing sheet 100 and an array of pipette tips joined to the second surface 117 (e.g., bottom surface 117) of the sheet for which the proximal opening 101F of each pipette tip 101 is concentric with each hole 120 of the sheet. FIG. 60 and FIG. 61 show a sheet assembly 400 in a flexed orientation (shown as sheet assembly 450), where the retention force between the sheet and the pipette tips is sufficient to retain the pipette tips in the pipette tip array under the force of gravity (e.g., the force of gravity is oriented downward and vertically).

Figure 78:
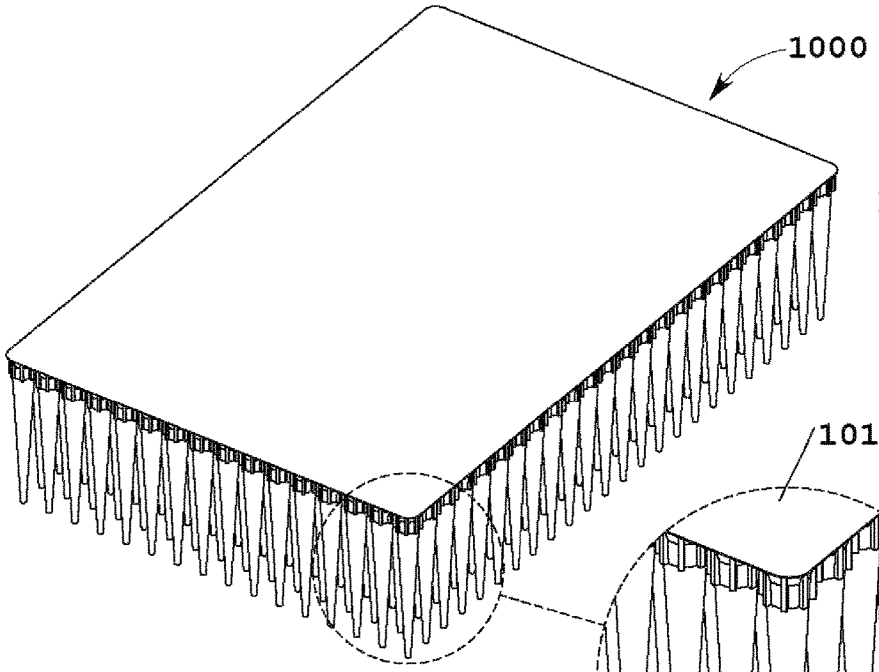
FIG. 78 shows a top perspective view of an assembly comprising a pipette tip retention sheet embodiment having no holes in association with pipette tips in an array of pipette tips joined to the second surface of the sheet.
Figure 79:
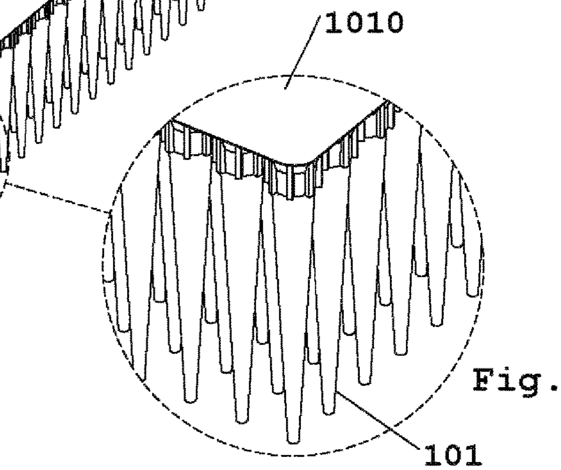
FIG. 79 shows an enlarged view of a portion of the assembly shown in FIG. 78.
Figure 81:
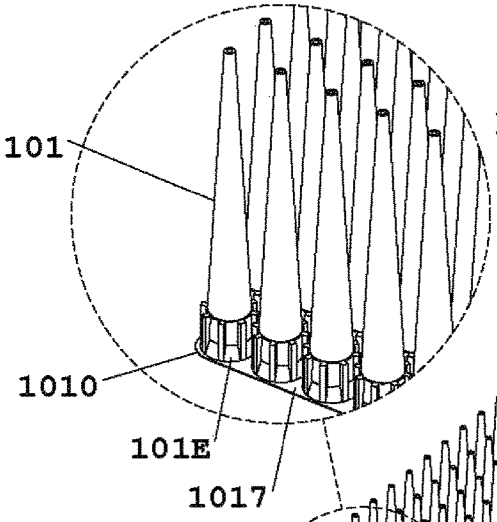
FIG. 81 shows an enlarged view of a portion of the assembly shown in FIG. 80.
Figure 80:
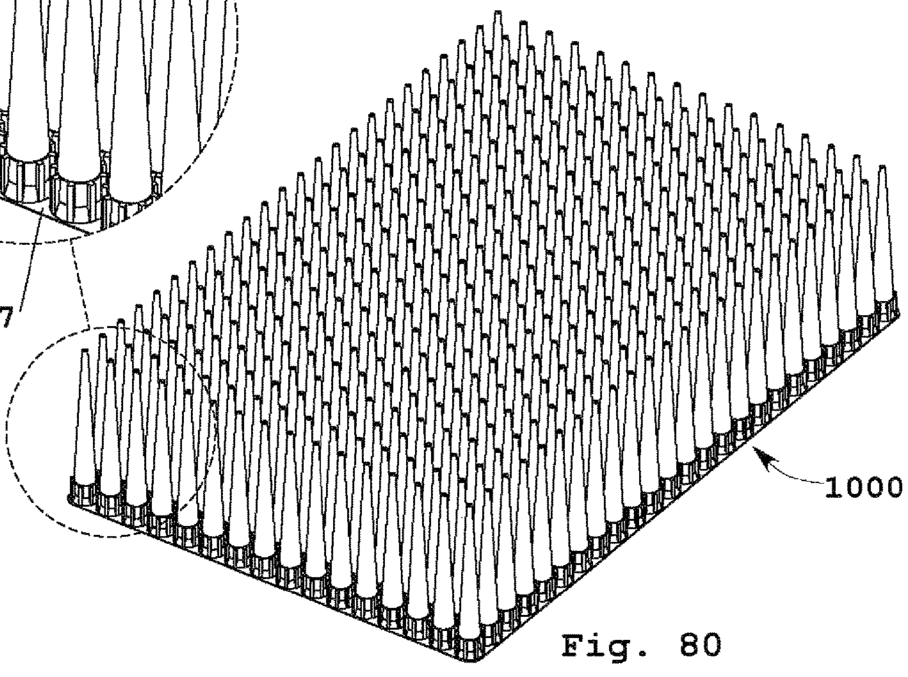
FIG. 80 shows a bottom perspective view of the assembly shown in FIG. 78
Figure 82:
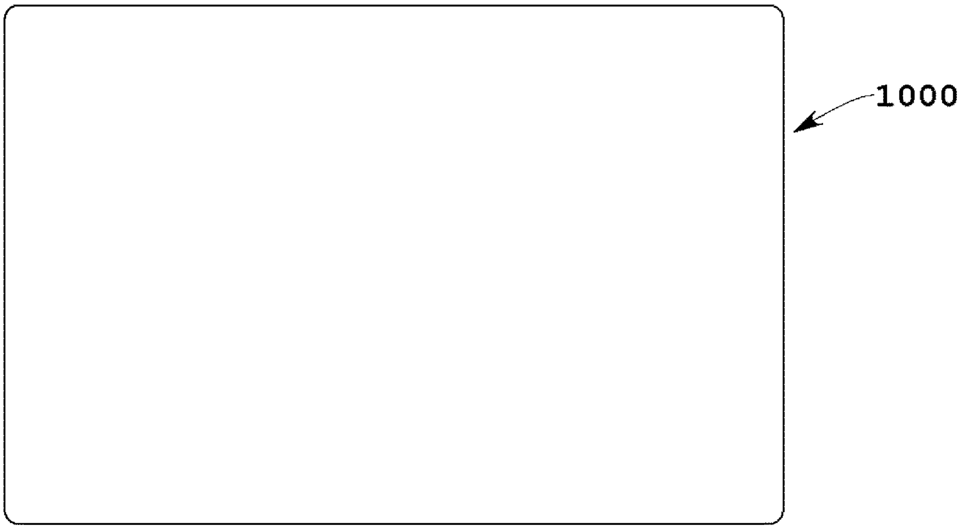
FIG. 82 shows a top view of the assembly shown in FIG. 78.
Figure 84:
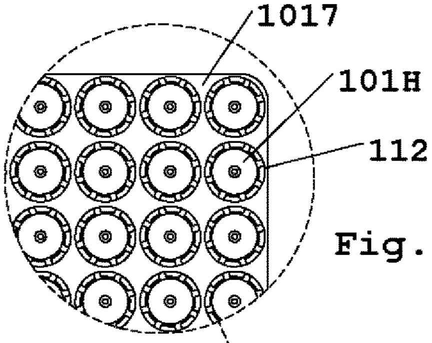
FIG. 84 shows an enlarged view of a portion of the assembly shown in FIG. 83.
Figure 83:
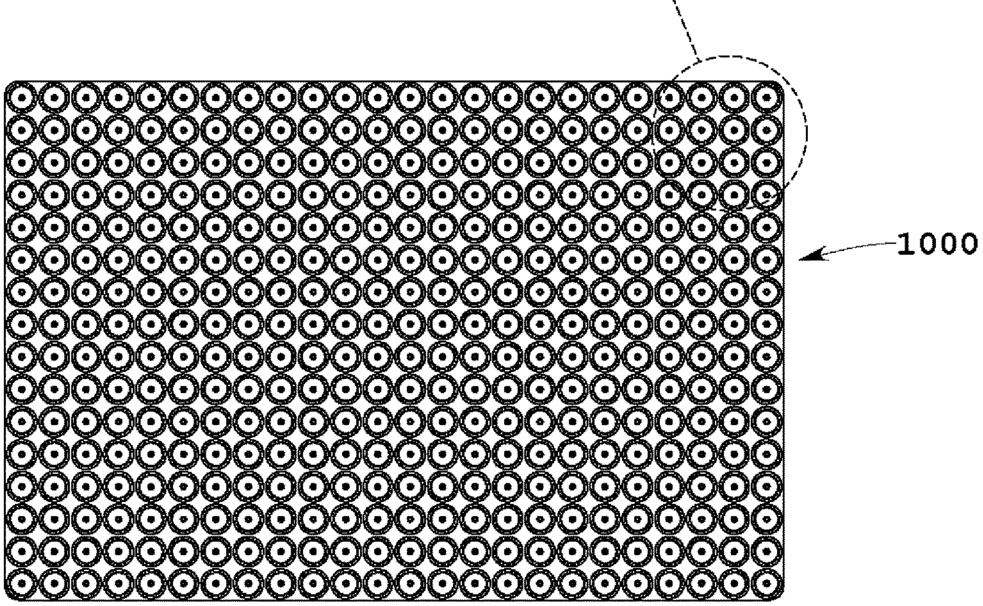
FIG. 83 shows a bottom view of the assembly shown in FIG. 78
Figure 86:
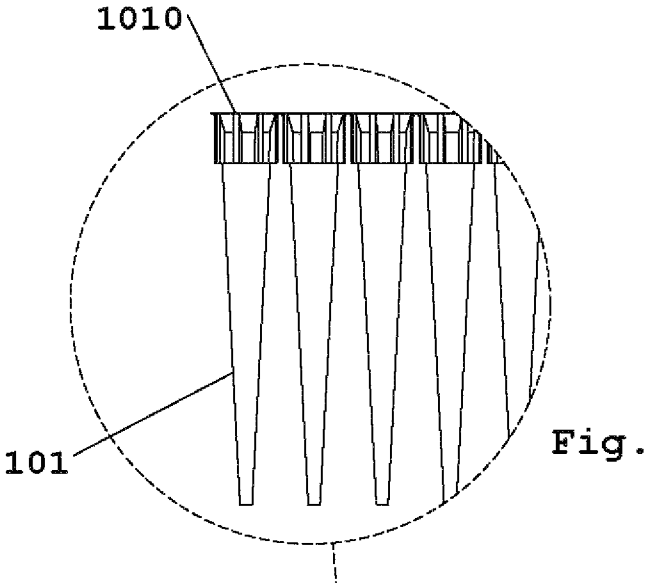
FIG. 86 shows an enlarged view of a portion of the assembly shown in FIG. 85.
Figure 85:
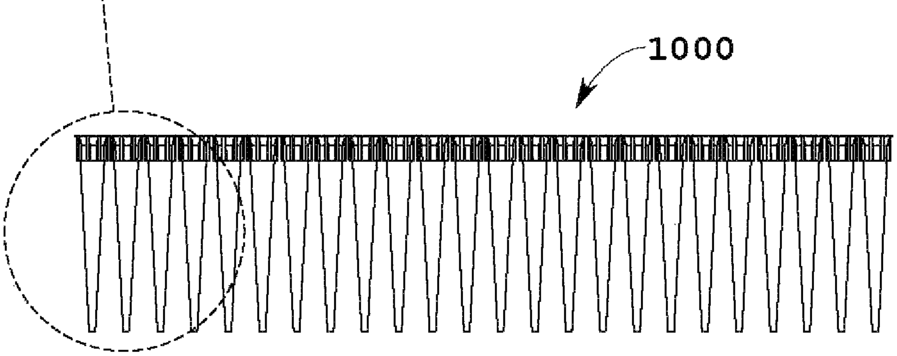
FIG. 85 shows a long side view of the assembly shown in FIG. 78.
Figure 87:
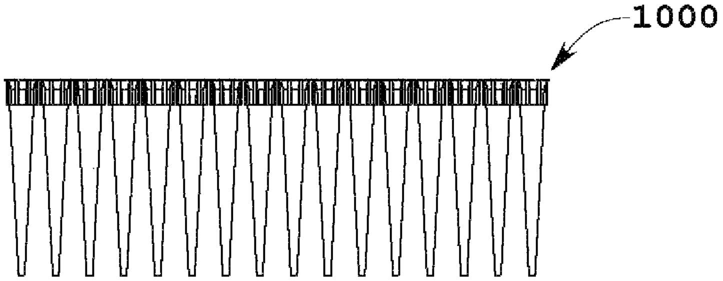
FIG. 87 shows a short side view of the assembly shown in FIG. 78.

A sheet assembly comprising pipette tips sometimes includes a sheet that does not include holes, as described herein. In certain embodiments, such an assembly includes a sheet that does not include holes concentric with pipette tips associated with the sheet. The sheet in such embodiments sometimes is a continuous sheet and sometimes includes a punch-through structure configured to receive a pipette tip or a nozzle of a fluid dispensing device (e.g., perforated or slit structures configured to receive a nozzle (e.g., perforated circle, X-shaped slit). For embodiments in which the sheet has a continuous surface, the sheet often comprises or is manufactured from a material that permits (i) a pipette tip to pierce the sheet, or (ii) a nozzle of a fluid handling device to pierce the sheet and engage a pipette tip associated with the sheet (e.g., aluminum foil). An example of a sheet assembly that includes a sheet having no holes in association with pipette tips is shown in FIG. 78 to FIG. 87. FIG. 78 to FIG. 87 show assembly 1000 that includes sheet 1010 in association with an array of pipette tips, where the proximal terminal surface of the pipette tips 101 are joined to the second surface 1017 of the sheet. Sheet 1010 may be manufactured from a foil (e.g., aluminum foil) having an adhesive on second surface 1017 that joins the pipette tips 101 to the second surface, in certain embodiments. In some embodiments, assembly 1000 can be configured for nozzles of a fluid handling device to pierce the sheet (e.g., pierce the surface of the sheet as shown in FIG. 78 from above) and sealingly engage pipette tips at each nozzle position in the fluid handling device. Where the number of nozzles of a fluid handling device is less than the number of pipette tips in assembly 1000, the fluid handling device may separate a subset of the pipette tips, along with a portion of the sheet in association with the pipette tips engaged by the nozzles, away from the remainder of pipette tips in the assembly not engaged by the nozzles (e.g., by tearing away the portion of the sheet from the assembly). In certain embodiments, a sheet having no holes in association with pipette tips can be provided and can be pierced with pipette tips to render an assembly containing an array of retained pipette tips resembling the assembly shown in FIG. 36 (e.g., the resulting assembly may include torn portions of the sheet extending from the second surface as a result of the pipette tips piercing the sheet from above).

An assembly includes multiple sheets in certain embodiments, with or without an array of pipette tips retained in each of the sheets. Each sheet in a multiple sheet assembly is referred to herein as a "sheet" or "sheet element" irrespective of whether (i) each sheet unit is separate and not connected to another sheet, or (ii) the sheets are part of an integrated assembly as joined sheet elements. Such an assembly sometimes includes two or more sheets (e.g., about 2, 3, 4, 5, 6, 7, 8, 9, 10, 11, 12, 13, 14, 15, 16, 17, 18, 19, 20, 30, 40, 50, 60, 70, 80, 90, 100, 150, 200, 250, 300, 350, 400, 500 or more sheets).

In a multiple sheet assembly, each sheet sometimes exists as a separate unit in the assembly and is not attached to another sheet. Two or more sheets in a multiple sheet assembly sometimes share at least one point of connection in the assembly, and sometimes, sheets are joined by at least one shorter edge and/or are joined by at least one longer edge. A separate sheet may be joined to another separate sheet in a multiple sheet assembly in any suitable manner, including by adhesive, tape, weld and the like, and such an assembly will include internal boundaries between joined sheets. Sheets in a multiple sheet assembly may be produced as one article of manufacture (also referred to herein as a "continuous assembly"), which often includes an internal boundary between each sheet element, and sometimes includes no internal boundary between arrays of holes. An internal boundary sometimes defines an edge of a sheet unit in a continuous assembly, and sometimes is a perforated boundary, boundary of decreased thickness, the like or combination thereof. A continuous assembly sometimes is configured for individual sheets to be removed from the assembly, and in certain embodiments, each sheet can be removed from the continuous assembly by disrupting a perforated internal boundary for the sheet in the assembly.

In certain embodiments, a multiple sheet assembly sometimes is provided as, or utilized as, a stacked arrangement of sheets (i.e., with or without an array of pipette tips retained in the sheets). Sheets in a stacked arrangement sometimes do not include retained arrays of pipette tips, sheets in a stacked arrangement sometimes are not joined to other sheets in the stacked arrangement, and sometimes an edge of a sheet is joined to an edge of another sheet (e.g., the assembly is provided in a notepad arrangement or accordion arrangement).

Each sheet in a stacked arrangement of multiple sheets sometimes includes an array of pipette tips and sometimes pipette tips in a first array of pipette tips retained in a first sheet are nested with pipette tips of a second array of pipette tips in a second sheet. Sheets in a stacked arrangement that includes nested pipette tips sometimes are not joined to one or more other sheets in the arrangement. A stacked arrangement sometimes includes pipette tips oriented in a vertically nested arrangement, and sometimes a stacked arrangement includes pipette tips oriented in a horizontal arrangement.

Figure 132:
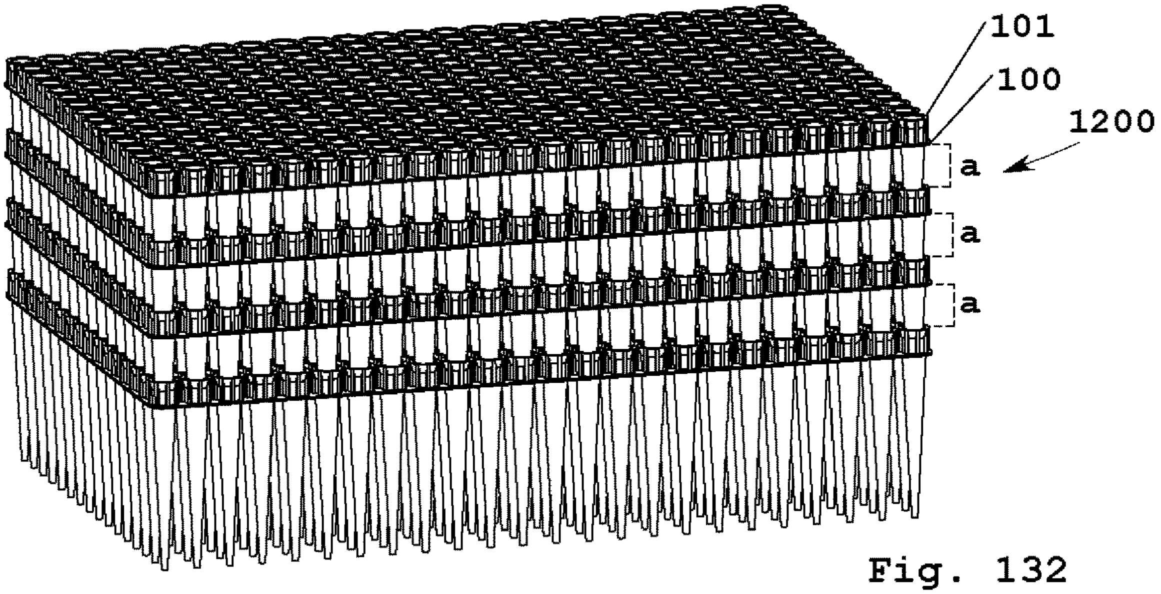
FIG. 132 shows a top perspective view of a vertically nested arrangement of four units of the assembly shown in FIG. 36.
Figure 136:
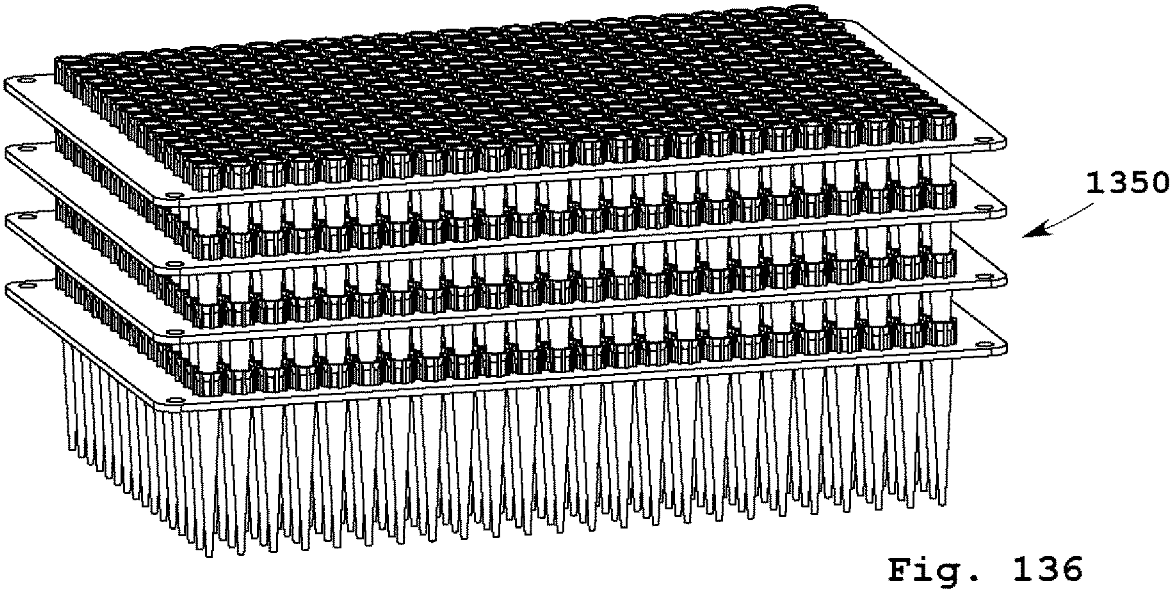
FIG. 136 shows a top perspective view of a vertically nested arrangement of four units of the assembly having the retention sheet and pipette tips shown in FIG. 135.

In a vertically nested arrangement, pipette tips in association with a proximal sheet generally are inserted in pipette tips of a distal sheet (i.e., the first sheet is above the second sheet). In vertically nested assemblies, pipette tips of a first array of pipette tips in a first sheet generally are nested in pipette tips of a second array of pipette tips in a second sheet. A second surface (i.e., bottom surface) of a first sheet generally opposes a first surface (i.e., top surface) of a second sheet, where the first sheet is proximal to the second sheet (i.e., the first sheet is above the second sheet). Examples of a vertically nested assemblies comprising an array of pipette tips and a sheet is shown in FIG. 132 and FIG. 136.

In a horizontally nested arrangement, pipette tips in association with a proximal sheet generally are not inserted in pipette tips of a distal sheet. Instead, pipette tips of one sheet are offset horizontally with respect to pipette tips of another sheet in an assembly. In horizontally nested assemblies, pipette tips of a first array of pipette tips in a first sheet generally are offset from, and nested adjacent to, pipette tips in a second array of pipette tips in a second sheet. In certain horizontally nested assemblies, a second surface (i.e., bottom surface) of a first sheet opposes a second surface (i.e., bottom surface) of a second sheet, where the first sheet is proximal to the second sheet (i.e., the first sheet is above the second sheet). In some horizontally nested assemblies, a second surface (i.e., bottom surface) of a first sheet opposes a first surface (i.e., top surface) of a second sheet, where the first sheet is proximal to the second sheet (i.e., the first sheet is above the second sheet). The distal terminus of pipette tips retained in a proximal sheet sometimes contact a surface of the distal sheet in horizontally nested assemblies. Horizontal nesting often is useful for nesting pipette tips containing an internal filter (e.g., filter located closer to the proximal terminus than the distal terminus of the pipette tip), for which vertical nesting would provide lower nesting efficiency, or where vertical nesting is not an option, due to nesting interference by the filter.

Figure 130:
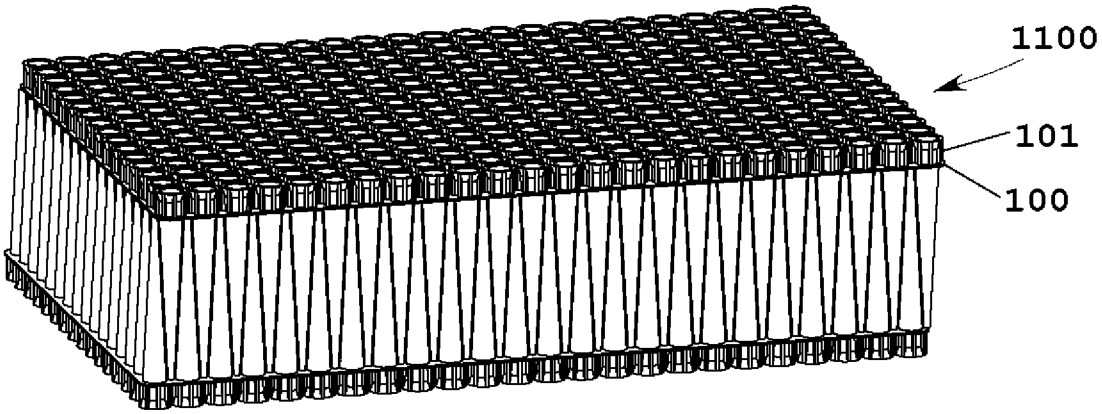
FIG. 130 shows a top perspective view of a horizontally nested arrangement of two units of the assembly shown in FIG. 36.
Figure 134:
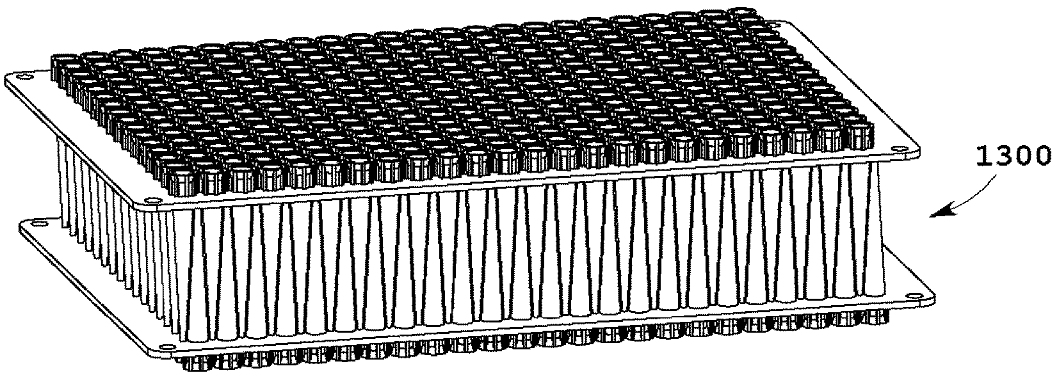
FIG. 134 shows a top perspective view of a horizontally nested arrangement of two units of an assembly having a pipette tip retention sheet embodiment and pipette tips, where the sheet is thicker than the sheet shown in FIG. 131 and includes alignment members.

Horizontal nesting can be effected in a variety of manners. In certain embodiments, corresponding edges of sheets can be offset in assemblies where (i) a second surface (i.e., bottom surface) of a first sheet opposes a second surface (i.e., bottom surface) of a second sheet, where the first sheet is proximal to the second sheet (i.e., the first sheet is above the second sheet), or (ii) a second surface (i.e., bottom surface) of a first sheet opposes a first surface (i.e., top surface) of a second sheet, where the first sheet is proximal to the second sheet (i.e., the first sheet is above the second sheet). An offset of corresponding sheet edges is illustrated in FIG. 130 and FIG. 134, where the right edge of the proximal sheet extends beyond the right edge of the distal sheet. In such embodiments, the distal terminus of pipette tips retained in each sheet sometimes contacts the opposing surface of the other sheet.

In some embodiments, corresponding edges of sheets in a horizontally nested assembly are contiguous and not offset. In certain embodiments the number of holes in each sheet is greater than the number of pipette tips retained in each sheet of the horizontally nested assembly. Each sheet in the assembly often has the same geometry and often is in the same orientation with sheets spaced vertically (e.g., sheets are parallel to one another and spaced an equal distance from one another). In certain embodiments, the distal portion of the pipette tips retained in a first set of holes in a first sheet extend through a second set of holes in a second sheet, where the first sheet is proximal to the second sheet, and pipette tips retained in the second sheet are not retained in the second set of holes and are retained in a third set of holes.

Pipette tips often are retained in a first set of holes in a proximal sheet (i.e., first sheet) and pipette tips often are retained in a second set of holes in a distal sheet (i.e., second sheet) of a horizontally nested assembly (i.e., proximal sheet is directly above the distal sheet in the array). Holes in the first set of holes typically are in different locations than holes in the second set of holes. For a hole that retains a pipette tip in the first sheet, the same hole located directly below in the second sheet does not retain a pipette tip and receives the distal region of the pipette tip retained in the first sheet, thereby allowing for nesting of the pipette tips in the first sheet. In some embodiments, the first sheet includes a third set of holes and the second sheet includes a fourth set of holes, the third set of holes and the fourth set of holes do not retain pipette tips, the fourth set of holes are located directly below the first set of holes, and the distal region of pipette tips retained in the first set of holes extends through the fourth set of holes. The fourth set of holes generally do not retain the pipette tips in the first array as the exterior diameter of the distal region of the pipette tips often is not in contact with hole edges or portions thereof in the fourth set (e.g., the exterior diameter of the distal region of the pipette tips adjacent to the holes in the fourth set generally is less than the diameter or effective diameter of the holes in the first set).

The first set of holes and the second set of holes sometimes are arranged in adjacent rows of each sheet, where each of the first sheet and the second sheet retain pipette tips in alternating rows. In such embodiments, the sheets often have the same geometry. A second surface (i.e., bottom surface) of a first sheet often opposes a first surface (i.e., top surface) of a second sheet, where the first sheet is proximal to the second sheet (i.e., the first sheet is above the second sheet), in such embodiments.

Figure 88:
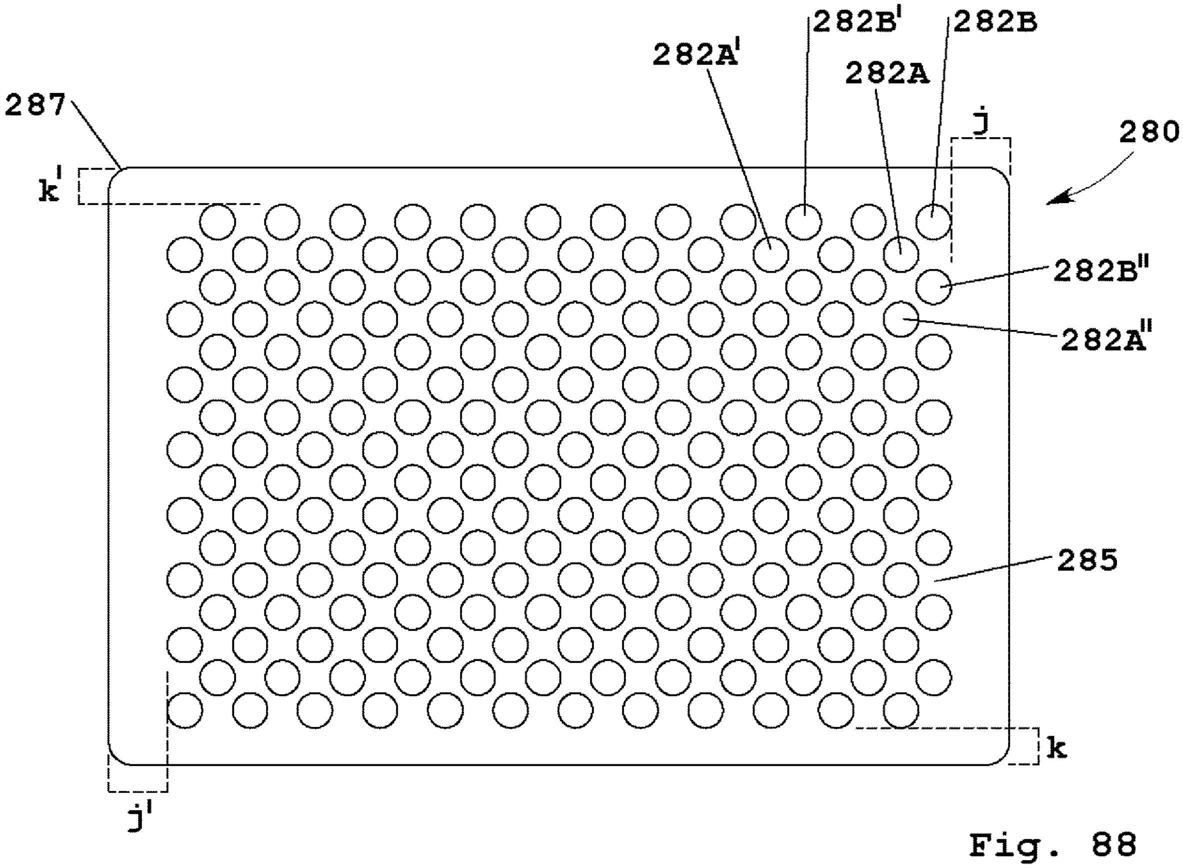
FIG. 88 shows a top view of a pipette tip retention sheet embodiment having hole-to-edge offsets of varying widths (i.e., with offsets k, k', j and j').
Figure 89:
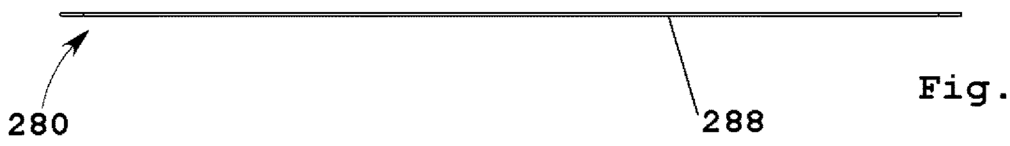
FIG. 89 and FIG. 90 show a long side view and a short side view, respectively, of the sheet shown in FIG. 88.
Figure 90:
Figure 91:
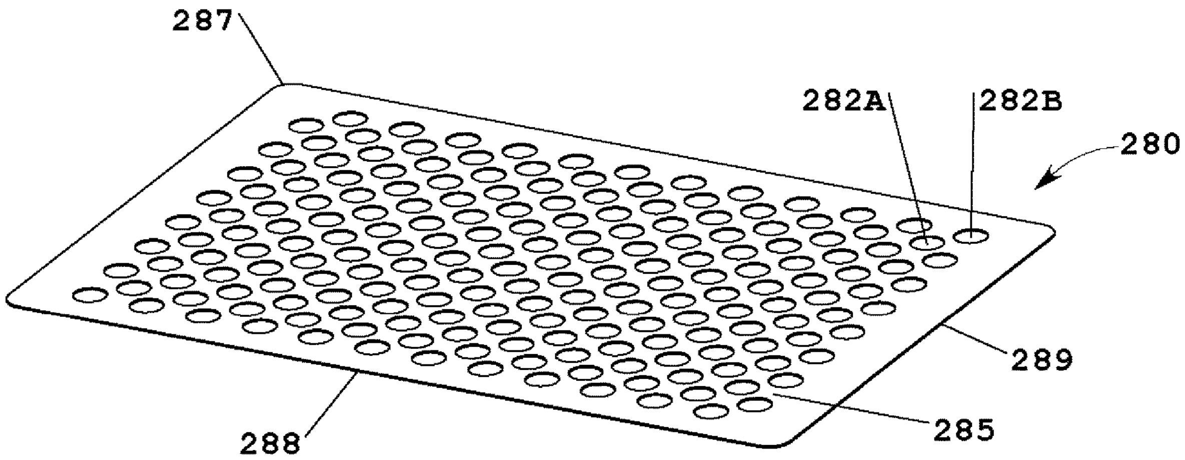
FIG. 91 shows a top perspective view of the sheet shown in FIG. 88.
Figure 99:
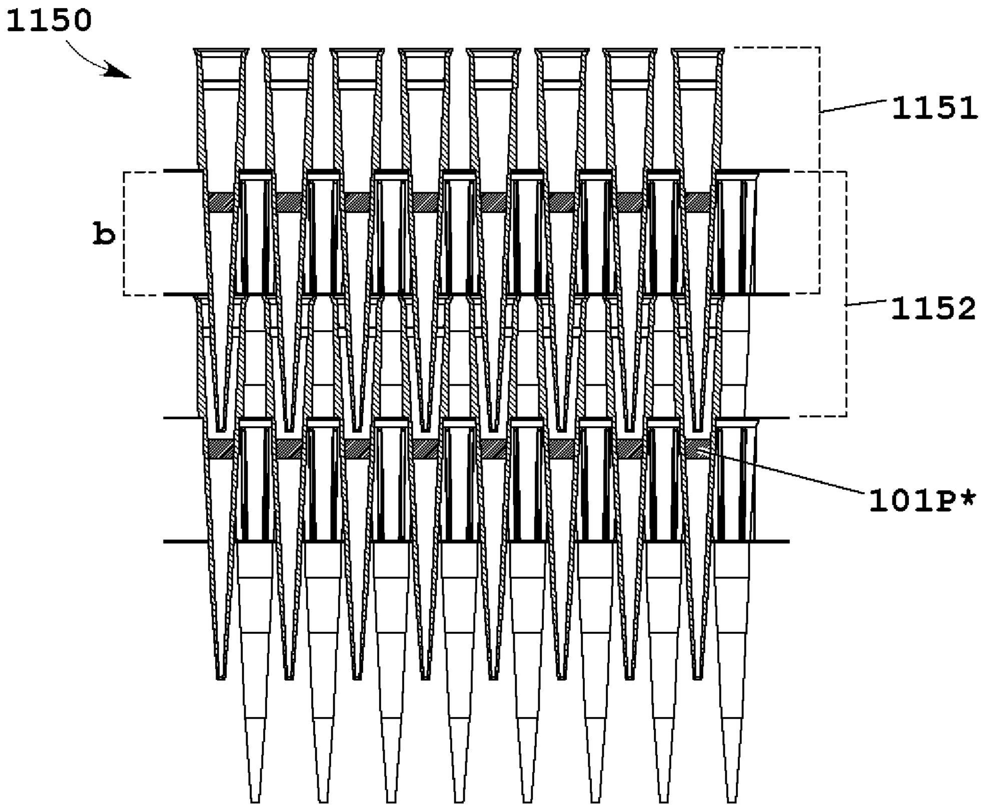
FIG. 99 shows a cross-section view of the assembly shown in FIG. 98 from the perspective defined by broken line B-B in FIG. 98.
Figure 100:
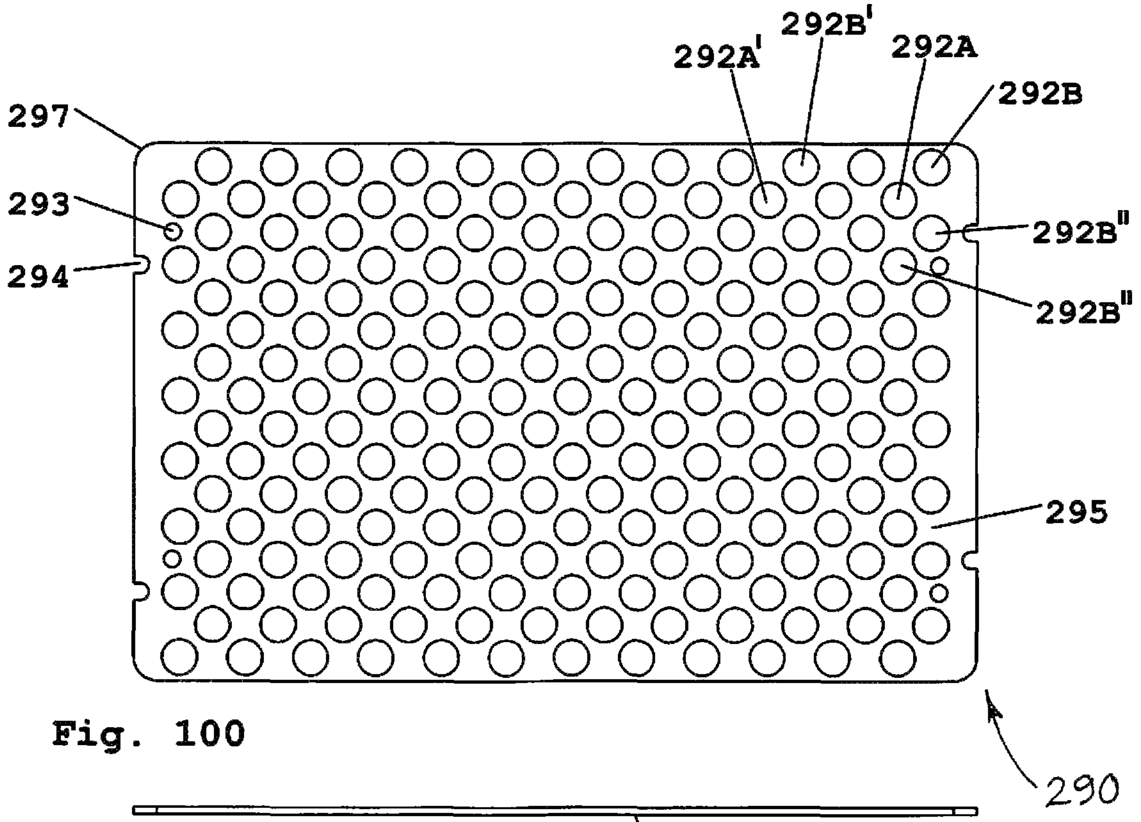
FIG. 100 shows a top view of a pipette tip retention sheet embodiment having hole-to-edge offsets of varying widths and having a sheet thickness greater than the thickness of the sheet shown in FIG. 88.
Figure 101:
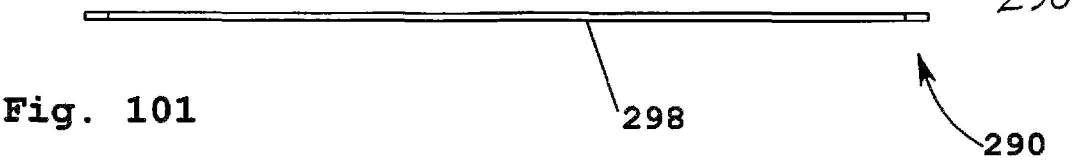
FIG. 101 and FIG. 102 show a long side view and a short side view, respectively, of the sheet shown in FIG. 100.
Figure 102:
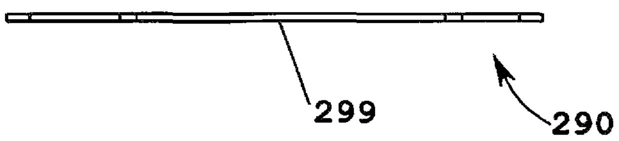
Figure 103:
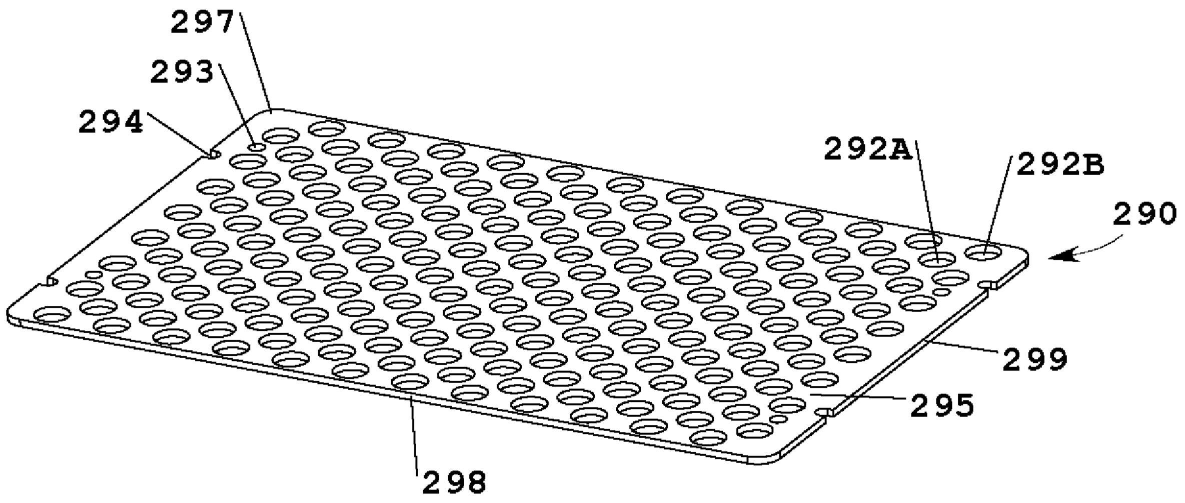
FIG. 103 shows a top perspective view of the sheet shown in FIG. 100.
Figure 104:
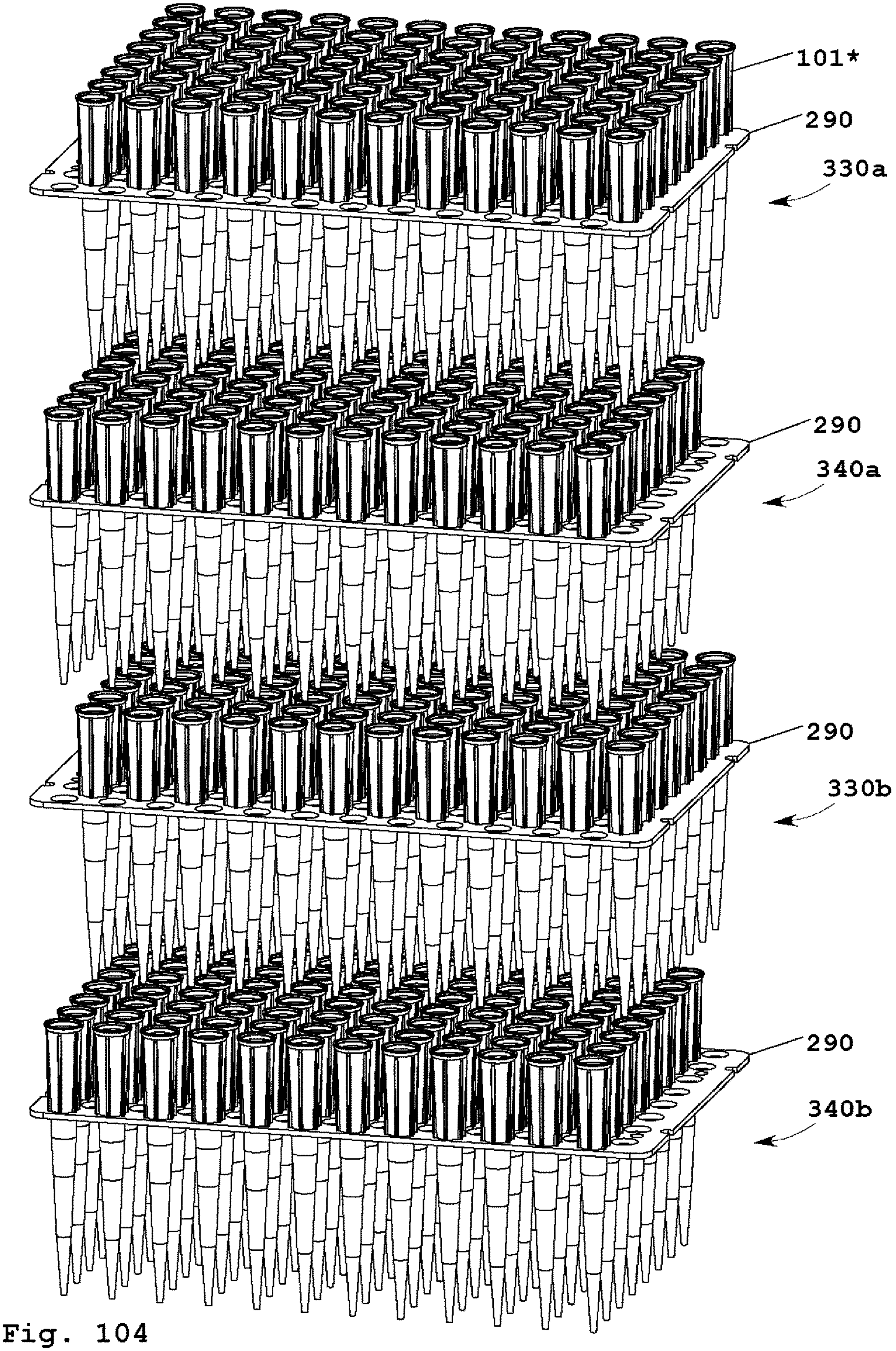
FIG. 104 shows a top perspective exploded view of the assembly shown in FIG. 105.
Figure 105:
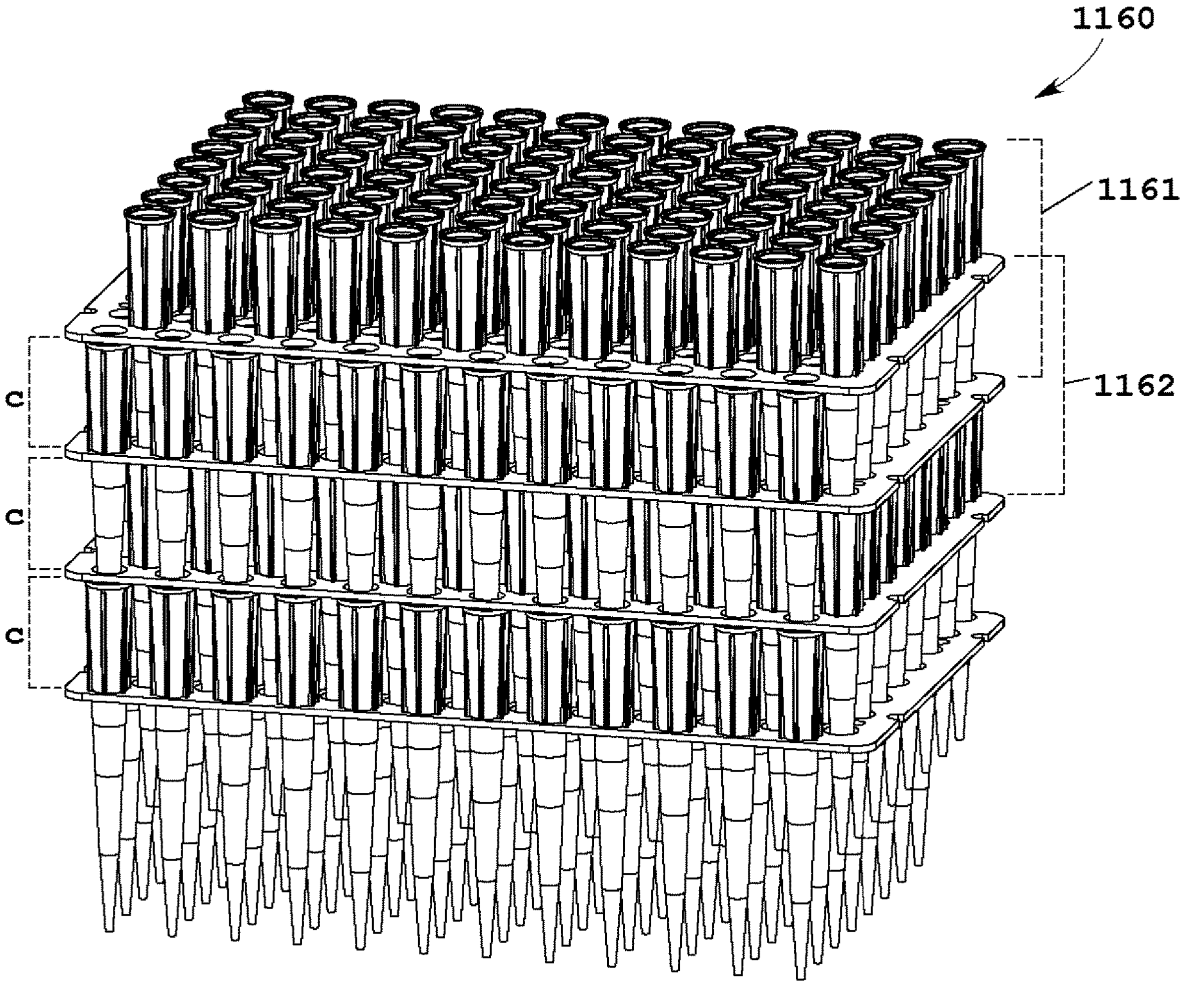
FIG. 105 shows a top perspective view of an assembly of nested sub-assemblies, which sub-assemblies include a pipette tip retention sheet shown in FIG. 100 in association with pipette tips in an array of pipette tips retained in holes of the sheet.
Figure 107:
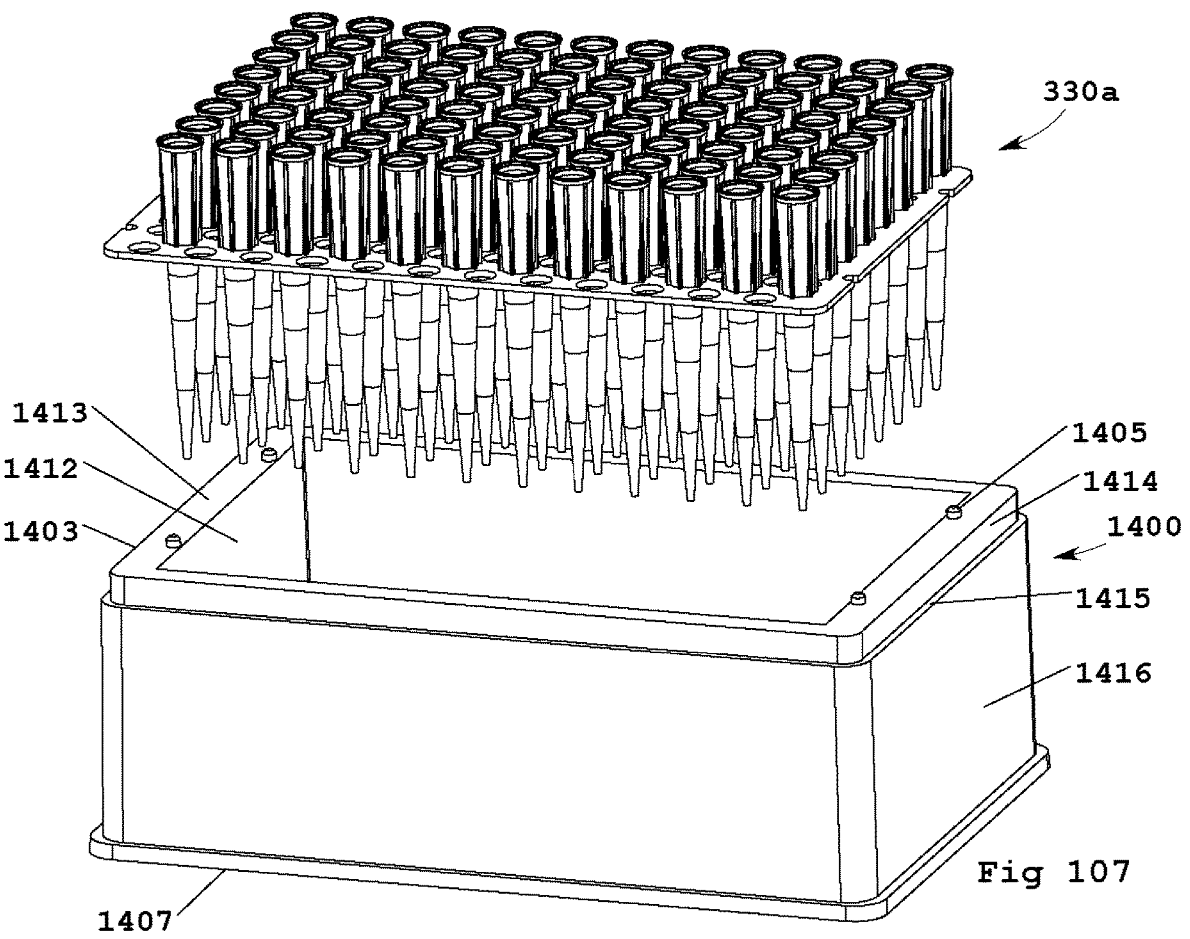
FIG. 107 shows an exploded view of the assembly shown in FIG. 106.

Non-limiting examples of horizontally nested assemblies for which the number of holes in each sheet is greater than the number of pipette tips retained are shown in FIG. 97, FIG. 98, FIG. 99 and FIG. 105. As illustrated in FIG. 99, for example, pipette tips retained in the top sheet are inserted into holes in the second sheet located directly below the first sheet that are not occupied by pipette tips retained by the second sheet. Sheets 280 and 290 shown in FIG. 88 and FIG. 100 are useful for retaining about 96 pipette tips, in some embodiments.

Figure 108:
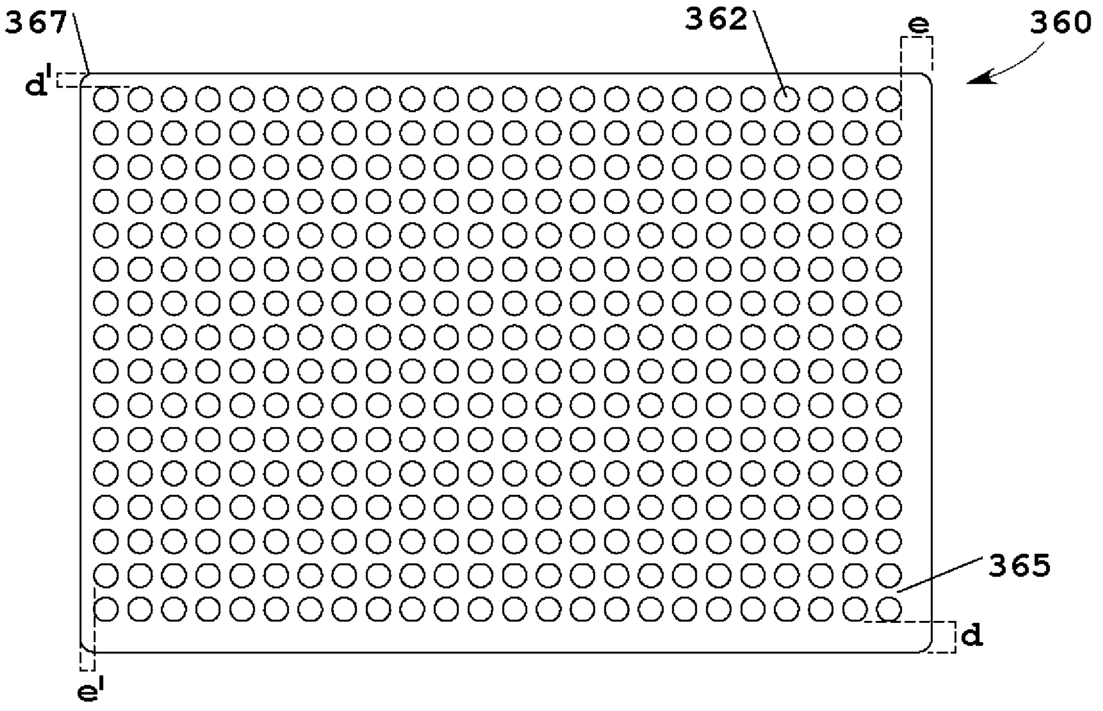
FIG. 108 shows a top view of a pipette tip retention sheet embodiment having hole-to-edge offsets of varying widths (i.e., with offsets d, d', e and e'), with holes smaller than the holes in the sheet shown in FIG. 88 (e.g., the sheet shown in FIG. 108 can retain a greater number of smaller pipette tips (e.g., 384 pipette tips) as compared to the number of pipette tips retained by the sheet shown in FIG. 88 (e.g., 96 pipette tips)).
Figure 109:
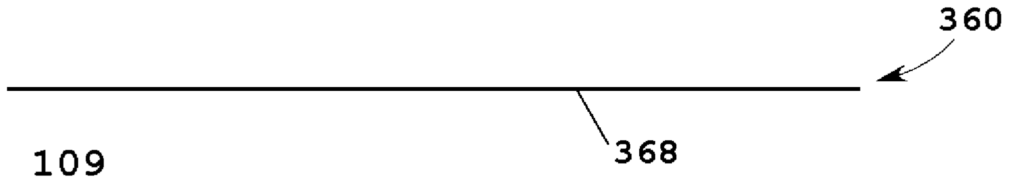
FIG. 109 and FIG. 110 show a long side view and a short side view, respectively, of the sheet shown in FIG. 108.
Figure 110:
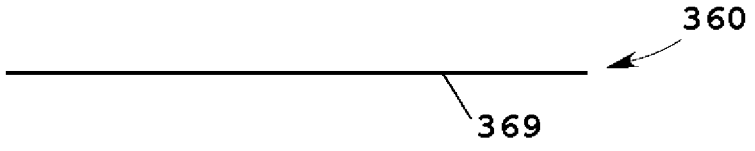
Figure 111:
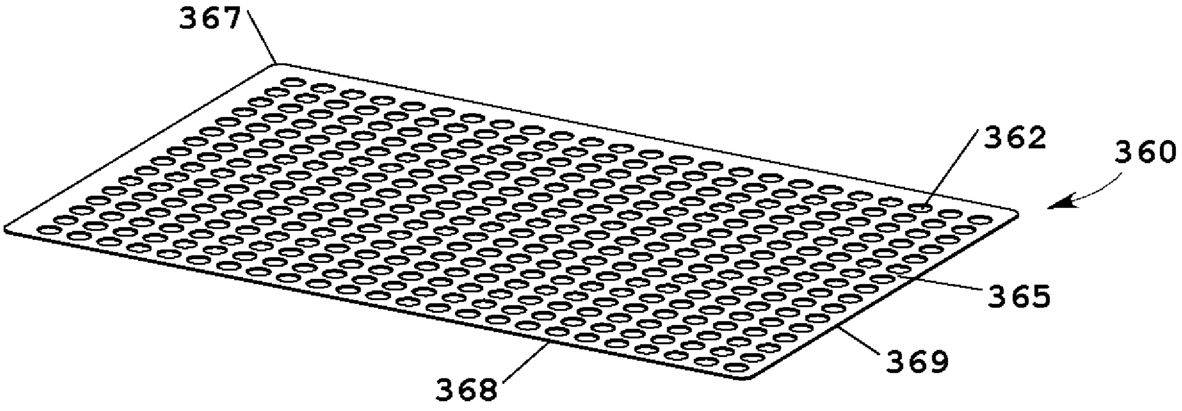
FIG. 111 shows a top perspective view of the sheet shown in FIG. 108.
Figure 112:
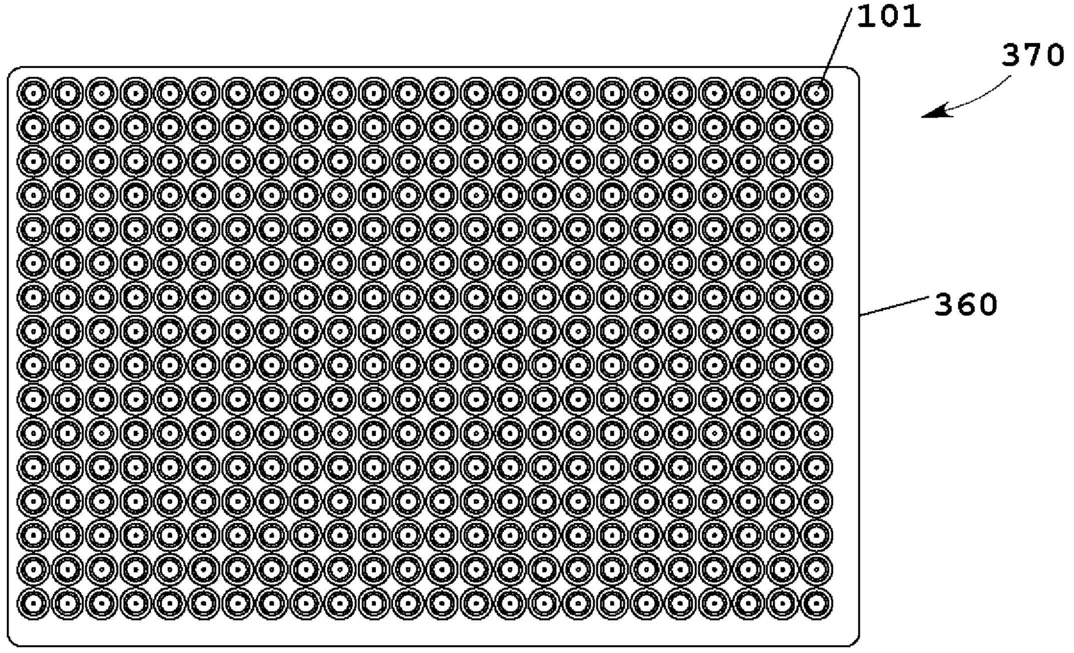
FIG. 112 shows a top view of an assembly of a pipette tip retention sheet shown in FIG. 108 in association with pipette tips in an array of pipette tips retained in holes of the sheet.
Figure 113:
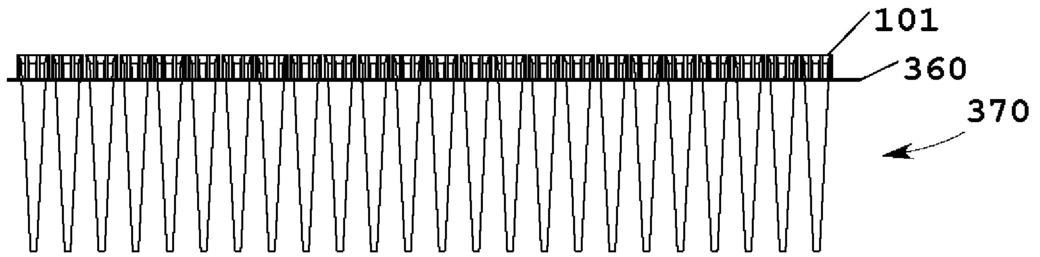
FIG. 113 and FIG. 114 show a long side view and a short side view, respectively, of the assembly shown in FIG. 112.
Figure 114:
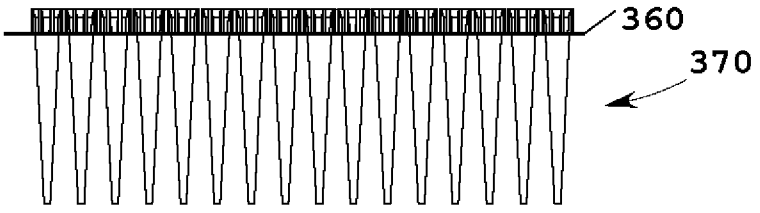
Figure 115:
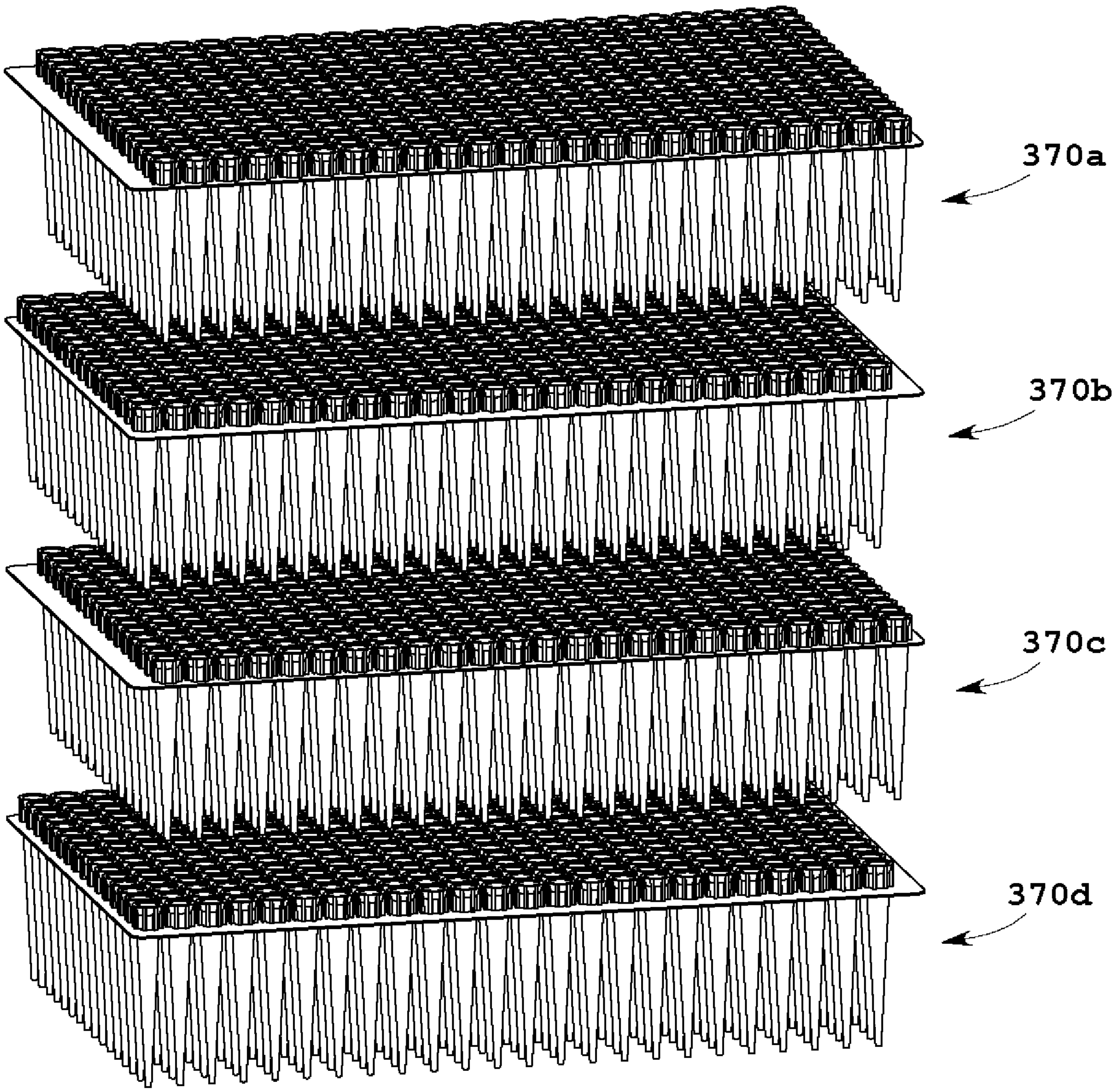
FIG. 115 shows a top perspective exploded view of the assembly shown in FIG. 116.

In certain embodiments, for which the edges of sheets in a horizontally nested assembly are contiguous and not offset, sheets in the assembly sometimes include one or more different hole-to-edge offset distances for vertically oriented terminal rows of holes and for horizontally oriented terminal rows of holes. A hole-to-edge offset distance is the shortest distance between the outer perimeter of a hole and the nearest edge of a sheet. A hole-to-edge offset distance often is the same for all holes in a terminal row parallel to a sheet edge. A terminal row of holes generally is a row of holes closest to a sheet edge and parallel to the sheet edge. For example, the vertically oriented row of holes furthest to the left of sheet 360 shown in FIG. 108 is a terminal row closest to the left sheet edge, and the hole-to-edge offset distance for all holes in that terminal row is distance e'. Sheet 360 also includes (i) the vertically oriented row closest to the right sheet edge for which the hole-to-edge offset distance for all holes in that terminal row is distance e, (ii) the horizontally oriented row closest to the bottom sheet edge for which the hole-to-edge offset distance for all holes in that terminal row is distance d, and (iii) the vertically oriented row closest to the top sheet edge for which the hole-to-edge offset distance for all holes in that terminal row is distance d'. All of the holes in a terminal row often are aligned, where the center points of the holes in the terminal row are aligned and/or the point on the circumference of each hole closest to the sheet edge is the same distance to the edge for all of the holes in the terminal row. The hole-to-edge offset distance for holes in the two terminal rows of holes parallel to a short side of a sheet sometimes are the same and sometimes are different, and the hole-to-edge offset distance for holes in the two terminal rows of holes parallel to a long side of a sheet sometimes are the same and sometimes are different.

Offset distances to the short side of a sheet sometimes are the same and sometimes differ from one another, and offset distances to the long side of a sheet sometimes are the same and sometimes differ from one another. In some embodiments, the hole diameters or effective diameters are the equal in a sheet, the holes in terminal rows parallel to a each side of the sheet are aligned, and the offset distance to a first side of a sheet for the holes in the terminal rows parallel to the first side of the sheet are different than the offset distance to a second side of the sheet for the holes in the terminal rows parallel to the second side of the sheet, where the first side and the second side are opposing and are parallel. In certain embodiments, the hole diameters or effective diameters are equal in a sheet, the holes in terminal rows parallel to a short side of a sheet are aligned (e.g., edges of the holes in each terminal row are aligned), and the offset distances to the short side of a sheet for the holes in the terminal rows parallel to the short side of the sheet are the same or differ from one another. In some embodiments, the hole diameters or effective diameters are the equal in a sheet, the holes in terminal rows parallel to a long side of a sheet are aligned (e.g., edges of the holes in each terminal row are aligned), and the offset distances to the long side of a sheet for the holes in the terminal rows parallel to the long side of the sheet are the same or differ from one another.

Figure 116:
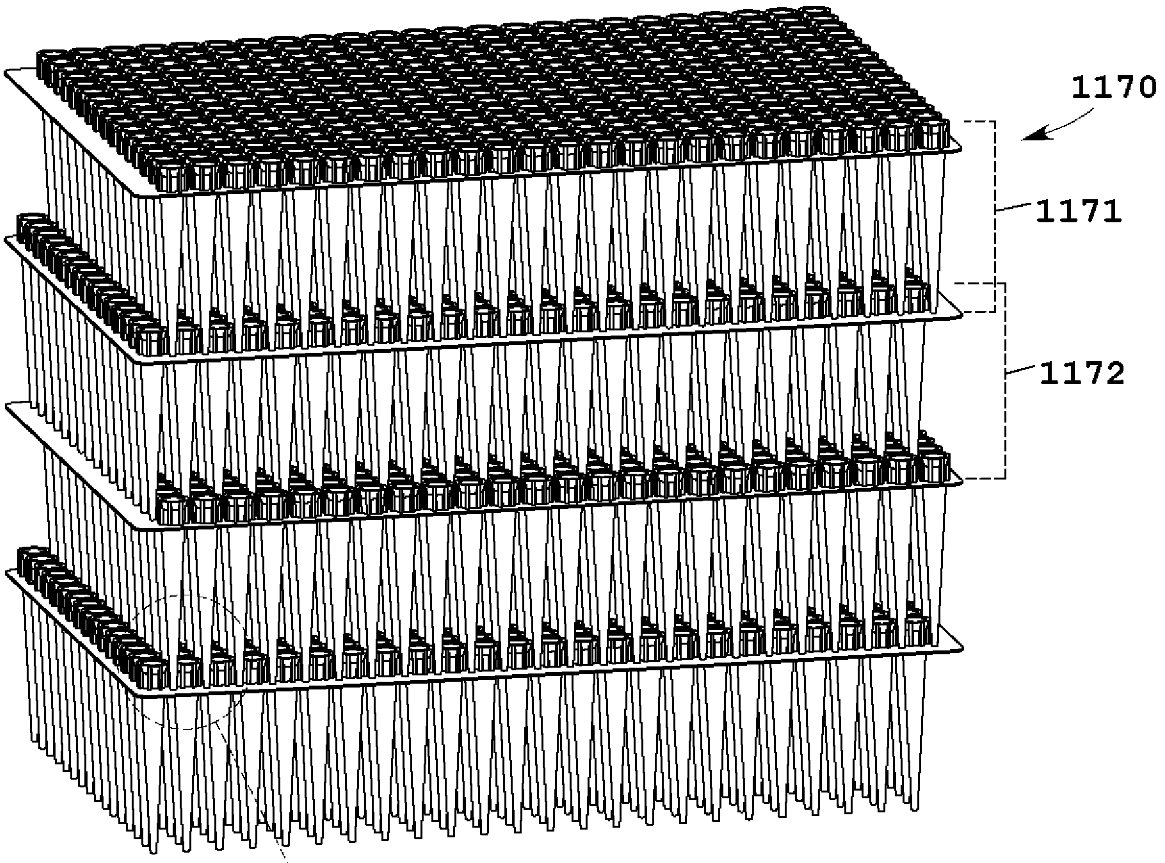
FIG. 116 shows a top perspective view of an assembly of nested sub-assemblies shown in FIG. 112.
Figure 117:
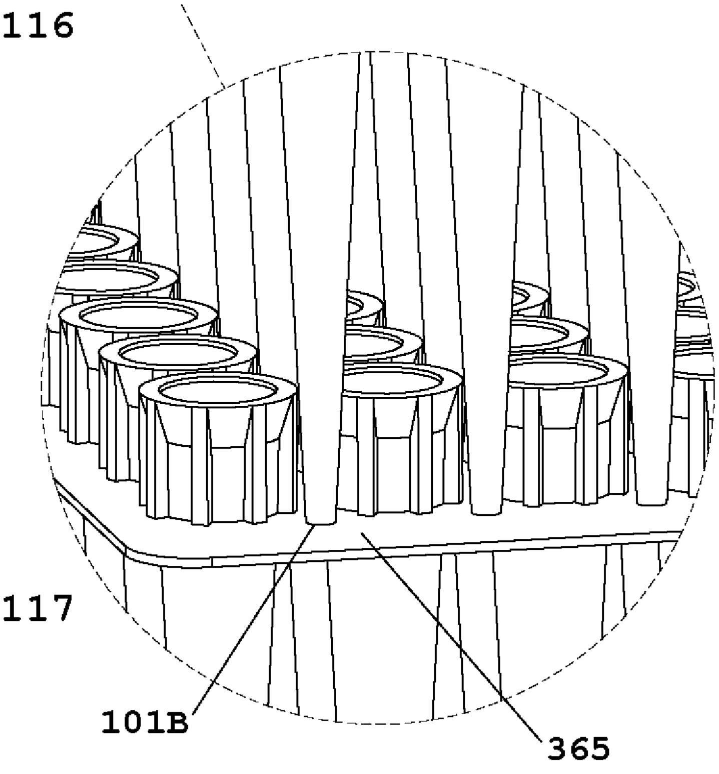
FIG. 117 shows an enlarged view of the portion delineated by a broken circle shown in FIG. 116.

Hole-to-edge offsets are illustrated, for example, in FIG. 108 as e, e', d and d'. Offset distances e and e' differ from one another and offset distances d and d' differ from one another. When multiple sheets each retaining an array of pipette tips are assembled into a horizontally nested assembly, orienting adjacent sheets 180 degrees with respect to one another can place the edges of the sheets contiguous and not offset. A non-limiting example of such an assembly is shown in FIG. 116, in which sub-assemblies **370*a* and 370*b* (shown in FIG. 115) are rotationally oriented 180 degrees in a plane with respect to one another, where the plane is parallel to the first surface of the rotated sheet. A plane parallel to the first surface of each of the sheets often is a horizontal plane. Sub-assemblies 370*b* and 370*c* also are rotationally oriented 180 degrees in a horizontal plane with respect to one another, and sub-assemblies 370*c* and 370*d* are rotationally oriented 180 degrees in a horizontal plane with respect to one another. In certain embodiments, the distal terminus of pipette tips retained in each proximal sheet contacts the opposing surface of the distal sheet. For example, the distal terminus of each of the pipette tips in sub-assembly 370*a* contacts the first surface of the sheet in sub-assembly 370*b*, as shown in FIG. 116 and in FIG. 117. Sheets 360 and 380 shown in FIG. 108 to FIG. 128** are useful for retaining about 384 pipette tips, in some embodiments.

Nesting efficiency is affected by multiple features, including but not limited to, pipette tip exterior wall draft, pipette tip interior wall draft, the number of different wall drafts in each pipette tip, pipette tip wall thickness, pipette tip proximal opening diameter and the like. For example, nesting efficiency is defined by distance "a" in FIG. 132. Nesting efficiency could be enhanced by reducing distance "a" shown for the embodiment illustrated in FIG. 132, which could be effected, for example, by providing pipette tips having a larger proximal opening diameter and/or a greater interior wall draft angle.

A sheet assembly that includes a sheet having no holes (e.g., assembly 1000 illustrated in FIG. 78) in association with pipette tips sometimes is provided as a multiple sheet assembly. Sometimes a multiple sheet assembly having pipette tips, with sheet assemblies that were originally provided without holes, are in a vertically nested stacked arrangement in which pipette tips in a first sub-assembly have pierced the sheet, and are nested in pipette tips, of a second sub-assembly, where the second sub-assembly is located below the first sub-assembly in the arrangement. Sometimes a multiple sheet assembly having pipette tips, with sheet assemblies provided without holes, are in a horizontally nested arrangement in which the sheets of a first sub-assembly are not pierced by pipette tips of a second opposing sub-assembly.

A multiple sheet assembly sometimes is provided as, or utilized as, a planar arrangement or substantially planar arrangement of sheets, in which each sheet includes, or does not include, a retained array of pipette tips. In certain embodiments, each sheet in such assemblies is connected to another sheet, often by one edge (e.g., a shorter edge of a first sheet is joined to a shorter of a second sheet).

In some embodiments, an assembly having multiple sheets is provided as, or utilized as, a coil, in which each sheet includes or does not include a retained array of pipette. Each sheet in a coiled assembly often is connected to another sheet, often by one edge (e.g., a shorter edge of a first sheet is joined to a shorter of a second sheet). Each sheet in a coiled assembly of multiple sheets sometimes includes an array of pipette tips, and sometimes pipette tips retained in a first portion of the coiled assembly are nested in pipette tips retained in a second portion of the coiled assembly, where the first portion is located inward of the second portion in the coil.

Any of the foregoing assemblies may be provided in a container. Any suitable container can be utilized, such as a box, blister pack, wrapping, the like and combinations thereof, for example. An assembly may be provided as a component for use with a pipette tip liquid dispensing device, and can be provided as one or more pipette tip reload components, for example. An assembly may be provided as one or more pipette tip reload components for reloading pipette tips into a pipette tip tray, and may be provided for reloading pipette tips in a fluid dispensing device with or without a pipette tip tray rack (e.g., reloading using a loading frame), in certain embodiments.

Figure 49:
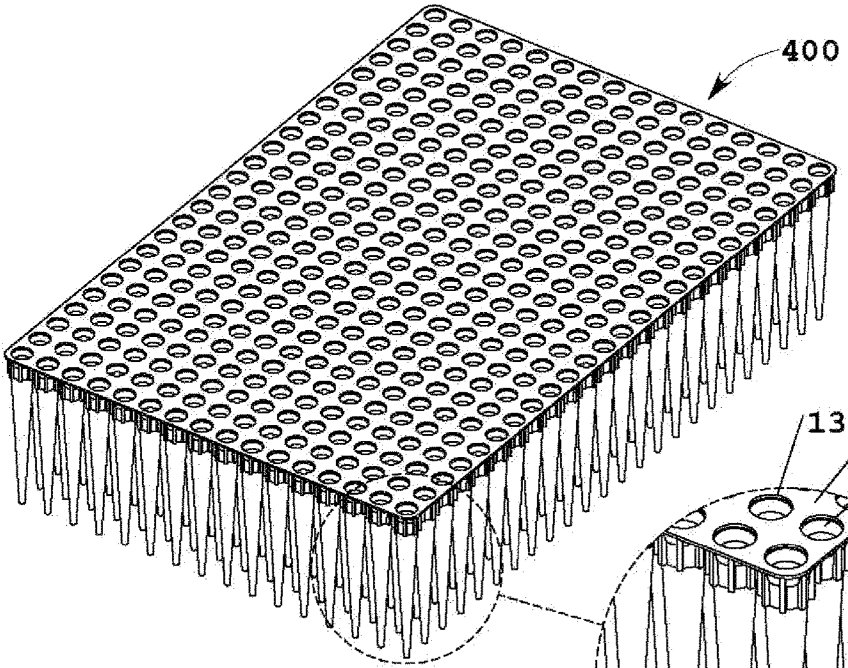
FIG. 49 shows a top perspective view of an assembly comprising a pipette tip retention sheet embodiment having circular holes and an array of pipette tips joined to the second surface of the sheet and in alignment with the holes.
Figure 50:
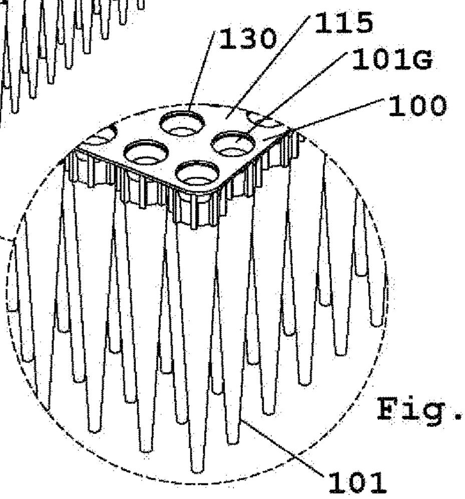
FIG. 50 shows an enlarged view of a portion of the assembly shown in FIG. 49.
Figure 52:
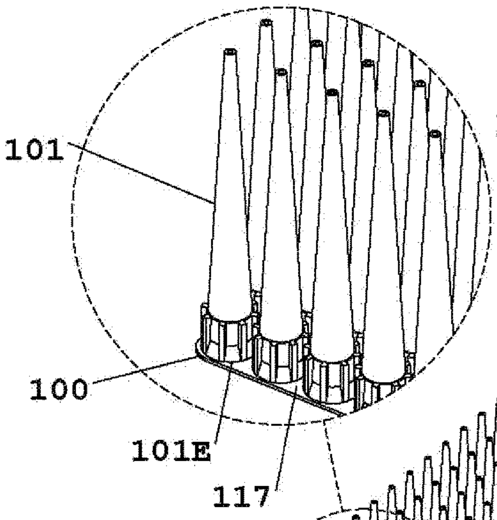
FIG. 52 shows an enlarged view of a portion of the assembly shown in FIG. 51.
Figure 51:
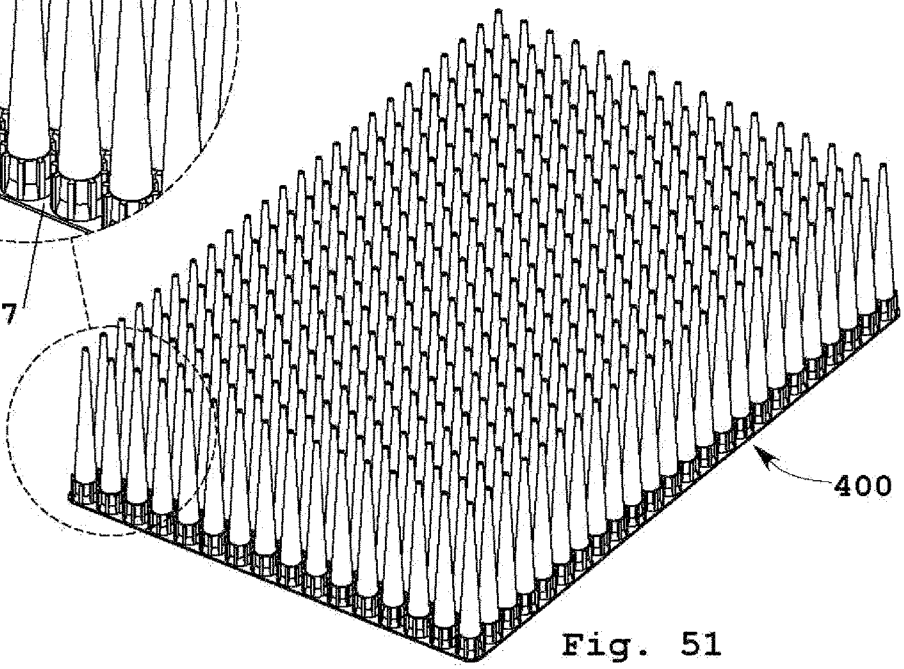
FIG. 51 shows a bottom perspective view of the assembly shown in FIG. 49
Figure 53:
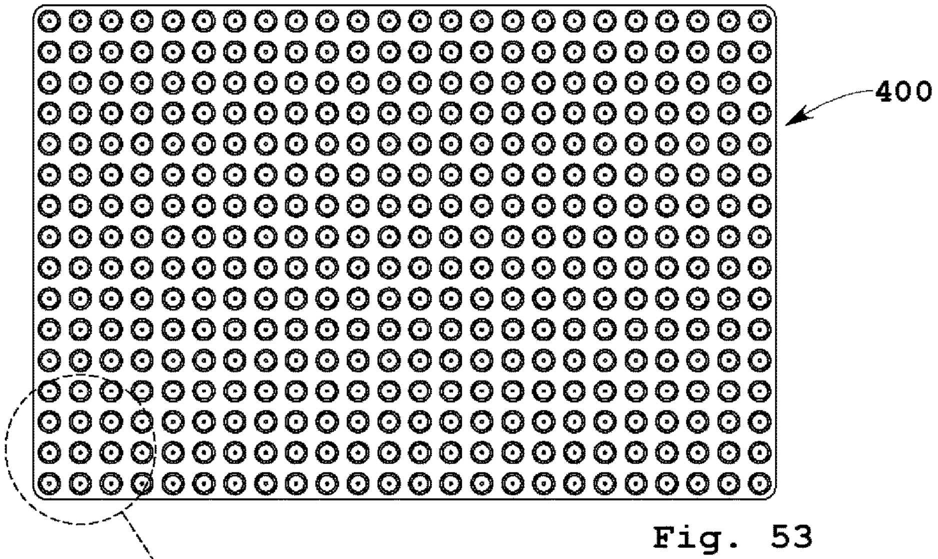
FIG. 53 shows a top view of the assembly shown in FIG.
Figure 54:
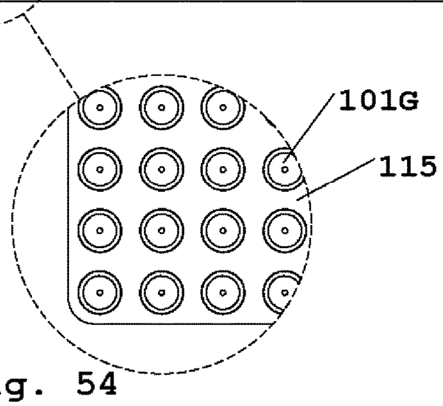
FIG. 54 shows an enlarged view of a portion of the assembly shown in FIG. 53.
Figure 56:
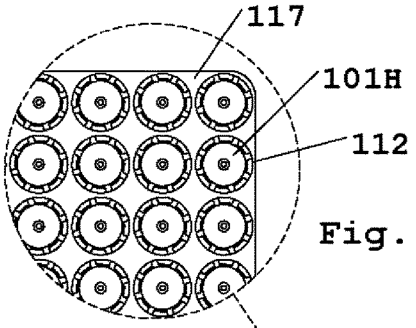
FIG. 56 shows an enlarged view of a portion of the assembly shown in FIG. 55.
Figure 55:
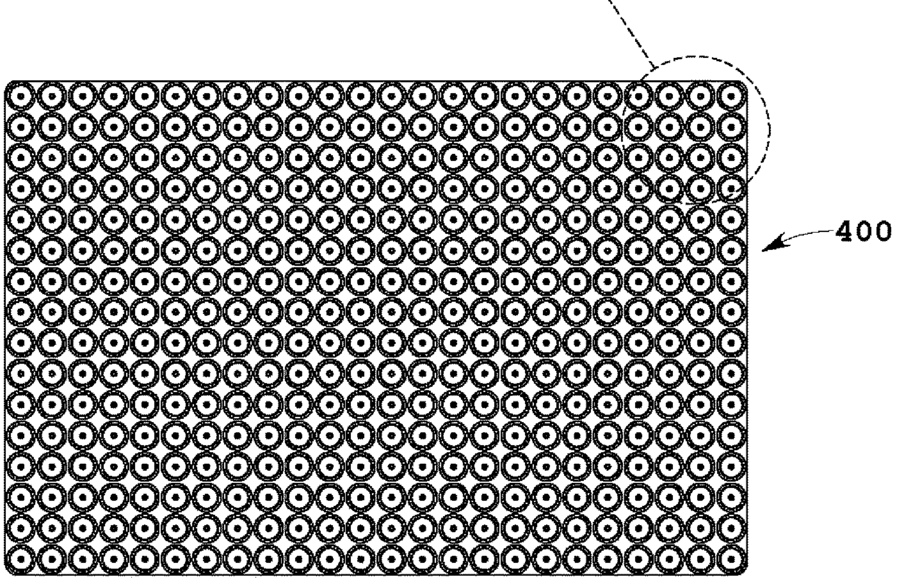
FIG. 55 shows a bottom view of the assembly shown in FIG. 49.
Figure 58:
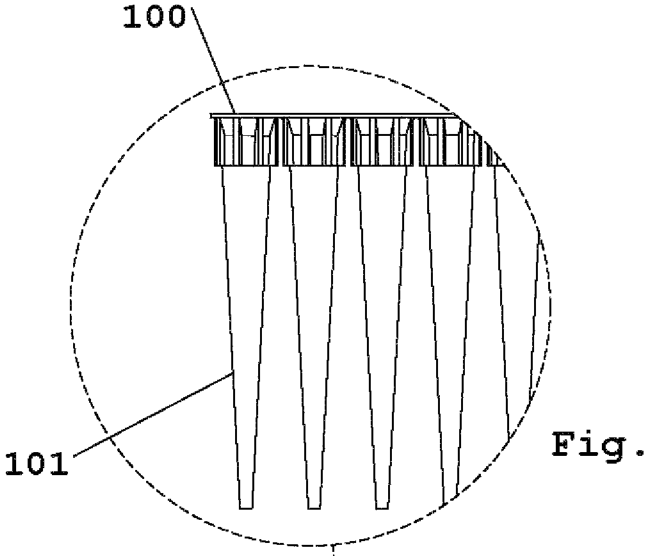
FIG. 58 shows an enlarged view of a portion of the assembly shown in FIG. 57.
Figure 57:
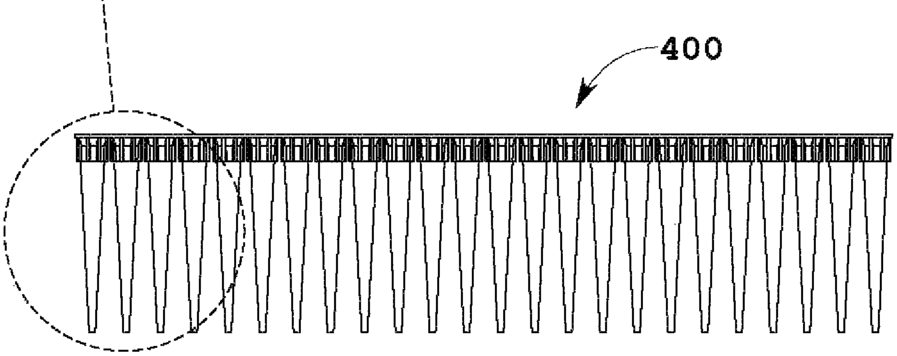
FIG. 57 shows a long side view of the assembly shown in FIG. 49.
Figure 59:
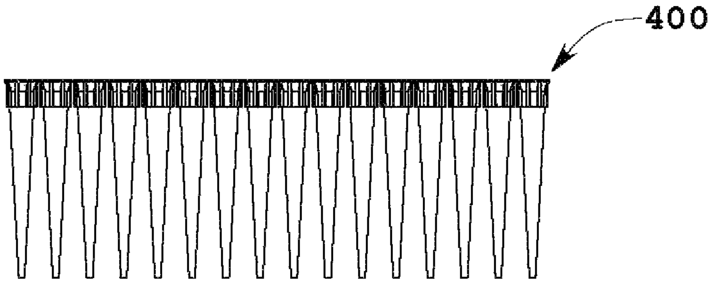
FIG. 59 shows a short side view of the assembly shown in FIG. 49.
Figure 62:
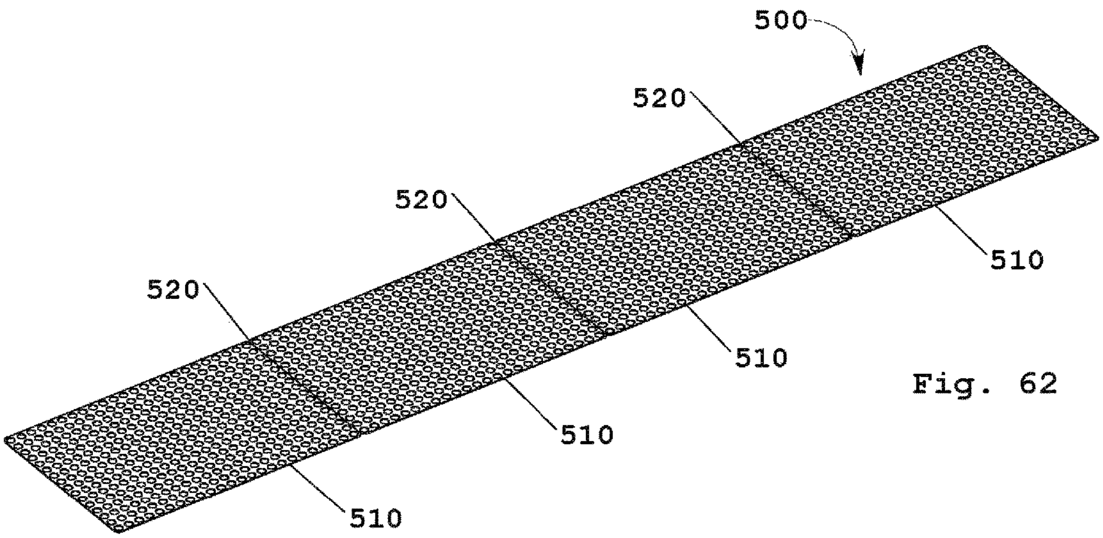
FIG. 62 shows a top perspective view of an assembly comprising multiple pipette tip retention sheet elements, where each sheet element is adjacent to another sheet element on the short side of the element. The assembly shown in FIG. 62 is in a flat orientation.
Figure 63:
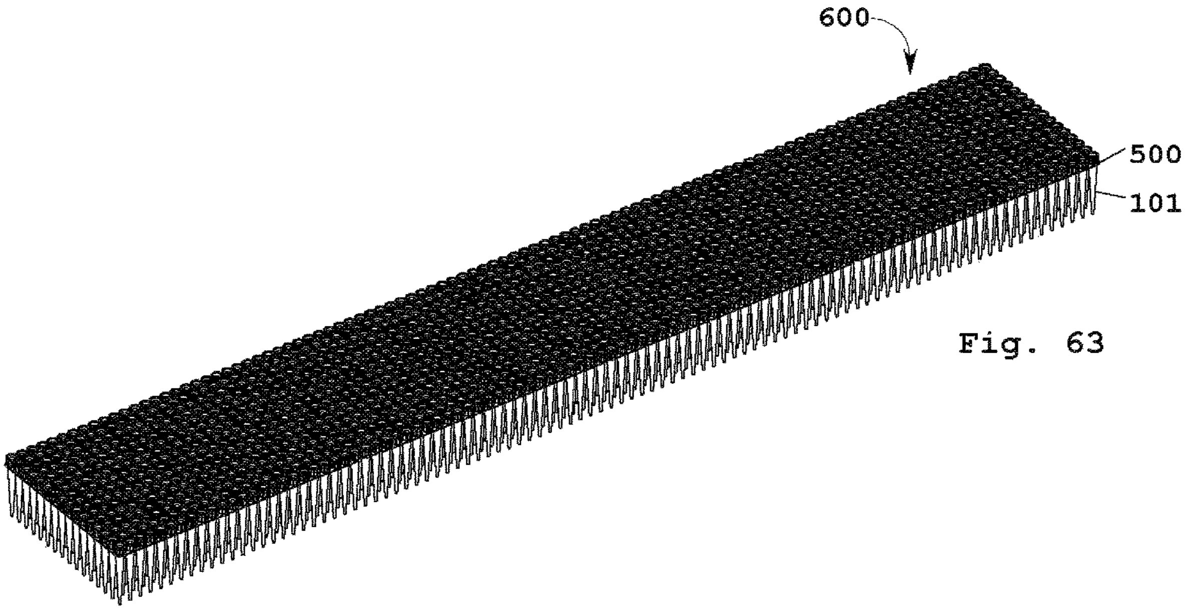
FIG. 63 shows a top perspective view of a variant of the assembly shown in FIG. 62 that comprises an array of pipette tips in each sheet disposed within holes of the sheet.
Figure 64:
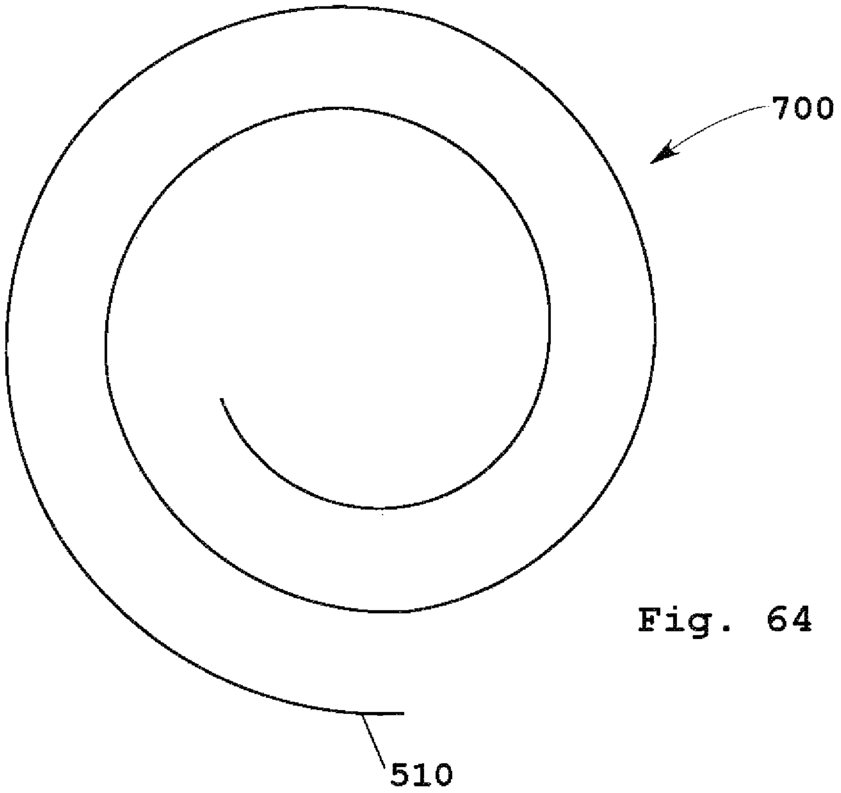
FIG. 64 shows a side view of the assembly shown in FIG. 62 in a coiled orientation.
Figure 65:
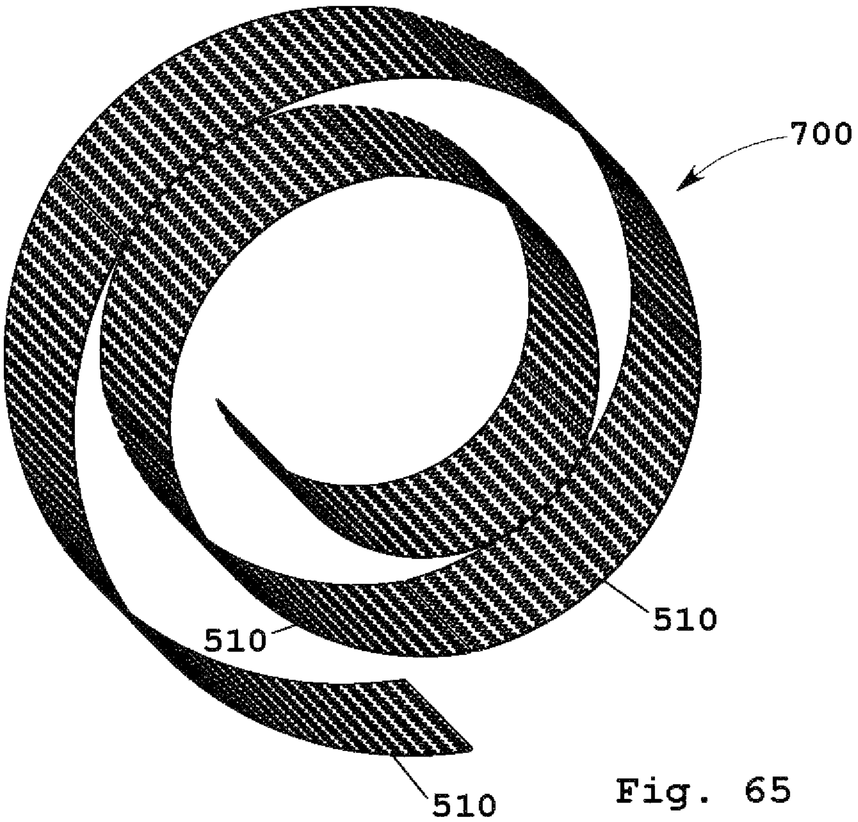
FIG. 65 shows a top perspective view of the assembly shown in FIG. 64.
Figure 66:
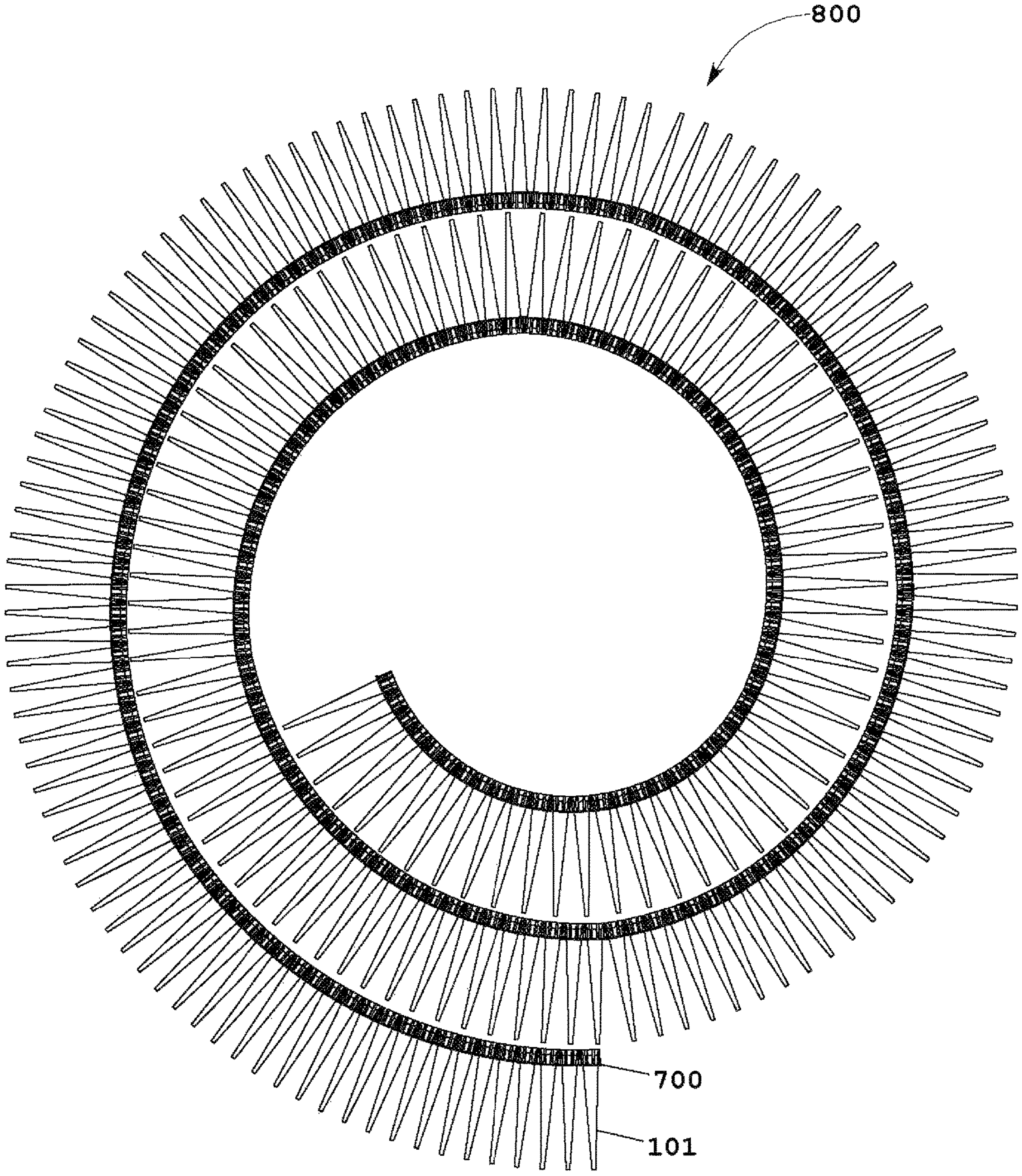
FIG. 66 shows a side view of the assembly shown in FIG. 63 in a coiled orientation.
Figure 67:
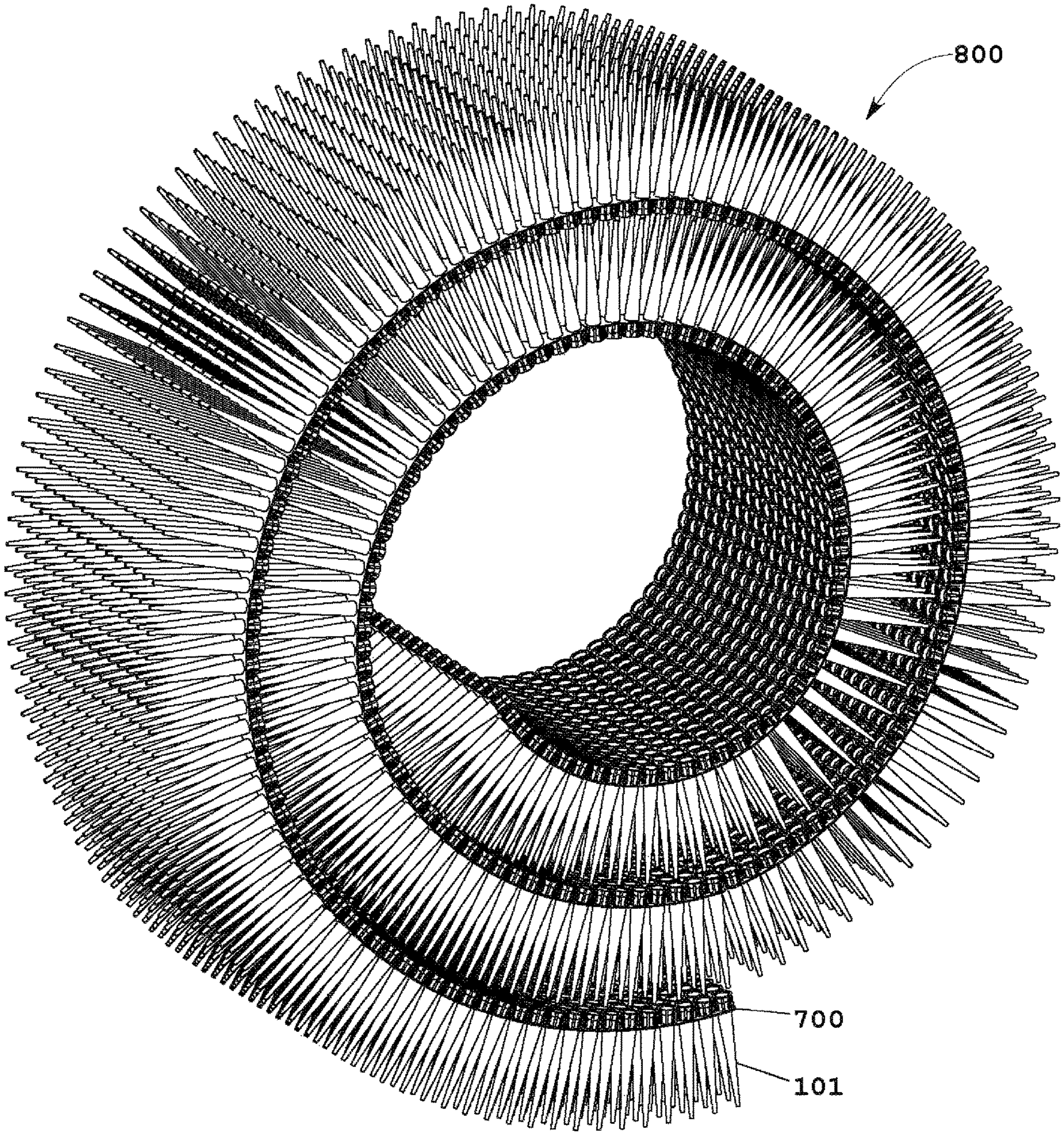
FIG. 67 shows a top perspective view of the assembly shown in FIG. 66.
Figure 70:
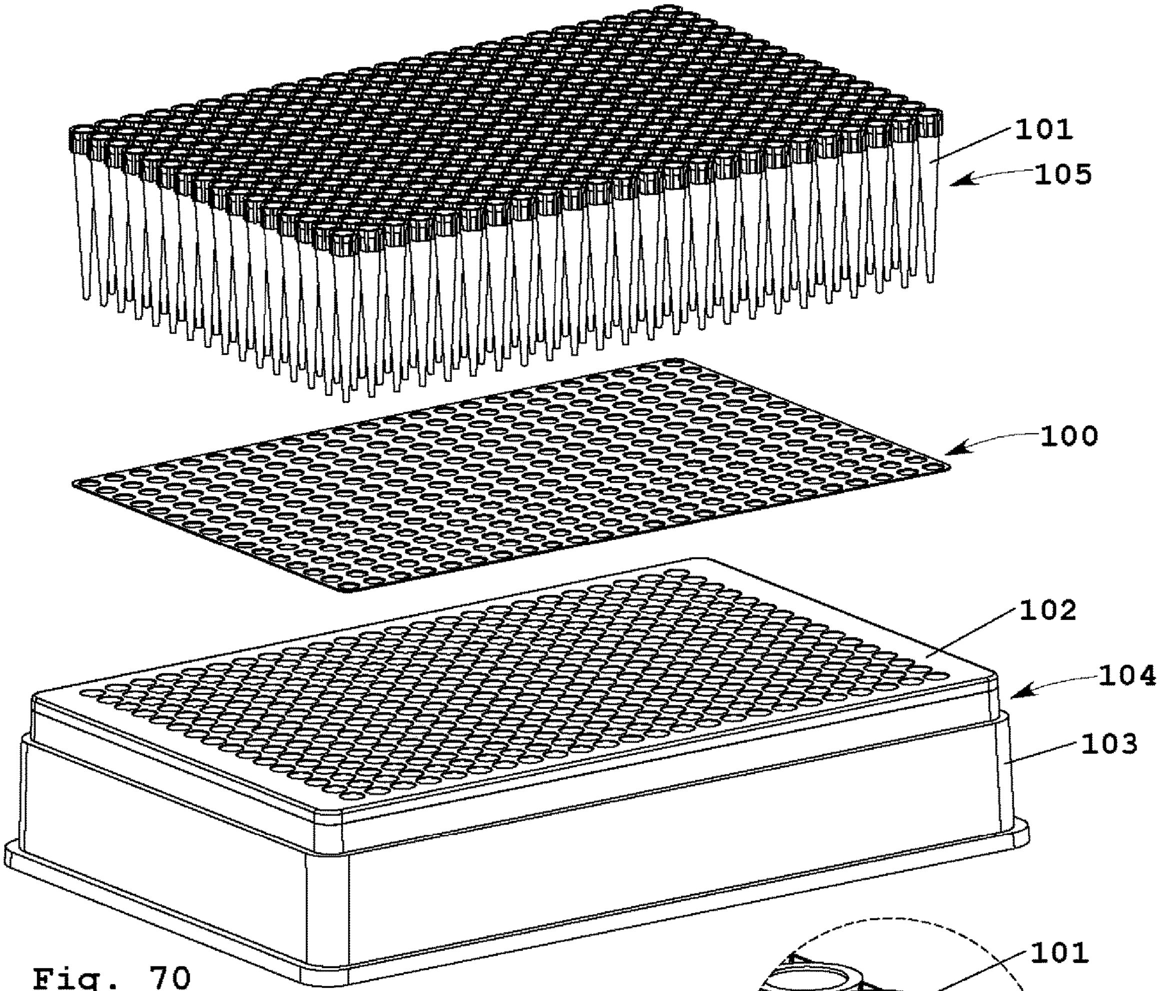
FIG. 70 shows an exploded view of the assembly shown in FIG. 68.
Figure 69:
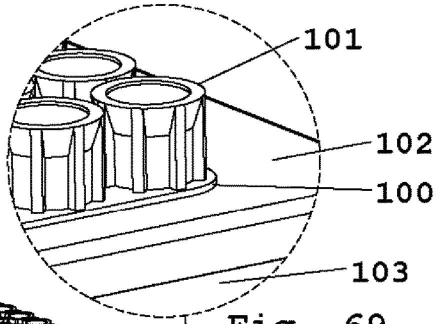
FIG. 69 shows an enlarged view of a portion of the assembly shown in FIG. 68.
Figure 68:
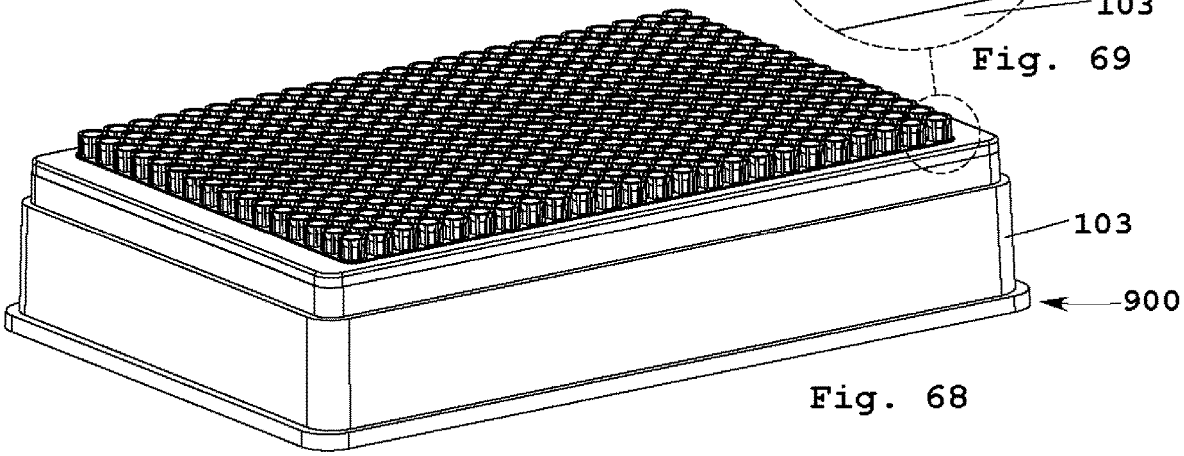
FIG. 68 shows a top perspective view of an assembly comprising a tray, a sheet and an array of pipette tips.
Figure 71:
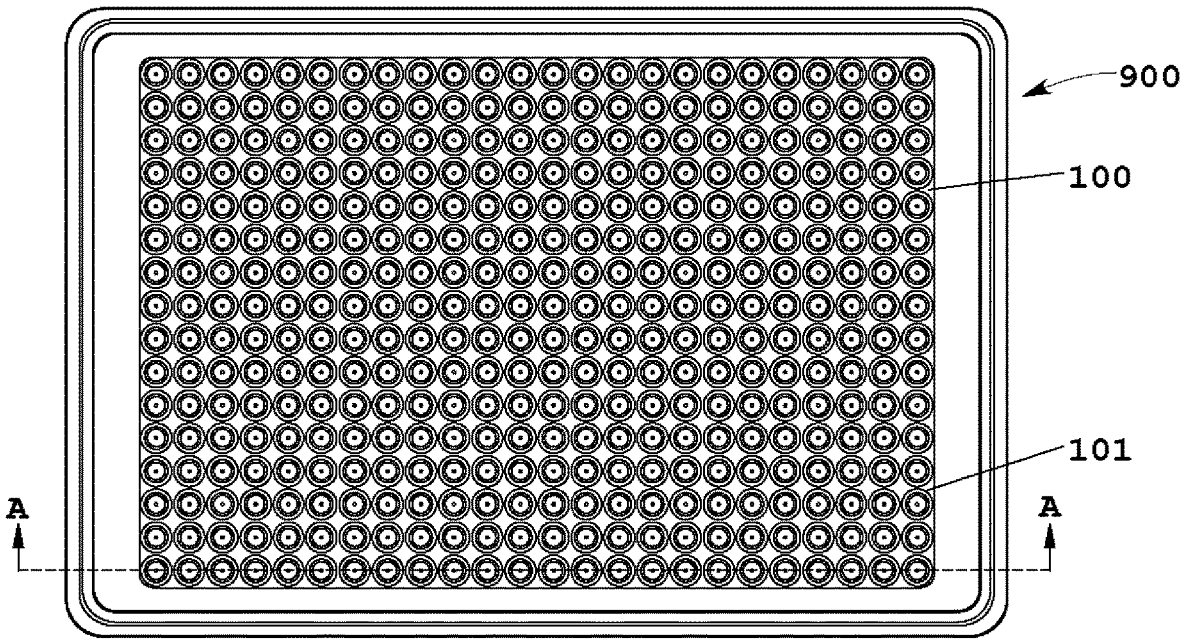
FIG. 71 shows a top view of the assembly shown in FIG. 68
Figure 72:
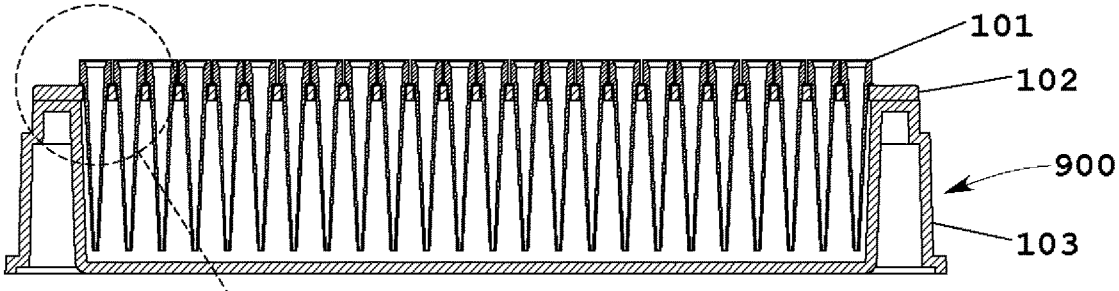
FIG. 72 shows a cross-section view of the assembly shown in FIG. 68 from the perspective defined by broken line A-A in FIG. 71.
Figure 73:
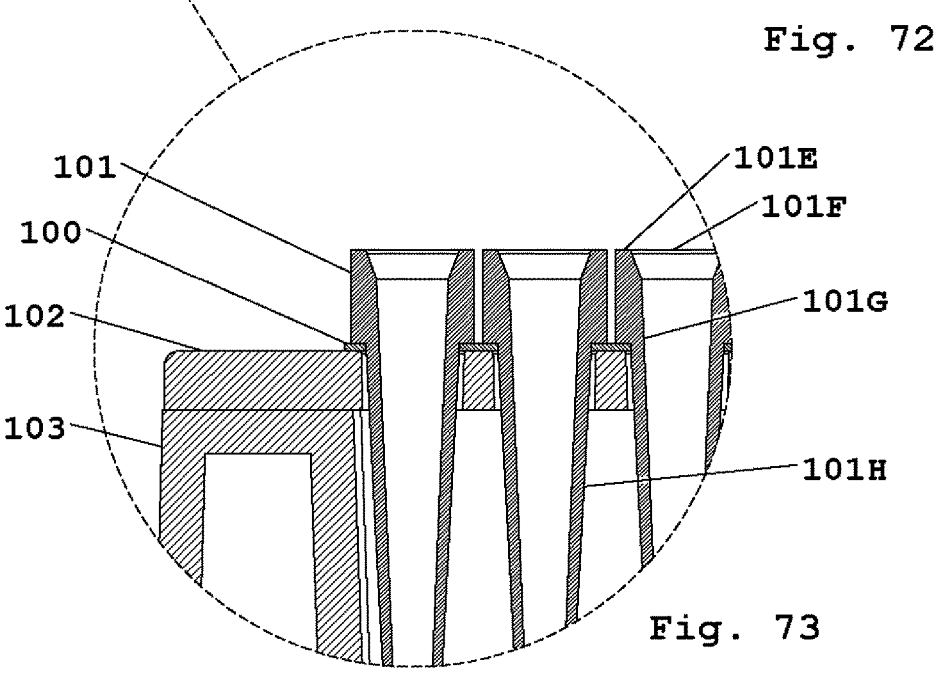
FIG. 73 shows an enlarged view of a portion of the cross section shown in FIG. 72.
Figure 74:
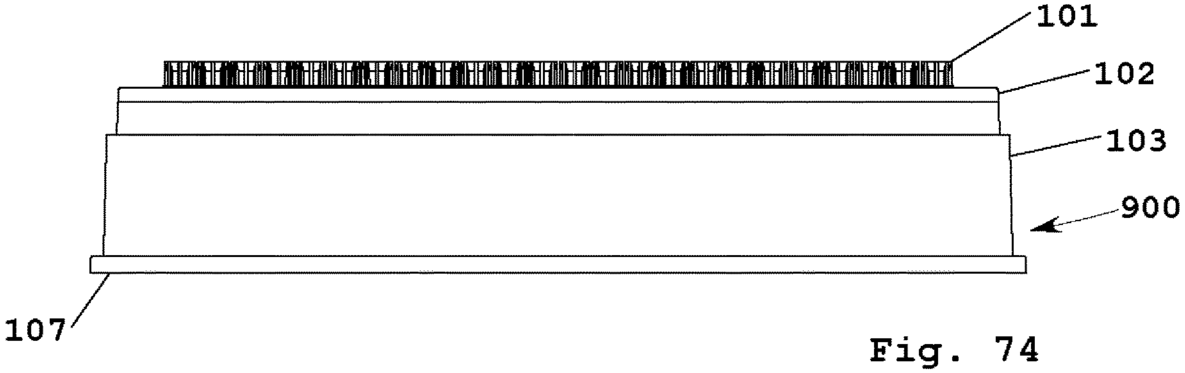
FIG. 74 shows a long side view.
Figure 75:
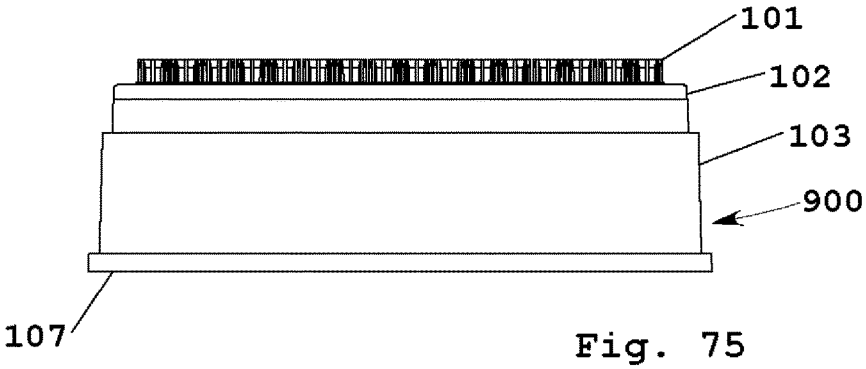
FIG. 75 shows a short side view, of the assembly shown in FIG. 68.
Figure 76:
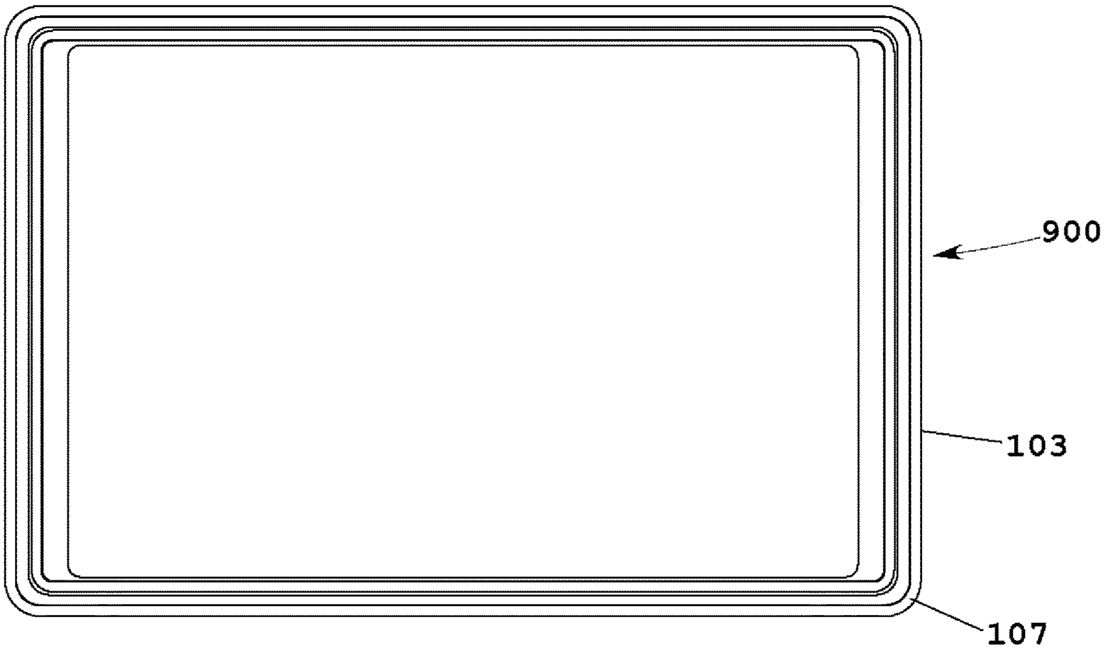
FIG. 76 shows a bottom view.
Figure 77:
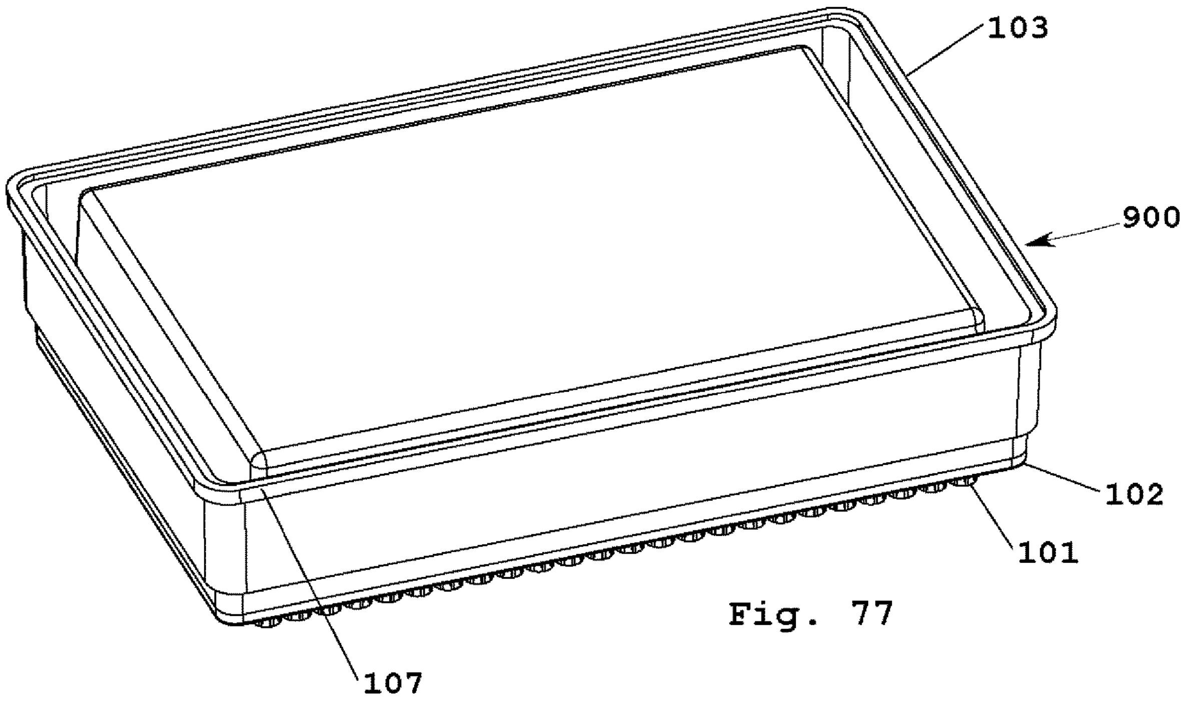
FIG. 77 shows a bottom perspective view, of the assembly shown in FIG. 68.

Non-limiting examples of assemblies that include multiple sheets are illustrated in FIG. 62 to FIG. 67. FIG. 62 shows an assembly that includes a planar arrangement of multiple sheet elements 510, which are similar to sheet 100. Assembly 500 shown in FIG. 62 includes internal boundaries 520 between each sheet element 510. Assembly 500 sometimes is manufactured by joining multiple separate sheet units (e.g., sheet 100) thereby forming internal boundaries 520 between the joined sheets. Assembly 500 sometimes is manufactured as one assembly and the multiple sheet elements 510 are distinguished by internal boundaries 520. FIG. 63 shows assembly 600, which includes assembly 500 in conjunction with arrays of retained pipette tips 101. FIG. 64 and FIG. 65 show assembly 500 in a coiled arrangement 700. FIG. 66 and FIG. 67 show assembly 600 in a coiled arrangement 800 in which pipette tips 101 are not nested in other pipette tips. In certain embodiments, a multiple sheet assembly may be provided that has pipette tips joined to one surface of one or more sheets in the assembly, as illustrated in FIG. 49 and FIG. 51 for example.

Figure 131:
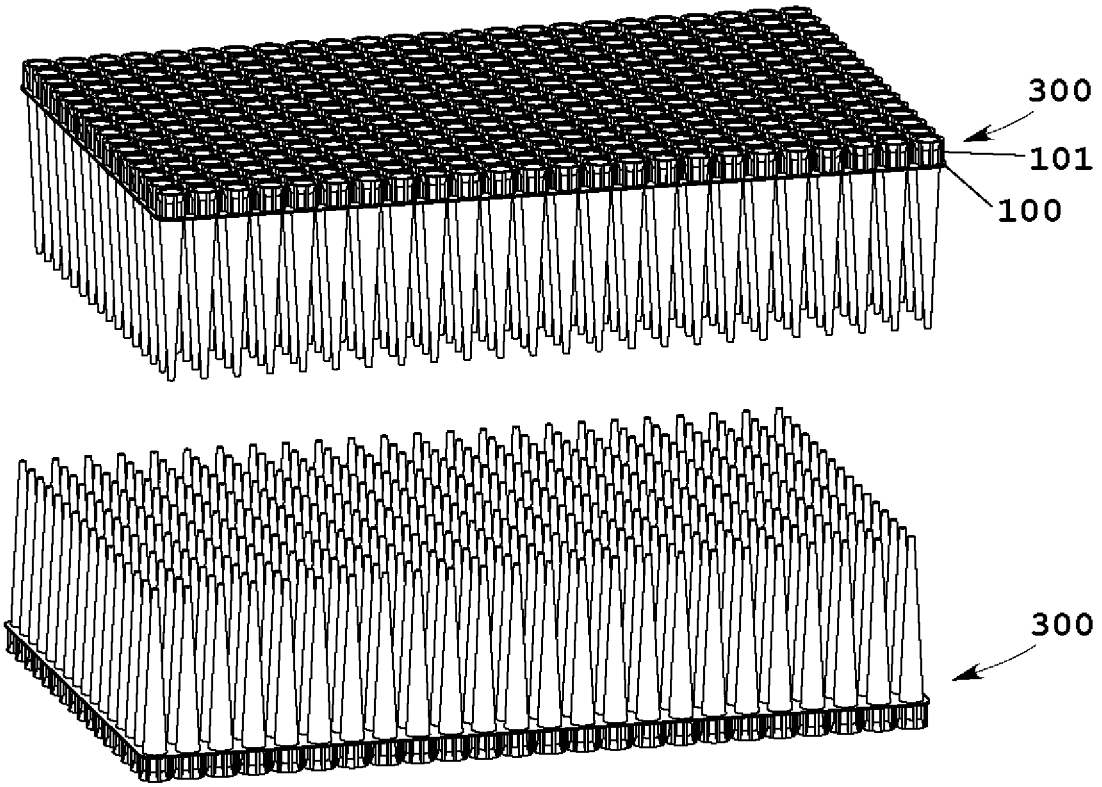
FIG. 131 shows an exploded view of the horizontally nested arrangement shown in FIG. 130.
Figure 135:
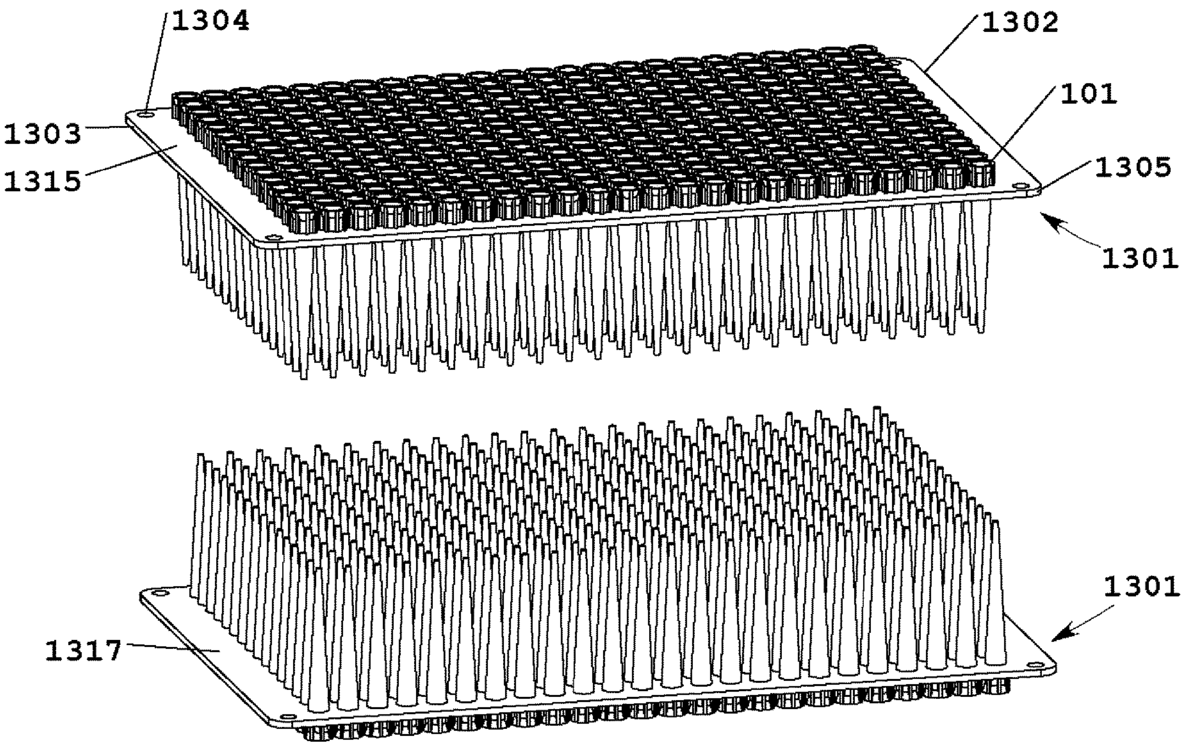
FIG. 135 shows an exploded view of the horizontally nested arrangement shown in FIG. 134.

In some embodiments, assembly 1100 is provided, as shown in FIG. 130 and FIG. 131, which includes horizontally nested pipette tips. Assembly 1300 is provided in certain embodiments, as shown in FIG. 134 and FIG. 135, which also includes horizontally nested pipette tips. Sheet 1302 in assembly 1300 is thicker than sheet 100 in assembly 1100, and sheet 1302 includes alignment member 1304 that facilitates alignment with a pipette tip tray rack. Sheet 1302 can serve as a pipette tip receptacle plate when placed in association with a rack.

Figure 92:
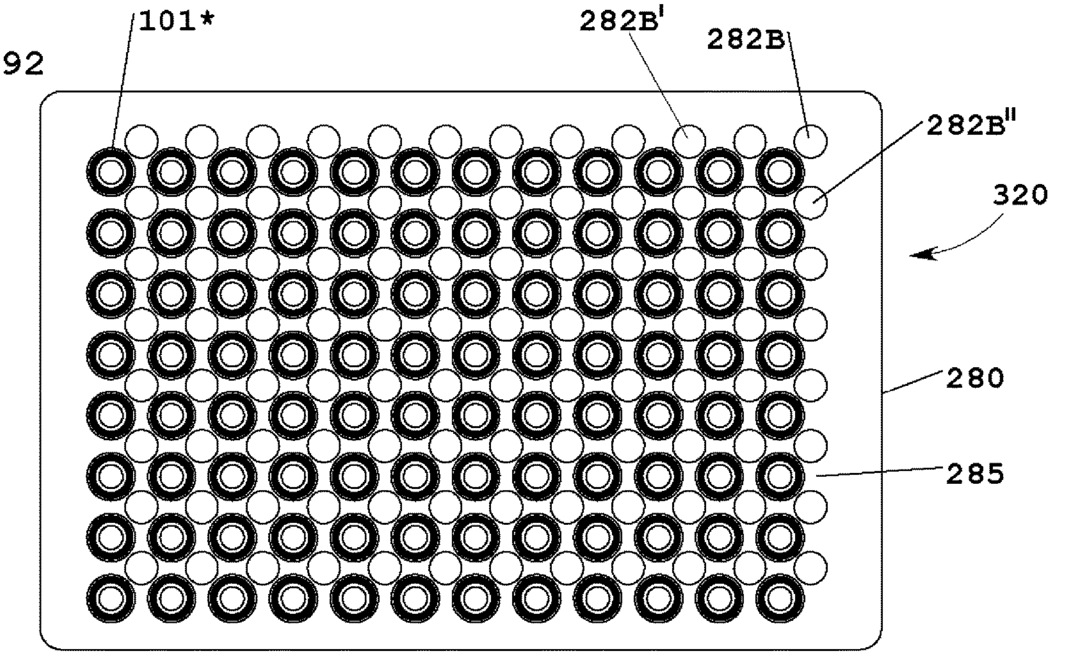
FIG. 92 and FIG. 95 each show a top view of an assembly of a pipette tip retention sheet shown in FIG. 88 in association with pipette tips in an array of pipette tips retained in holes of the sheet.
Figure 93:
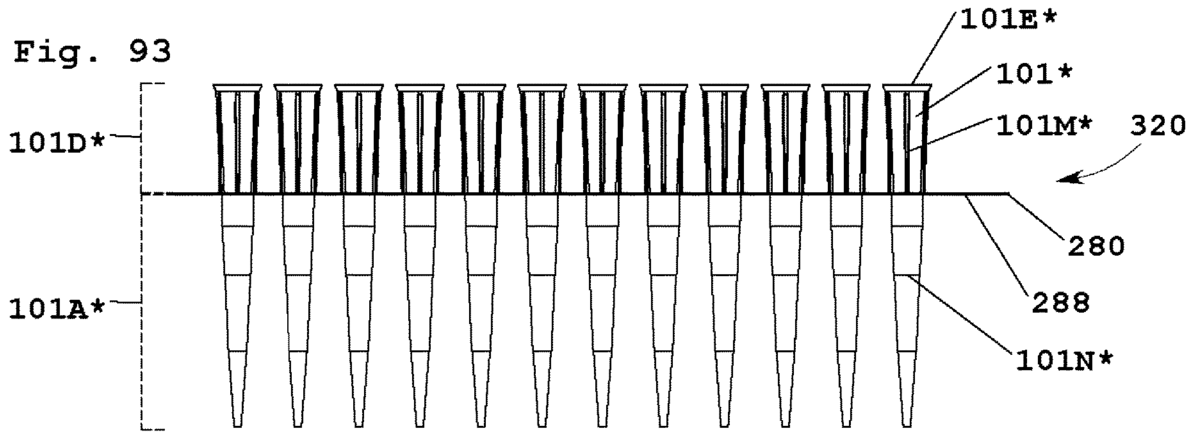
FIG. 93 and FIG. 94 show a long side view and a short side view, respectively, of the assembly shown in FIG. 92.
Figure 94:
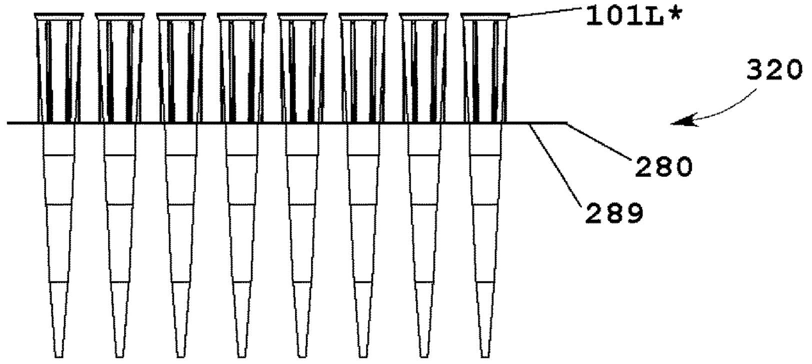
Figure 95:
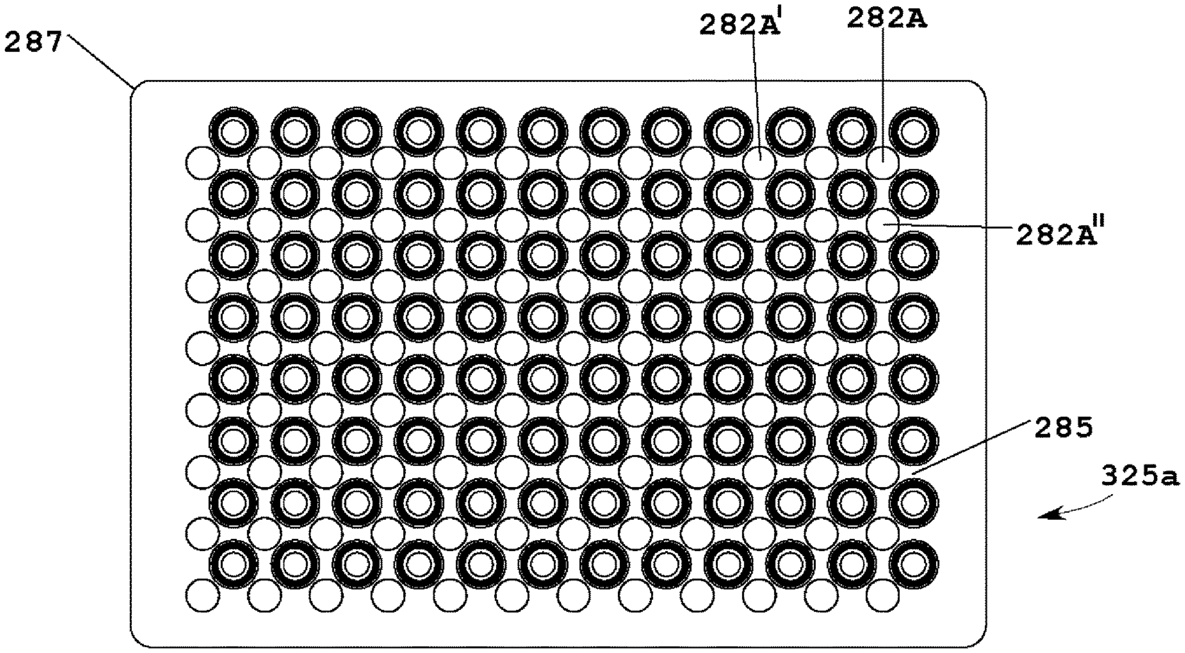
Figure 98:
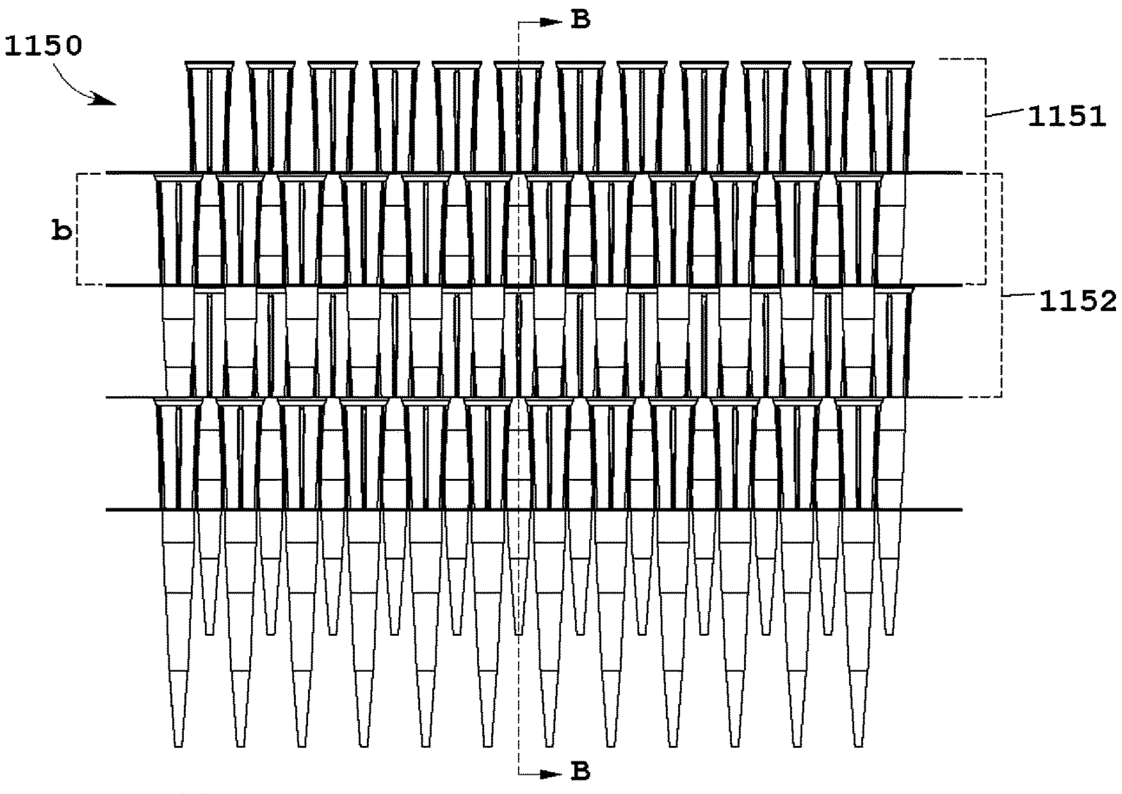
FIG. 98 shows a side view of the assembly shown in FIG. 97.
Figure 96:
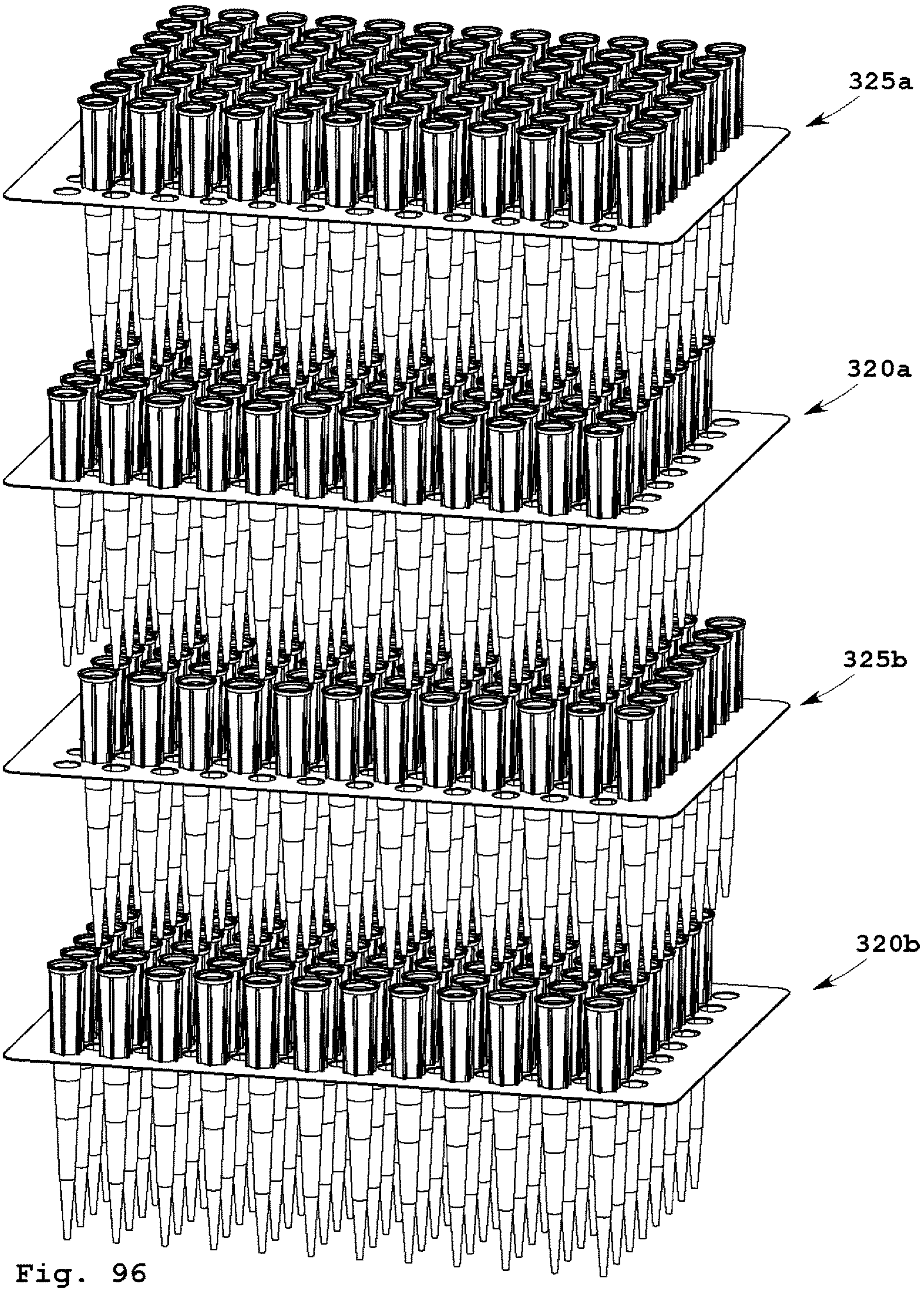
FIG. 96 shows a top perspective exploded view of the assembly shown in FIG. 97.
Figure 97:
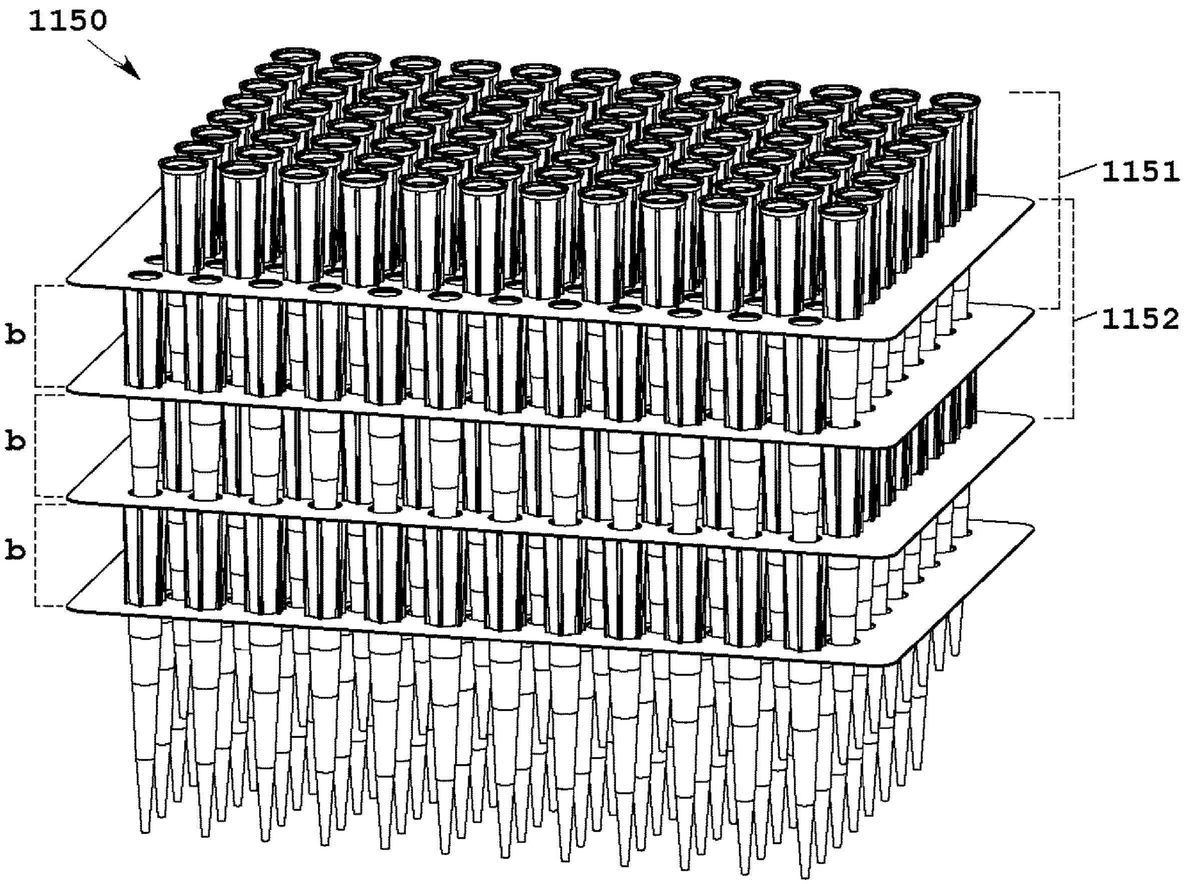
FIG. 97 shows a top perspective view of an assembly of nested sub-assemblies shown in FIG. 92 and FIG. 95.

Other horizontally nested assemblies also are described herein. For example, assembly 1150 shown in FIG. 97 includes horizontally nested pipette tips, where the number of holes in each sheet is greater than the number of pipette tips retained by the sheet (an exploded view is shown in FIG. 96). About half of the holes in sub-assembly **325*a* retain pipette tips and about half of the holes in sub-assembly 320*a* retain pipette tips (e.g., sub-assembly 320 shown in FIG. 92 is the same as sub-assembly 320*a* shown in FIG. 96). The sheets in sub-assemblies 325*a* and 320*a* are the same and are in the same orientation. Pipette tips are retained in a first set of holes located in sub-assembly 325*a* (e.g., holes in the "A" positions: holes 282A, 282A' and 282A") and pipette tips are retained in a second set of holes located in sub-assembly 320*a* (e.g., holes in the "B" positions: holes 282B, 282B' and 282B"), where the first set of holes are in different locations than the second set of holes. For a hole that retains a pipette tip in the first sheet, the same hole located directly below in the second sheet does not retain a pipette tip and receives the distal region of the pipette tip retained in the first sheet, thereby allowing for nesting of the pipette tip in the first sheet (e.g., see FIG. 97 and FIG. 99). In certain embodiments, the first set of holes and the second set of holes sometimes are in alternating rows, where one row of holes in each sheet retains pipette tips and the adjacent row of holes does not retain pipette tips. For a row of holes that retains pipette tips in the first sheet, the same row of holes directly below in the second sheet often do not retain pipette tips and receive the distal region of pipette tips retained in the first sheet, thereby allowing for nesting of the pipette tips in the first sheet. Sheets shown in FIG. 88 to FIG. 106** can be useful for retaining about 96 pipette tips, in some embodiments.

Figure 133:
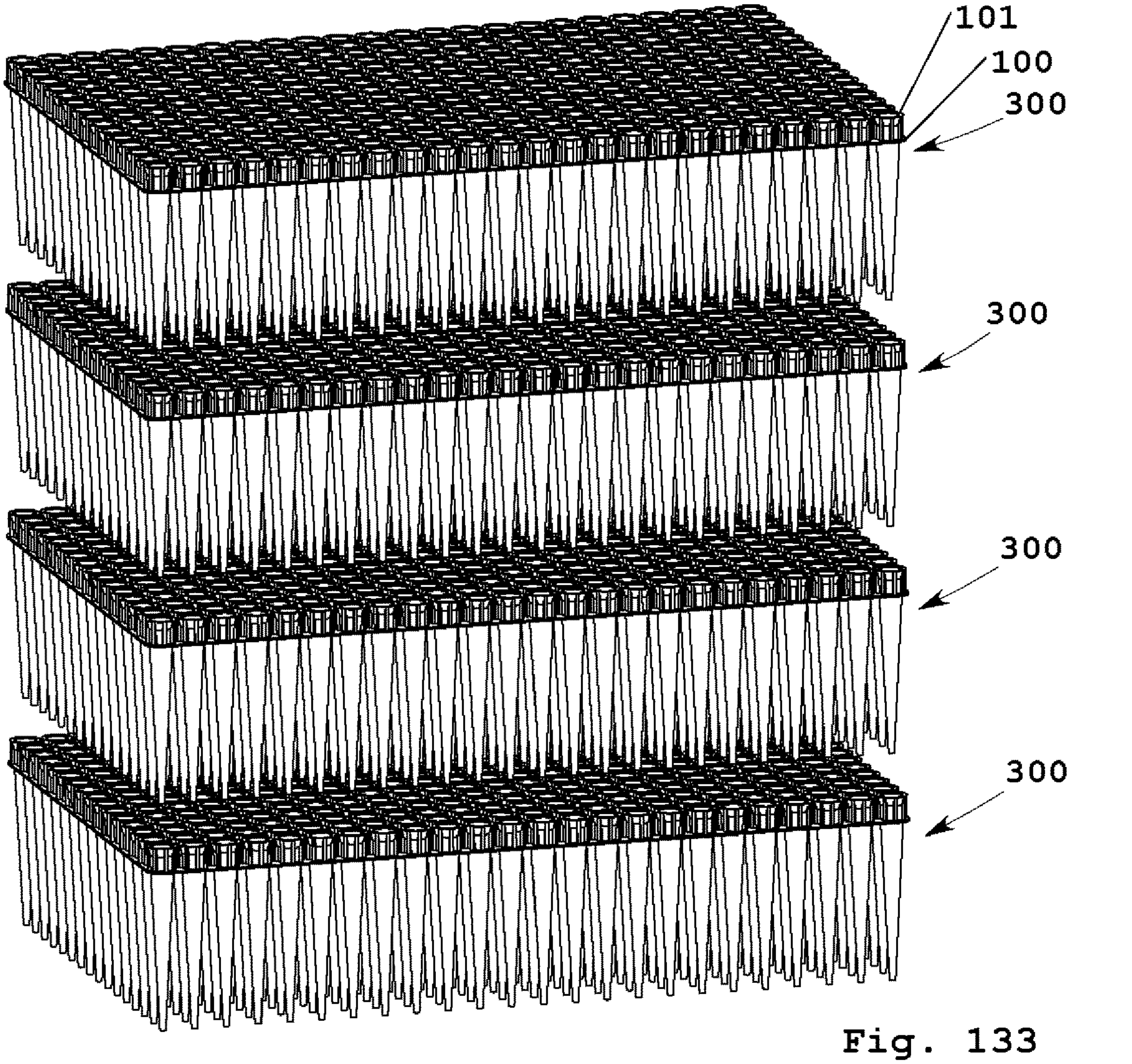
FIG. 133 shows an exploded view of the vertically nested arrangement shown in FIG. 132.
Figure 137:
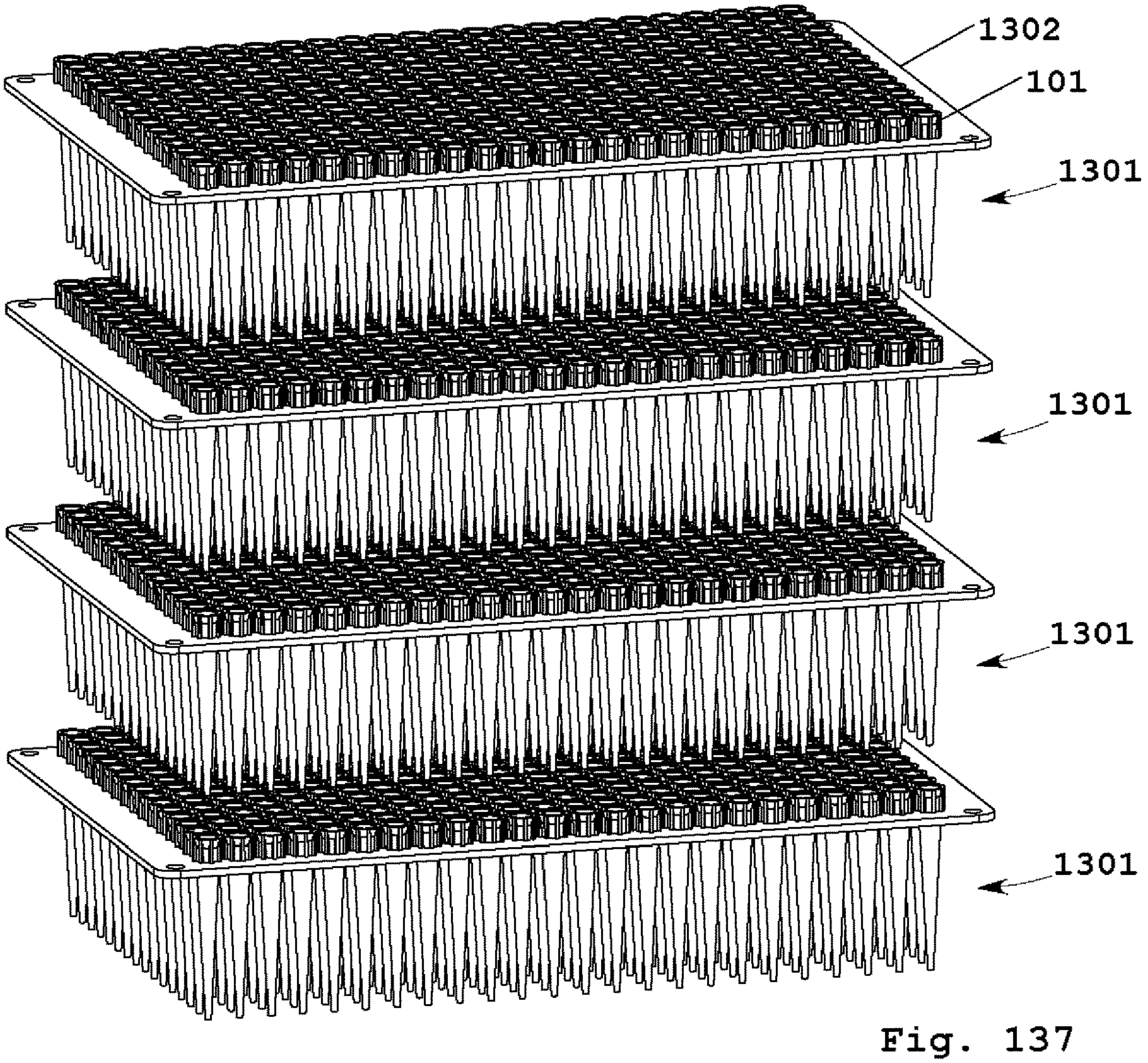
FIG. 137 shows an exploded view of the vertically nested arrangement shown in FIG. 136.

In certain embodiments, assembly 1200 is provided, as shown in FIG. 132 and FIG. 133, which includes vertically nested pipette tips. In assembly 1200, pipette tips of a first sub-assembly 300 are nested in pipette tips of a second sub-assembly 300 located below the first sub-assembly. Assembly 1350 is provided in certain embodiments, as shown in FIG. 136 and FIG. 137, which also includes vertically nested pipette tips. Sheet 1302 in assembly 1350 is thicker than sheet 100 in assembly 1200, and sheet 1302 includes alignment member 1304 that facilitates alignment with a pipette tip tray rack.

Sheet assemblies 1100, 1160, 1170, 1180, 1200, 1300, 1350 and 1550 can be utilized as part of a pipette tip reload system. A pipette tip reload system sometimes includes use of a pipette tip tray rack with a pipette tip receptacle plate (e.g., for use with assemblies 1100 or 1200). A pipette tip reload system sometimes includes use of a pipette tip tray rack without a pipette tip receptacle plate (e.g., for use with assemblies 1300 or 1350, where the pipette tip retention sheet 1302 can serve as a pipette tip receptacle plate when joined to a tray rack). Variations of assemblies 1100, 1200, 1300 and 1350 that include sub-assemblies arranged with the proximal termini of pipette tips joined to a sheet second surface (e.g., sub-assembly 400 shown in FIG. 51) can be provided.

An assembly, in certain embodiments, comprises a pipette tip receptacle plate (also referred to as a "snap plate" herein), configured to engage with a rack of a pipette tip tray, a sheet described herein, and optionally an array of pipette tips retained in association with holes of the sheet. A pipette tip tray often includes a rack, a pipette tip receptacle plate in association with the rack, optionally an array of pipette tips, and optionally a lid. Any suitable pipette tray can be utilized in conjunction with a sheet described herein, and non-limiting examples of pipette trays are shown and described in U.S. patent application publication no. US20110236278A1 and U.S. patent application publication no. US20140234182A1. In certain embodiments, an assembly consists of a sheet, an array of pipette tips retained in the sheet, and a pipette tip tray. A pipette tip tray sometimes consists of a rack base, sometimes consists of a rack base and a pipette tip receptacle plate, sometimes consists of a rack base and a lid, and sometimes consists of a rack base, a pipette tip receptacle plate and a lid. A pipette tip receptacle plate sometimes is releasably engaged with, non-releasably engaged with, and/or integrated with a rack base.

A pipette tip receptacle plate often includes an array of holes, where each hole in the array of holes is configured to receive a pipette tip in an array of pipette tips. A pipette tip receptacle plate sometimes is provided in association with a pipette tip tray, where the tray comprises a rack with the pipette tip receptacle plate engaged with the rack, and where the tray optionally includes a lid. A sheet described herein often is in association with a surface of the pipette tip receptacle plate (e.g., the top surface of the pipette tip receptacle plate). A pipette tip receptacle plate typically includes holes configured to receive pipette tips, and the number of holes and positions of the holes in the pipette tip receptacle plate often correspond with the number of holes and the positions of the holes in the sheet. A sheet often is positioned on the top surface of the pipette tip receptacle plate with holes of the sheet co-located with holes of the pipette tip receptacle plate. Holes of the sheet often are concentric with holes of the pipette tip receptacle plate. Holes of the sheet sometimes have a diameter smaller than the diameter of holes of the pipette tip receptacle plate.

In certain embodiments multiple sheets having a surface area smaller than a pipette tip receptacle plate surface area are in association with different regions of a pipette tip receptacle plate surface of a pipette tip tray assembly. Two or more sheets sometimes are arranged in different regions of a pipette tip receptacle plate surface (e.g., 2, 3, 4, 5, 6, 7, 8, 9, 10, 11, 12 or more sheets), often are arranged on a pipette tip receptacle plate surface as one sheet layer. Sometimes an edge of one or more or all sheets is in contact with an edge of another sheet. The summed surface area of each of the multiple sheets arranged at different regions on a pipette tip receptacle plate surface sometimes equals, or substantially equals, the surface area of the pipette tip receptacle plate surface on which the sheets are arranged. The multiple sheets sometimes each have equal numbers of holes, and the sheets associated with a pipette tip receptacle plate, in total, often include the same number of holes as the number of holes in the pipette tip receptacle plate. In certain embodiments, each sheet is separate and none of the sides of the sheets are attached to other sheets, thereby permitting a dispenser to engage and manipulate a subset of pipette tips in the tray (e.g., first subset of pipette tips) separately from another subset of pipette tips in the tray (e.g., second subset of pipette tips). In some embodiments, a pipette tip receptacle plate is in association with four sheets, each sheet in association with a quadrant of the pipette tip receptacle plate and each sheet containing the same number of holes.

A sheet sometimes has the same surface area and/or footprint, or substantially the same surface area and/or footprint, as a pipette tip receptacle plate associated with the sheet, and sometimes the surface area and/or footprint of a sheet is slightly less than the surface area and/or footprint of a pipette tip receptacle plate. A tray in some embodiments includes an alignment structure configured to align a sheet onto the pipette tip receptacle plate, such that holes in the sheet are concentric or substantially concentric with holes in the pipette tip receptacle plate. Any alignment structure suitable for aligning a sheet with a pipette tip receptacle plate can be utilized. An alignment structure sometimes is a rim defined by the proximal inner wall surface of a rack revealed as a result of the pipette tip receptacle plate being mounted lower than the top edge of the rack walls, for example. An alignment structure sometimes is one or more projections or ridges molded on the top surface of a pipette tip receptacle plate configured to align with the sheet perimeter, or portion thereof. An alignment structure sometimes is one or more projections or ridges configured to be received by one or more counterpart recesses or voids in a sheet. A sheet sometimes is not adhered to a pipette tip receptacle plate, and in some embodiments a sheet is releasably adhered to the pipette tip receptacle plate.

In certain embodiments, a pipette tip retention sheet described herein can function as a pipette tip receptacle plate, and can be associated with a rack as part of a tray assembly. In such embodiments, a pipette tip retention sheet serves as the pipette tip receptacle plate without requiring a separate pipette tip receptacle plate in association with a rack. When placed in association with a rack, a sheet serving as a pipette tip receptacle plate often is reversibly associated with the rack. This reversible association of the sheet serving as a pipette tip receptacle plate with the rack is in contrast to a typical arrangement in which a pipette tip receptacle plate is fixedly connected to the rack (e.g., via a weld, adhesive, bond, connector(s), interference fit). A sheet serving as a pipette tip receptacle plate often is not adhered to and not fixedly connected to a rack (e.g., not welded, not glued, not fastened, not connected via connectors). A sheet serving as a pipette tip receptacle plate sometimes is associated with a rack under the force of gravity, and flipping a receptacle plate/tray assembly, such that the first surface of the receptacle plate opposes the ground and is parallel to the ground, can release the receptacle plate from the rack. A sheet serving as a pipette tip receptacle plate often is in reversible association with a rack to permit a fluid dispensing device to engage pipette tips retained by the receptacle plate, and separate the receptacle plate and retained pipette tips from the tray as a unit. A sheet serving as a pipette tip receptacle plate sometimes is of a substantially uniform thickness, and sometimes is of a thickness of about 0.01 inches to about 0.25 inches (e.g., about 0.01 inches thick to about 0.1 inches thick; about 0.03 inches thick to about 0.7 inches thick, about 0.04 inches thick to about 0.06 inches thick; about 0.02, 0.03, 0.04, 0.05, 0.06, 0.07, 0.08 or 0.09 inches thick). A sheet serving as a pipette tip receptacle plate sometimes is aligned with a surface of a rack via one or more alignment members (e.g., holes and pins). In some embodiments, a sheet serving as a pipette tip receptacle plate includes one or more first alignment members (e.g., alignment holes) and a rack includes one or more counterpart second alignment members (e.g., pins).

Figure 106:
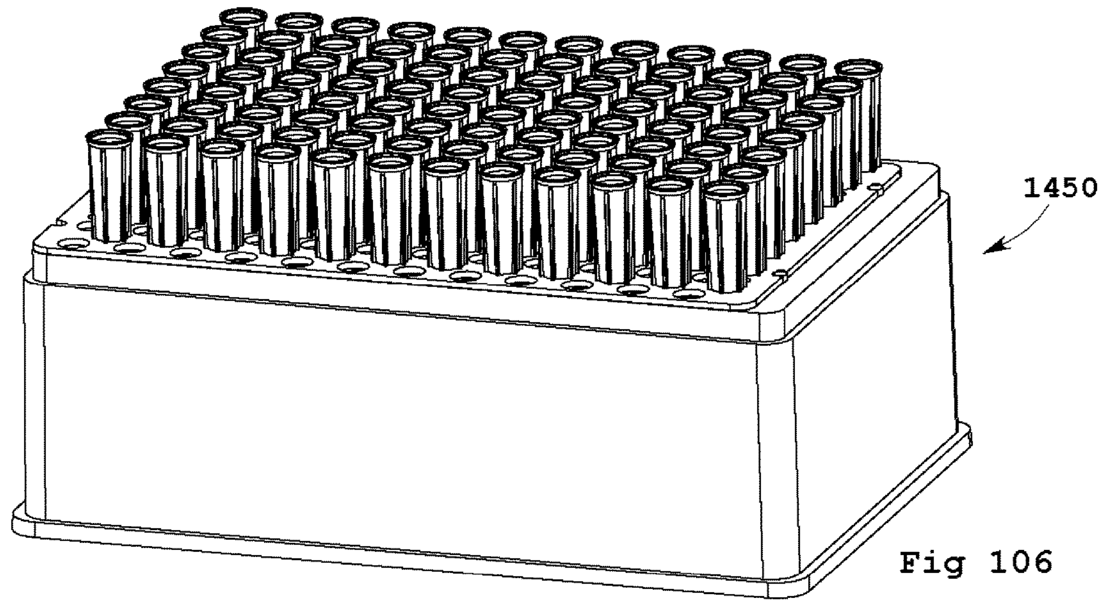
FIG. 106 shows a top perspective view of an assembly having a tray and one sub-assembly shown in FIG. 104.

Sheet 290 shown in FIG. 100 is thicker than sheet 280 shown in FIG. 88 and can serve as a pipette tip receptacle plate that can be placed in association with a pipette tip tray rack. Sheet 290 sometimes includes optional first alignment members (e.g., internal and/or external alignment members 293 and 294 (e.g., holes)) that can contact second alignment members 1405 (e.g., alignment pins) of rack 1400. An example of an assembly comprising a pipette tip tray rack and pipette tip receptacle plate containing a greater number of holes than retained pipette tips is shown in FIG. 106. Sheet 290 is in reversible contact with proximal surface 1413 of rack 1400.

Figure 118:
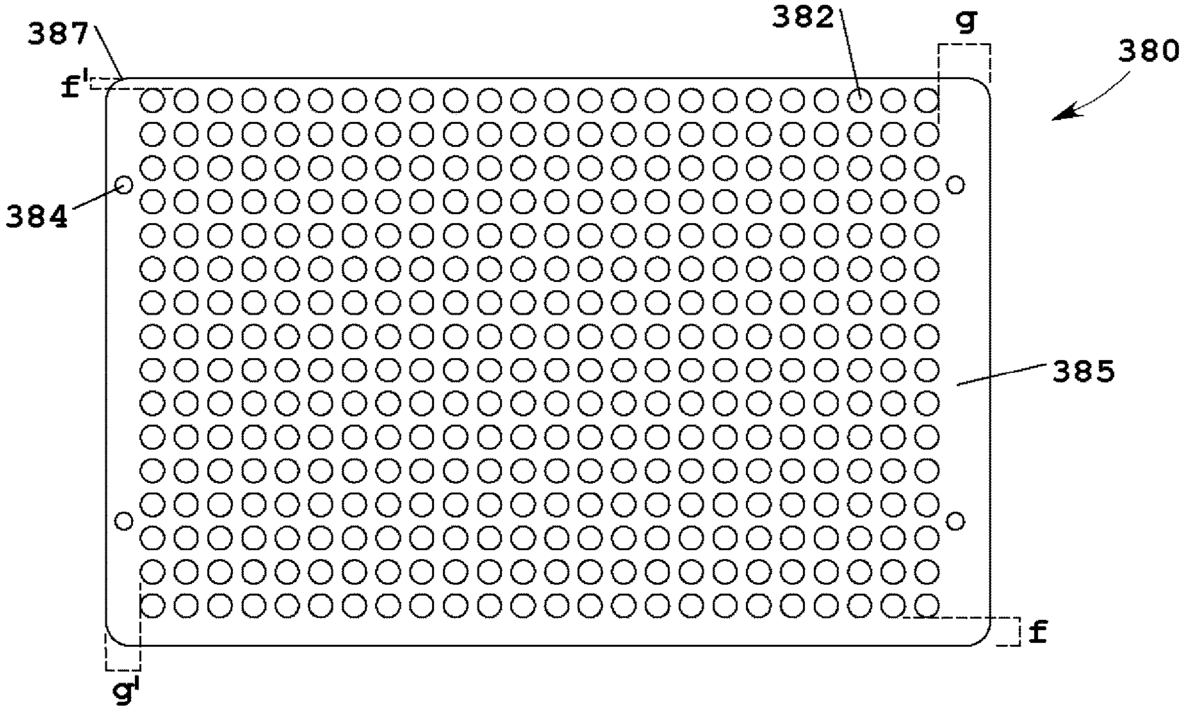
FIG. 118 shows a top view of a pipette tip retention sheet embodiment having hole-to-edge offsets of varying widths (i.e., with offsets f, f', g and g') and having a sheet thickness greater than the thickness of the sheet shown in FIG. 108.
Figure 119:
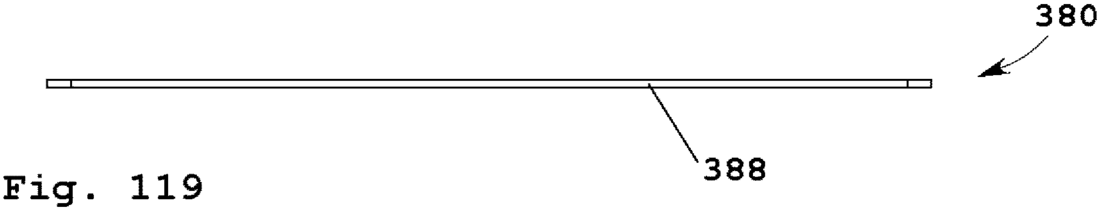
FIG. 119 and FIG. 120 show a long side view and a short side view, respectively, of the sheet shown in FIG. 118.
Figure 120:
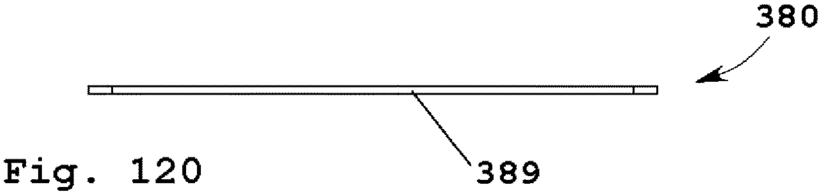
Figure 121:
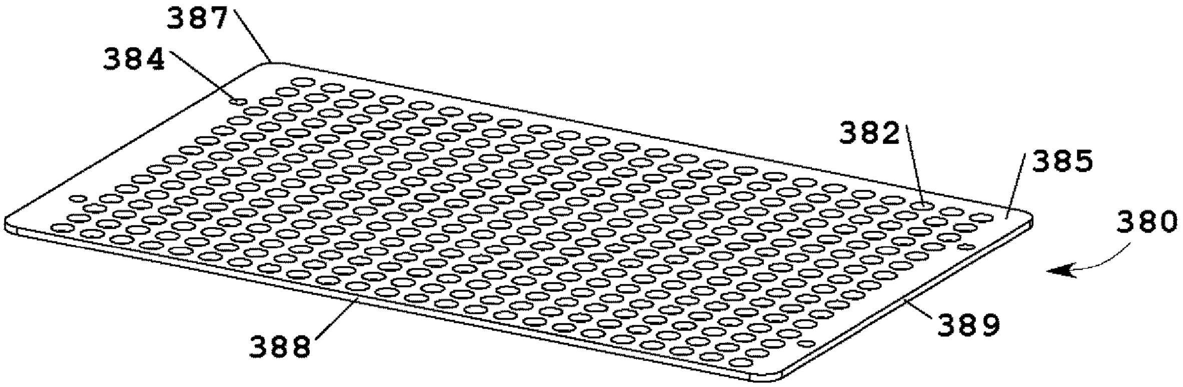
FIG. 121 shows a top perspective view of the sheet shown in FIG. 118.
Figure 122:
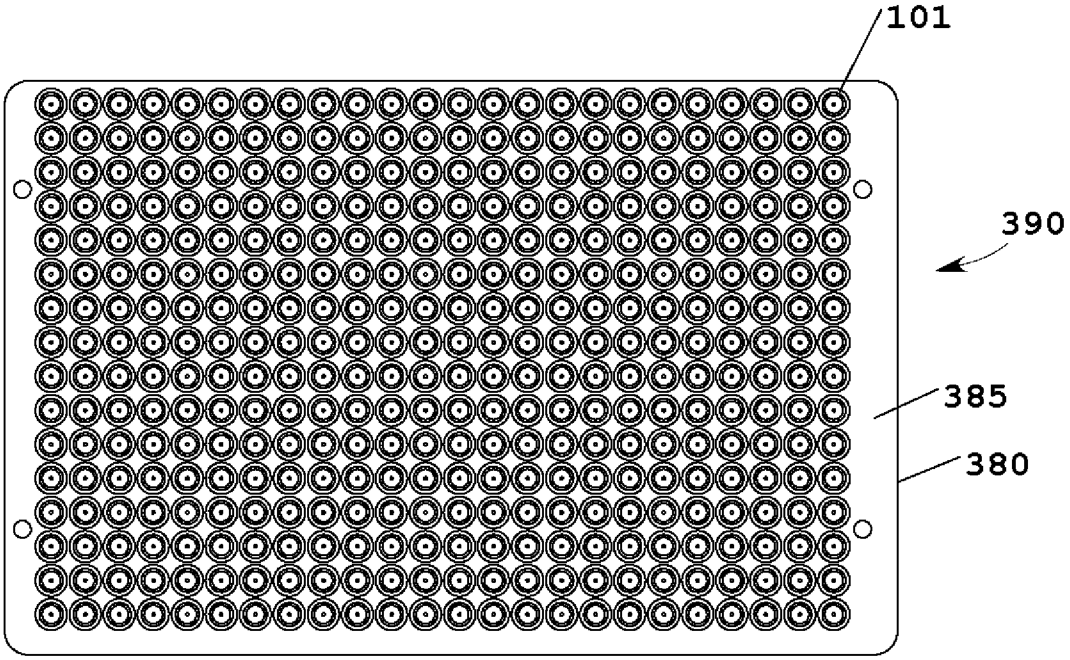
FIG. 122 shows a top view of an assembly of a pipette tip retention sheet shown in FIG. 118 in association with pipette tips in an array of pipette tips retained in holes of the sheet.
Figure 123:
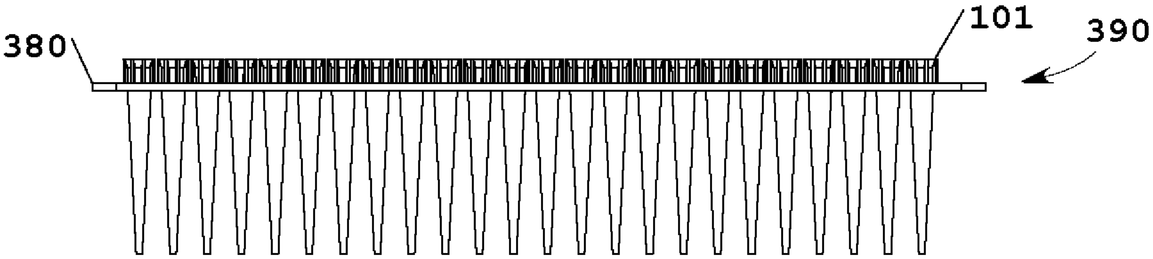
FIG. 123 and FIG. 124 show a long side view and a short side view, respectively, of the assembly shown in FIG. 122.
Figure 124:
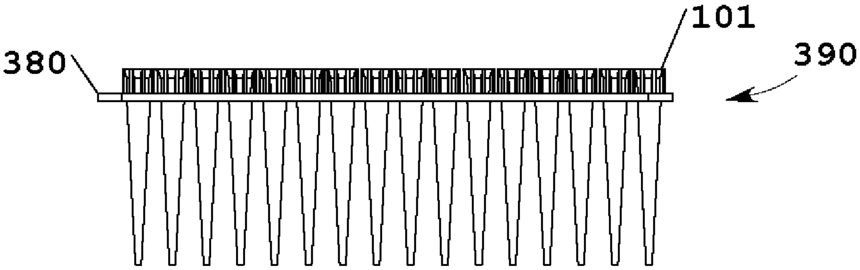
Figure 125:
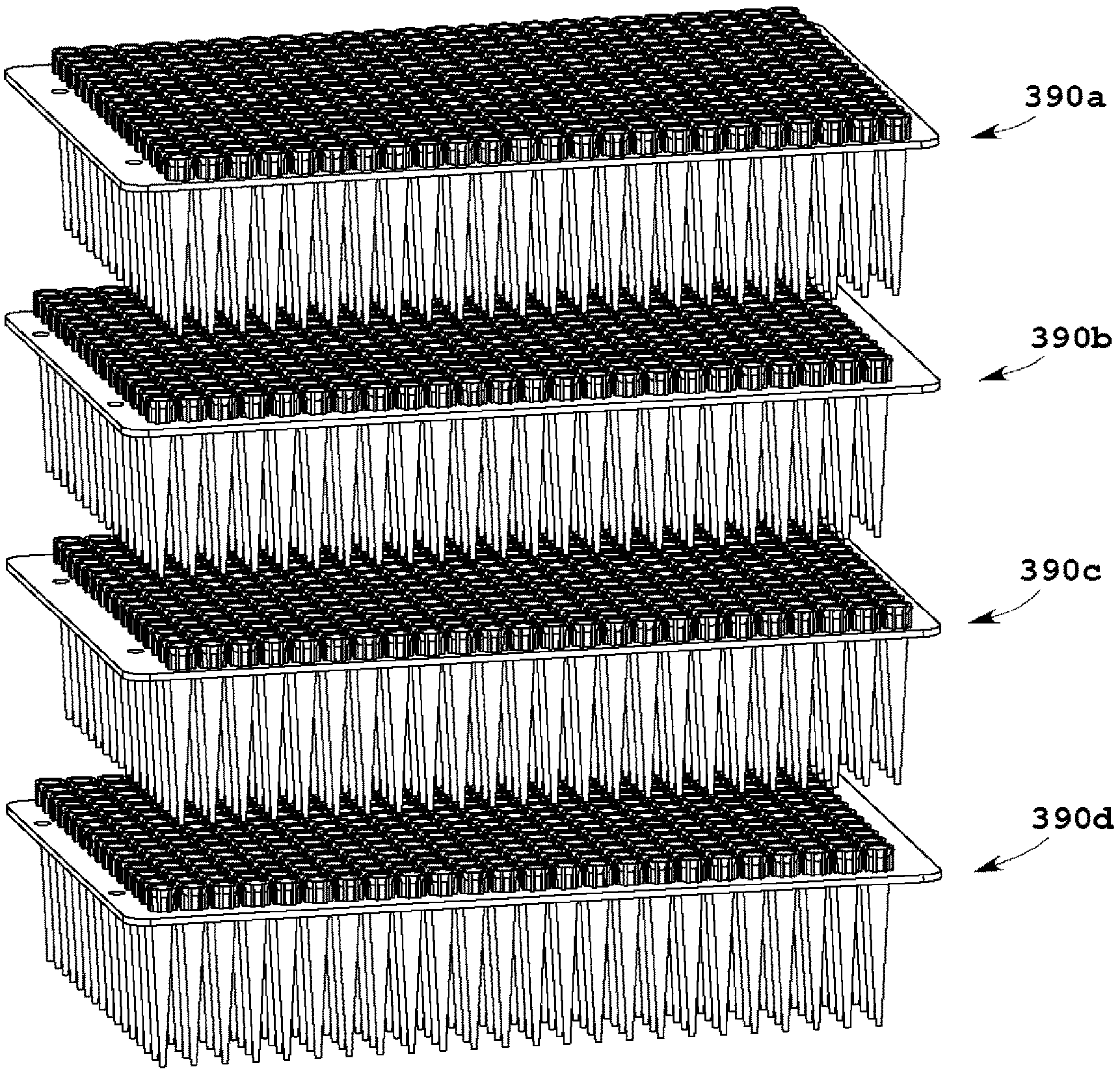
FIG. 125 shows a top perspective exploded view of the assembly shown in FIG. 126.
Figure 126:
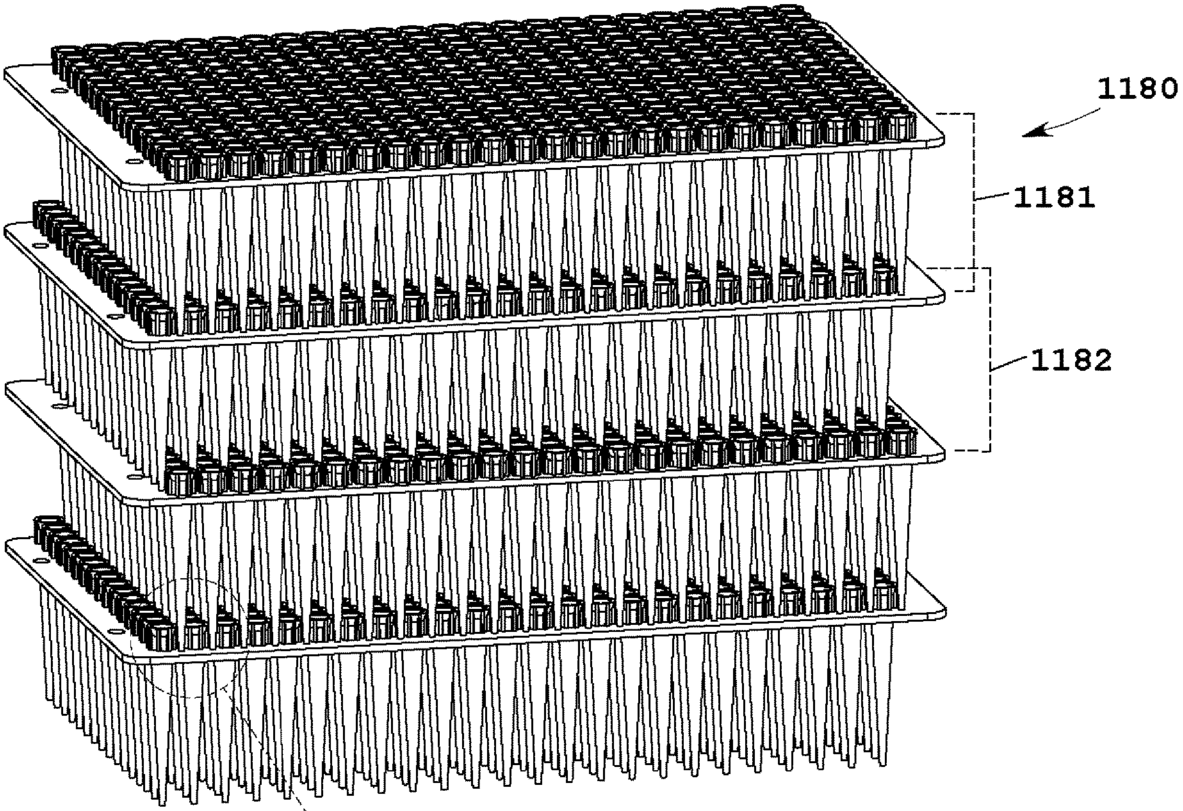
FIG. 126 shows a top perspective view of an assembly of nested sub-assemblies shown in FIG. 122.
Figure 127:
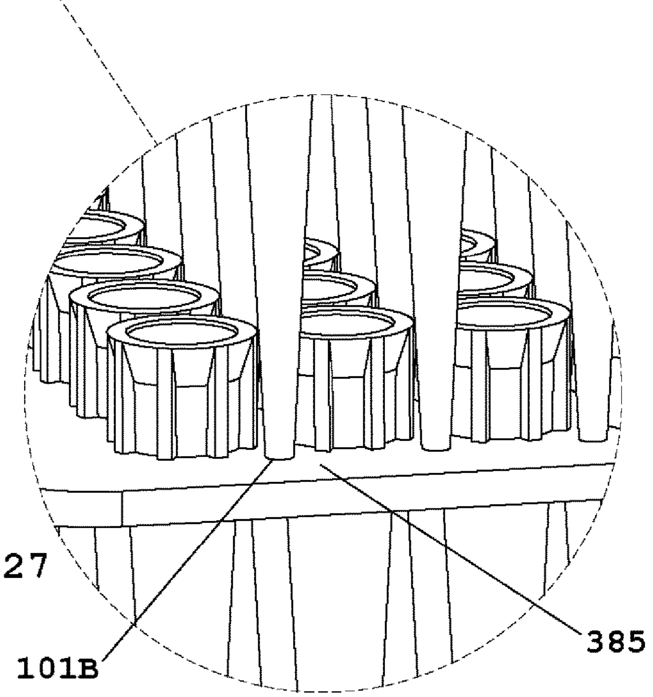
FIG. 127 shows an enlarged view of the portion delineated by a broken circle shown in FIG. 126.
Figure 129:
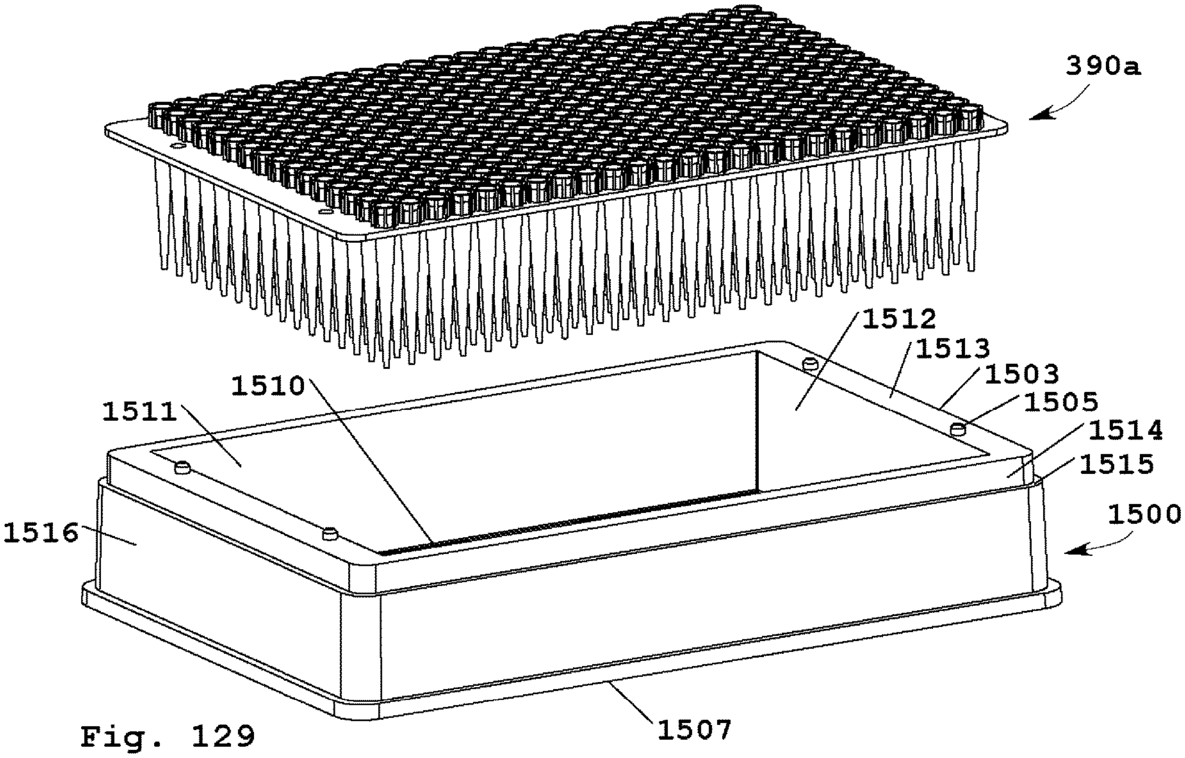
FIG. 129 shows an exploded view of the assembly shown in FIG. 128.
Figure 128:
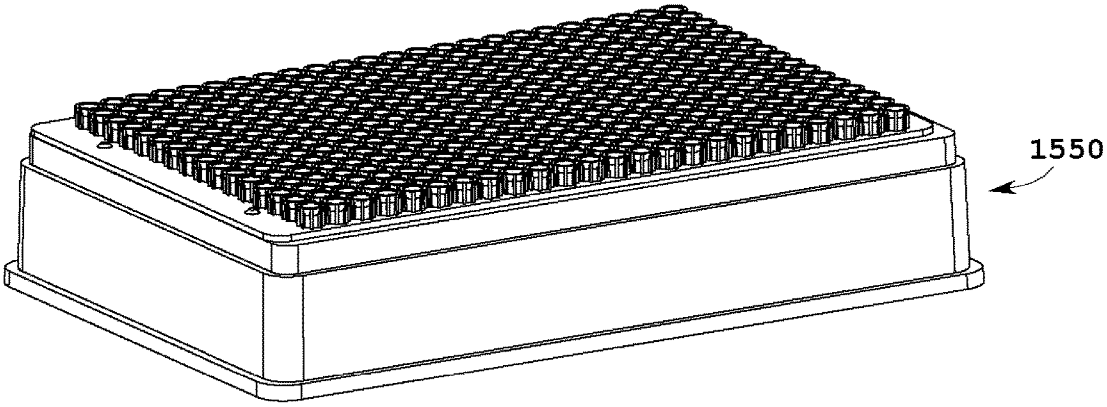
FIG. 128 shows a top perspective view of an assembly having a tray and a sub-assembly shown in FIG. 122.

Sheet 380 shown in FIG. 118 is thicker than sheet 360 shown in FIG. 108 and can serve as a pipette tip receptacle plate that can be placed in association with a pipette tip tray rack. Sheet 380 sometimes includes optional first alignment members 384 (e.g., internal alignment holes)) that can contact second alignment members 1505 (e.g., alignment pins) of rack 1500. An example of an assembly comprising a pipette tip tray rack and pipette tip receptacle plate containing different hole-to-sheet edge offset distances is shown as assembly 1550 in FIG. 128. Sheet 380 is in reversible contact with proximal surface 1513 of rack 1500.

Thus, certain embodiments are directed in part to an assembly or apparatus that includes a snap plate having a plurality of snap plate holes, where a static-defeating material (e.g., sheet) is aligned atop of the snap plate, and the plurality of snap plate holes and the plurality of material holes are aligned. In certain embodiments, the apparatus further comprises a base rack, having a top and a height substantially equal to or longer than the length of the plurality of pipette tips, wherein the snap plate is configured to attach to the top of the base rack. Certain embodiments are directed in part to an assembly or apparatus for which the number of pipette tips in the plurality of pipette tips equals the number of material holes in the plurality of material holes, and the number of snap plate holes in the plurality of snap plate holes. In some embodiments the pipette tips and the static defeating material adhere to each other by an adhesive substance.

Figure 139:
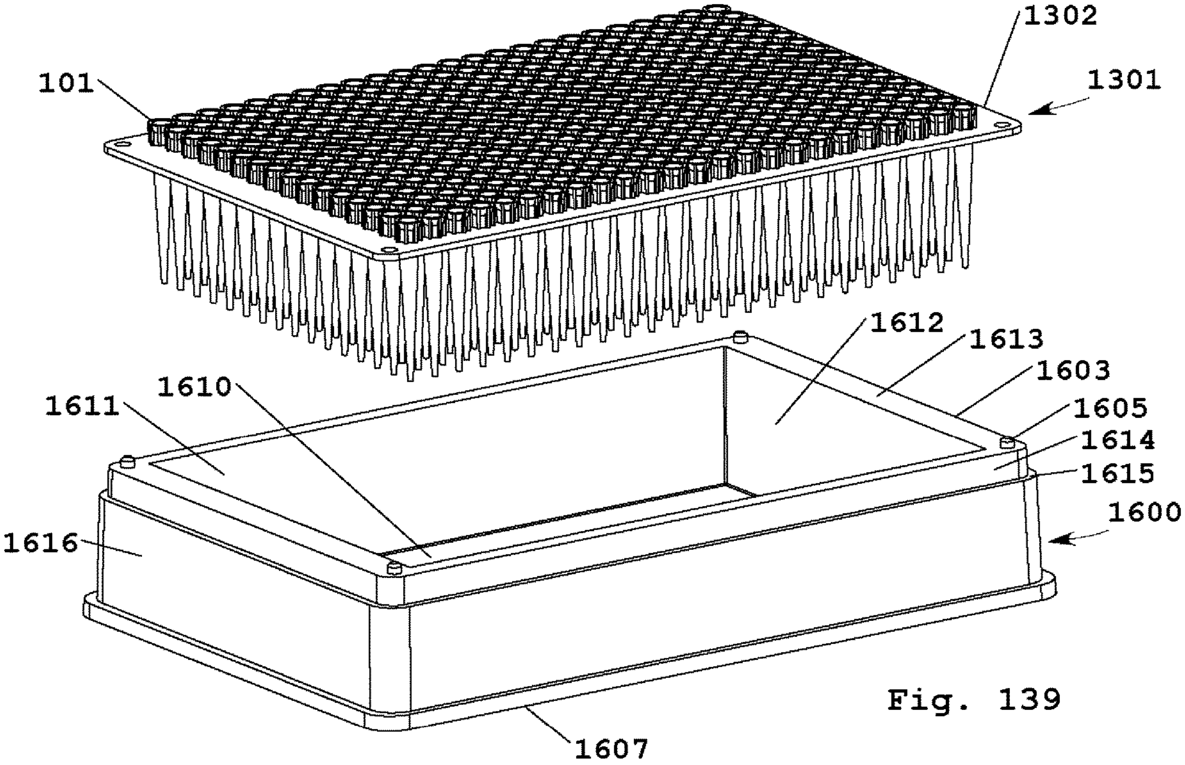
FIG. 139 shows an exploded view of the assembly shown in FIG. 138.

A non-limiting example of an assembly that includes a sheet, a pipette tip tray and an array of pipette tips is shown by way of an exploded view in FIG. 2, and in use in FIG. 3 to FIG. 6. Shown in FIG. 2 is snap plate 102', which has a preset amount of holes for a desired amount of pipette tips 101', that is attached to a rack base 103', which is of sufficient height to accommodate the length of the pipette tips 101'. The static-defeating material 100' is placed atop the snap plate 102' such that the holes on the material 100' and the snap plate 102' align. The static-defeating material 100' has the same number of holes/openings as the number of pipette tips 101'. A non-limiting example of an assembly that includes a sheet, a pipette tip tray and array of pipette tips also is shown by way of example in FIG. 68 to FIG. 77 (i.e., assembly 900). Assembly 900, shown without an optional lid, includes a tray containing a rack base 203 and snap plate 102, pipette tip retention sheet 100 and pipette tips 101. Assembly 900 also is shown in an exploded view in FIG. 70 with tray 104 that contains the snap plate 102 and rack base 103, sheet 100 and pipette tip array 105 that includes a plurality of pipette tips 101. Assembly 900 also is shown in cross section views (i.e., FIG. 72 and FIG. 73), which illustrate various features shown in FIG. 68 to FIG. 71 and various features of pipette tips described herein. Other views of assembly 900 are shown in FIG. 74 to FIG. 77, which illustrate features described herein, and rack base footing 107. In certain assembly embodiments, tray 104 can accommodate and can include a sheet/pipette tip array assembly shown in FIG. 49 and FIG. 51, or variant thereof, instead of a sheet/pipette tip array assembly shown in FIG. 36 and FIG. 38. In certain embodiments, pipette tip tray assembly 1400 is provided as shown in FIG. 138 and FIG. 139. Sub-assembly 1301 in assembly 1400 includes pipette tip retention sheet 1302 that is thicker than sheet 100 in assembly 900 shown in FIG. 68. Pipette tip retention sheet 1302 in assembly 1400 can serve as a pipette tip receptacle plate when joined to tray rack 1403, and pipette tip retention sheet 1302, with an array of pipette tips (e.g., assembly 1301) or without an array of pipette tips, sometimes is provided as part of a pipette tip system. Pipette tip retention sheet 1302 includes an alignment member hole 1304 that aligns with an alignment member pin 1405 disposed on rack base 1403. Any suitable alignment members and alignment member arrangement can be utilized to align a sheet with a rack base or a sheet with a pipette tip receptacle plate.

Sheet and Assembly Manufacturing Processes

A sheet described herein can be manufactured by any suitable process. In certain manufacturing processes, a solid and continuous sheet is provided and holes are introduced to the sheet. In some embodiments, a process comprises (a) providing a sheet material having no holes, and (b) introducing holes in the sheet. Holes can be introduced to a sheet by any suitable process, non-limiting examples of which include die cutting, laser cutting, roto-cutting and drilling.

A sheet sometimes is molded in certain types of manufacturing processes. Any suitable molding process can be utilized, non-limiting examples of which include injection molding, thermoforming (e.g., vacuum molding), blow molding, compression molding, extrusion molding, laminating, reaction injection molding, matrix molding, rotational molding (or rotomolding), spin casting and transfer molding. In some embodiments, a manufacturing process includes (a) providing a mold comprising structures configured to form the holes of the sheet; (b) introducing a moldable polymer to the mold; (c) curing the polymer in the mold, thereby producing the sheet; and (d) removing the sheet from the mold.

A sheet assembly comprising a sheet and an array of pipette tips retained in holes of the sheet can be manufactured by any suitable process. In certain embodiments, a manufacturing process includes inserting the distal region of pipette tips into holes of the sheet, such that an edge of each hole contacts an exterior surface of the distal region of each of the pipette tips. Individual pipette tips can be pressed into holes of a sheet by hand, by machine, or by other pressing mechanism.

A sheet assembly comprising a sheet and an array of pipette tips in association with holes of the sheet and joined to a second surface of the sheet can be manufactured by any suitable process. In some embodiments, a manufacturing process includes joining the proximal terminus (e.g., flange portion) of each of the pipette tips to a region surrounding each of the holes on the second surface of the sheet. The region that surrounds each of the holes sometimes comprises an adhesive, and sometimes the region surrounding each of the holes is welded (e.g., welded sonically) to the proximal terminus of each of the pipette tips.

Adhesion between the sheet and the pipette tips can be modulated. For example, friction and/or adhesion can be enhanced between a sheet member and a pipette tip by introducing texture and or structures to the sheet member (e.g., hole edges, annular portions around holes) and/or a pipette tip surface (e.g., exterior wall surface, flange). Also, fraction can be enhanced between a sheet member and a pipette tip by including small grooves or ridges on the pipette tip. Alternately, adhesion between the material and the pipette tips can be accomplished using an adhesive substance instead of compression. Non-limiting examples of adhesive substances include rubber cements, contact adhesives, contact cements, contact glues, super glues, spray glues, acrylic cements, weld-on cements, wood glues, craft glues, fabric glues, polyurethane, or other adhesive materials.

For embodiments in which an assembly includes a sheet, a tray and an array of pipette tips, manufacturing an assembly sometimes includes positioning the sheet onto the top surface of a snap plate of a tray in an orientation in which the holes of the sheet are aligned with holes of the snap plate, inserting the pipette tips into the holes in the snap plate and the sheet, and pressing the tips into the sheet such that the pipette tips adhere to and are retained by holes in the sheet. In certain embodiments, pipette tips are retained by a sheet in a sheet/tip assembly, and the sheet/tip assembly is loaded onto a tray.

Use of Sheets and Sheet Assemblies

Sheets and assemblies described herein can be utilized in a variety of manners. A sheet or assembly of sheets can be provided without pipette tips and may be utilized to generate assemblies that retain at least one array of pipette tips. An array of pipette tips sometimes includes 96 pipette tips, 384 pipette tips or 1536 pipette tips. A sheet or assembly of sheets sometimes is provided without pipette tips and a sheet from an assembly is placed in contact with a surface of a pipette tip receptacle plate (i.e., top surface) of a pipette tip tray, and then optionally loaded with an array of pipette tips. In certain embodiments, a sheet/tip assembly is provided and loaded into a tray. A sheet containing a retained array of pipette tips, or an assembly containing multiples thereof, can be provided and utilized as a pipette tip reload component. A pipette tip reload component sometimes is utilized with or without a tray component.

As described herein, a pipette tip retention sheet can function as a pipette tip receptacle plate. A sub-assembly comprising a sheet and a pipette tip array can be placed in association with a tray for manipulation by a fluid handling device (e.g., pipetting device). Such a sub-assembly sometimes is separated from an assembly comprising multiple sub-assemblies, where the sub-assemblies sometimes are nested (e.g., horizontally nested or vertically nested). A fluid handling device can engage pipette tips in a sub-assembly, which comprises a sheet and an array of pipette tips, where the sub-assembly is associated with a rack in a tray, separate the sub-assembly from the tray, draw fluid into and dispense fluid from the pipette tips, and eject the sub-assembly from the device.

Certain embodiments are directed in part to methods for dispensing fluid, that include: (a) engaging nozzles of a pipette tip fluid dispensing device comprising multiple nozzles with pipette tips retained by a sheet, in an assembly, in a reload component, or in a tray, as described herein; and (b) dispensing fluid from pipette tips in engagement with the nozzles, where the pipette tips in engagement with nozzles are retained by the sheet. Nozzles of a pipette tip fluid dispensing device often are sealingly engaged with pipette tips retained by a sheet, and a device often includes the same number of nozzles as the number of pipette tips retained by one sheet (e.g., 96, 384 or 1536 nozzles/pipette tips). Pipette tips often are retained by a sheet at the time fluid is loaded and/or dispensed by the device. Certain methods include ejecting the pipette tips in engagement with the nozzles from the nozzles, where the pipette tips ejected from the nozzles are retained by the sheet. Any suitable pipette tip fluid dispensing device may be utilized, which can be a manually operated device or an automated device.

Some embodiments are directed to a method for using a static-defeating apparatus, that includes: (a) providing a (i) multipipettor having a plurality of pipettes, (ii) a plurality of pipette tips, each of the pipette tips having a length; and (iii) a static-defeating material having a plurality of material holes; where: the plurality of pipette tips are inserted through the plurality of material holes, and the pipette tips and the static-defeating material adhere to each other; (b) inserting the plurality of pipettes into the plurality of pipette tips, wherein the plurality of pipette tips fits snuggly onto the plurality of pipettes; (c) using the multipipettor; and (d) ejecting the plurality of pipette tips from the multipipettor along with the static defeating material, wherein the plurality of pipette tips and the static-defeating material fall together. Certain methods include providing a snap plate having a plurality of snap plate holes; wherein the material holes in the static-defeating material and the plurality of snap plate holes are aligned. Some embodiments include providing a base rack having a top and a height substantially equal to or longer than the length of the plurality of pipette tips; wherein the snap plate is attached to a top of the base rack. Inserting and ejecting sometimes are performed by a robot, and inserting and ejecting sometimes are performed manually by a human operator. The number of pipette tips in the plurality of pipette tips often equals the number of material holes in the plurality of material holes, and the number of snap plate holes in the plurality of snap plate holes.

The present device (i.e., sheet or sheet assembly) can be utilized in a static-defeating apparatus with a multiple pipette system. The apparatus can consist of four parts: a rack base, a snap plate, pipette tips and a static-defeating sheet/material. The rack base can be of sufficient height to admit a standard pipette tip, and can have a length and width sufficient to support an array of pipette tips having the requisite number of tips (for example 96, 384, and 1536 tips are standard numbers for pipette tip arrays). The top of the rack can support a snap plate, into which the pipette tips are loaded. The snap plate can have as many holes as are required to complete the array of pipette tips needed (typically the same amount of snap plate holes as pipette tips). On top of the snap plate can be placed the sheet of static-defeating material. The sheet often has a matching amount of holes as the snap plate.

The apparatus can act as follows: a static-defeating sheet can be laid across the snap plate, which is mounted on the rack, such that the holes of the static-defeating sheet are aligned with the holes on the snap plate. A pipette tip can be loaded into each individual hole, and pressure can be applied such that the static-defeating sheet adheres to the pipette tip. Thus, when a pipette tip fluid dispensing device attaches the pipette tips to its pipettes or nozzles and lifts the pipette tips away from the rack, the snap plate can stay in place, but the static-defeating sheet can also be lifted off of the snap plate with the pipette tips, connecting the array of pipette tips together. Thus, when the pipette tip fluid dispensing device ejects the pipette tips, the combined weight of the pipette tips, caused by joining the array of pipette tips by the static-defeating sheet, can be sufficient to overcome any static force that might be generated by the operation of the pipette tip fluid dispensing device.

Reference will now be made in detail to the certain method of use embodiments, examples of which are illustrated in the accompanying drawings. FIG. 3 shows a first step of a static-defeating apparatus in use, according to an embodiment. A multipipettor 150, which can have as many pipettes 151 as pipette tips 101', can be the primary operating mechanism. The multipipettor 150 can be operated through a robotic mechanism, or manually. The multipipettor, with the pipettes 151 facing downward, can be lowered to the pipette tips 101' embedded in the static-defeating material 100' and loaded in the rack 103'.

FIG. 4 shows a second step of a static-defeating apparatus in use, according to an embodiment. The multipipettor 150 has an arm which is lowered such that the pipettes 151 are be embedded into the pipette tips 101' connected to the static-defeating material 100'. The pipettes 151 can have a slightly lesser diameter than the pipette tips 101', such that the pipettes 151 can fit within the pipette tips 101' when embedded, but can still fit tightly together.

FIG. 5 shows a third step of a static-defeating apparatus in use, according to an embodiment. The arm of the multipipettor 150 can be lifted away from the base rack 103', drawing the pipettes 151 with attached pipette tips 101' and static-defeating material 100' upwards. The base rack 103' with snap plate 102' can remain in place. The pipette tips 101' can become completely separate from the snap plate 102' before the base rack 103' is removed and the multipipettor begins its operation. The static defeating material 100' remains attached to the pipette tips 101'.

At this point, the multipipettor is ready to function. A multipipettor is utilized by using the pipettes to draw predetermined amounts of liquid into their respective pipette tips. This liquid can be transported and dispensed into a secondary receptacle, which, in the case of a multipipettor, is usually a multichannel array used for performing experiments. The drawing and dispensing of liquid can be performed multiple times using the same pipette tips, but in most experimentation, the pipette tips must be replaced before a new liquid is drawn and dispensed.

FIG. 6 shows a fourth step of a static-defeating apparatus in use, according to an embodiment. After the multipipettor 150 has finished with its operation necessitating the present set of pipette tips 101', the multipipettor 150 can eject the set of pipette tips 101' from the pipettes 151, for example into a waste receptacle (not shown). The ejection can be performed robotically, by ejection arms (not shown) located on each pipette that push the pipette downward and off the pipette, or manually, where a human operator physically removes the pipette tips by hand. All of the pipette tips 101' and the static defeating material 100' will fall and remain together (as a unit). As the pipette tips 101' can be connected as a unit by their adhesion to the static-defeating material 100', the combined weight of the pipette tips can ensure that no single pipette tip is left dangling or otherwise attached to the multipipettor 150. The pipette tips 101', along with the static-defeating material 100', can be discarded, and the entire four steps can be repeated with a new assembly of pipette tips 101', rack 103', static defeating material 100' and snap plate 102'.

EXAMPLES

The examples set forth below illustrate certain embodiments and do not limit the technology.

A1. A static-defeating apparatus, comprising:

a plurality of pipette tips, each having a length;

a static-defeating material, having a plurality of material holes; wherein:

the plurality of pipette tips are inserted through the plurality of material holes, and the pipette tips and the static-defeating material adhere to each other.

A2. The apparatus of embodiment A1, comprising a snap plate having a plurality of snap plate holes, wherein:

the static-defeating material is aligned atop of the snap plate, and the plurality of snap plate holes and the plurality of material holes are aligned.

A3. The apparatus of embodiment A2, further comprising a base rack, having a top and a height substantially equal to or longer than the length of the plurality of pipette tips, wherein the snap plate is configured to attach to the top of the base rack.

A4. The apparatus of embodiment A2, wherein the number of pipette tips in the plurality of pipette tips equals:

the number of material holes in the plurality of material holes, and the number of snap plate holes in the plurality of snap plate holes.

A5. The apparatus of embodiment A1, wherein the pipette tips and the static defeating material adhere to each other by an adhesive substance.

A6. A method for using a static-defeating apparatus, comprising:

(a) providing a (i) multipipettor having a plurality of pipettes, (ii) a plurality of pipette tips, each of the pipette tips having a length; and (iii) a static-defeating material having a plurality of material holes; wherein:

the plurality of pipette tips are inserted through the plurality of material holes, and the pipette tips and the static-defeating material adhere to each other;

(b) inserting the plurality of pipettes into the plurality of pipette tips, wherein the plurality of pipette tips fits snuggly onto the plurality of pipettes;

(c) using the multipipettor; and (d) ejecting the plurality of pipette tips from the multipipettor along with the static defeating material, wherein the plurality of pipette tips and the static-defeating material fall together.

A7. The method of embodiment A6, wherein (a) comprises providing a snap plate having a plurality of snap plate holes; wherein the material holes in the static-defeating material and the plurality of snap plate holes are aligned.

A8. The method of embodiment A7, wherein (a) comprises providing a base rack having a top and a height substantially equal to or longer than the length of the plurality of pipette tips; wherein the snap plate is attached to a top of the base rack.

A9. The method of any one of embodiments A6 to A8, wherein the inserting and ejecting is performed by a robot.

A10. The method of any one of embodiments A6 to A9, wherein the inserting, ejecting is performed manually by a human operator.

A11. The method of any one of embodiments A7 to A10, wherein the number of pipette tips in the plurality of pipette tips equals:

the number of material holes in the plurality of material holes, and the number of snap plate holes in the plurality of snap plate holes.

B1. A sheet configured to retain an array of pipette tips, comprising a first surface, a second surface and an array of holes, each of which pipette tips in the array of pipette tips comprises an exterior surface, an interior surface, a proximal region, a distal region, a proximal opening and a distal opening;

each of which holes in the array of holes in the sheet has a diameter or an effective diameter; and the diameter or the effective diameter is equal to, or substantially equal to, (i) an outer diameter of the pipette tip exterior surface, and/or (ii) the pipette tip proximal opening diameter.

B2. The sheet of embodiment B1, wherein the diameter or the effective diameter of each of the holes is substantially equal to (i) an outer diameter of the pipette tip exterior surface, and/or (ii) the pipette tip proximal opening diameter.

B3. The sheet of embodiment B1 or B2, wherein each of the holes comprises an edge.

B4. The sheet of embodiment B3, wherein the edge is configured to contact a portion of the pipette tip exterior surface.

B5. The sheet of embodiment B4, wherein the edge, or portion thereof, is configured to contact the pipette tip exterior surface by a friction fit.

B5.1. The sheet of embodiment B4, wherein the edge, or portion thereof, is configured to contact the pipette tip exterior surface by an interference fit.

B6. The sheet of embodiment B1 or B2, wherein a portion around each of the holes on the second surface of the sheet is configured to contact the proximal region terminus of each pipette tip.

B7. The sheet of embodiment B3 or B6, wherein the portion around each of the holes on the second surface or the edge of each of the holes comprises an adhesive.

B8. The sheet of any one of embodiments B1 to B7, wherein each of the holes comprises a center and the sheet is configured to retain the pipette tips with the proximal openings of the pipette tips concentric with the centers of the holes.

B9. The sheet of any one of embodiments B1 to B8, wherein the diameter or the effective diameter of each of the holes is equal to or less than (i) an outer diameter of the pipette tip exterior surface, and/or (ii) the pipette tip proximal opening diameter.

B10. The sheet of embodiment B9, wherein the difference between (a) the diameter or the effective diameter of each of the holes, and (b) the (i) an outer diameter of the pipette tip exterior surface, and/or (ii) the pipette tip proximal opening diameter, is about 0.01 inches or less.

B11. The sheet of embodiment B1 to B3 and B6, wherein the diameter or the effective diameter of each of the holes is greater than (i) an outer diameter of the pipette tip exterior surface, and/or (ii) the pipette tip proximal opening diameter.

B12. The sheet of embodiment B11, wherein the difference between (a) the diameter or the effective diameter of each of the holes, and (b) the (i) an outer diameter of the pipette tip exterior surface, and/or (ii) the pipette tip proximal opening diameter, is about 0.01 inches or less.

B13. The sheet of embodiment B10 or B12, wherein the difference between (a) and (b) is about 0.007 inches or less.

B14. The sheet of embodiment B13, wherein the difference between (a) and (b) is about 0.005 inches or less.

B15. The sheet of embodiment B14, wherein the difference between (a) and (b) is about 0.003 inches or less.

B16. The sheet of embodiment B15, wherein the difference between (a) and (b) is about 0.001 inches or less.

B17. The sheet of any one of embodiments B1 to B16, wherein each of the holes is configured to retain a pipette tip inserted in the hole.

B17.1. The sheet of embodiment B17, wherein each hole includes a hole edge, and the entirety of the edge or a portion of the edge of each hole is configured to contact the outer diameter of a pipette tip.

B17.2. The sheet of embodiment B17 or B17.1, wherein each hole includes a hole edge, and each hole is configured to retain a pipette tip by friction between each hole edge, or portion thereof, and its contact zone counterpart on the exterior surface of a pipette tip.

B17.3. The sheet of embodiment B17.2, wherein the hole edge or portion thereof is configured to retain a pipette tip by an interference fit.

B17.4. The sheet of embodiment B17.2 or B17.3, wherein the friction between the hole edge, or portion thereof, and the exterior surface of a pipette tip is greater than the force of gravity exerted on a pipette tip when the first surface of the sheet is oriented downwards towards the ground and parallel to the ground.

B17.5. The sheet of any one of embodiments B17 to B17.4, wherein the diameter or the effective diameter of each of the holes (X) is less than or equal to the outer diameter of the pipette tip exterior surface (Y) the hole is configured to contact via a hole edge or portion thereof.

B17.6. The sheet of embodiment B17.5, wherein the difference by subtraction between X and Y is about 0.01 inches or less, wherein the difference by subtraction between X and Y is determined when pipette tips are not engaged in holes of the sheet.

B17.7. The sheet of embodiment B17.6, wherein the difference by subtraction between X and Y is about 0.005 inches or less.

B17.8. The sheet of embodiment B17.6, wherein the difference by subtraction between X and Y is about 0.001 inches or less.

B17.9. The sheet of embodiment B17.6, wherein the difference by subtraction between X and Y is about 0.0005 inches or less.

B17.10. The sheet of embodiment B17.6, wherein the difference by subtraction between X and Y is about 0.0001 inches or less.

B17.11. The sheet of any one of embodiments B17 to B17.10, wherein the holes in the sheet are configured to engage pipette tips whereby distal rib edge termini of ribs on each of the pipette tips are in contact with a first surface of the sheet.

B18. The sheet of any one of embodiments B1 to B17.11, wherein the distance between the center of each hole to an adjacent hole is uniform.

B18. The sheet of embodiment B17, wherein the center-to-center distance between each hole to an adjacent hole is about 0.05 inches or greater.

B19. The sheet of embodiment B18, wherein the center-to-center distance between each hole to an adjacent hole is about 0.05 inches to about 0.20 inches.

B20. The sheet of embodiment B19, wherein the center-to-center distance between each hole to an adjacent hole is about 0.10 inches to about 0.14 inches.

B21. The sheet of embodiment B20, wherein the center-to-center distance between each hole to an adjacent hole is about 0.12 inches.

B22. The sheet of any one of embodiments B1 to B21, wherein all of the holes, or holes in a subset of the holes, are circular.

B23. The sheet of any one of embodiments B1 to B21, wherein all of the holes, or holes in a subset of the holes, are not circular.

B24. The sheet of embodiment B23, wherein all of the holes, or holes in a subset of the holes, are oval, quadrilateral, square, rectangular, trapezoid, rhomboid, parallelogram, triangular, star, polygon, pentagon and/or hexagon.

B25. The sheet of embodiment B24, wherein the quadrilateral, square, rectangular, trapezoid, rhomboid, parallelogram, triangular, star, polygon, pentagon and hexagon holes comprise linear and/or curved sides, and comprise pointed and/or curved edges.

B26. The sheet of any one of embodiments B1 to B25, which comprises portions of the first surface or the second surface, or the first surface and the second surface, of reduced thickness.

B27. The sheet of embodiment B26, wherein each of the portions comprises a center, the centers of each of four quadrilaterally arranged holes in the array of holes define a cross point, and the centers of the portions coincide with the cross points.

B28. The sheet of embodiment B26 or B27, wherein the portions are circular, oval, quadrilateral, square, rectangular, trapezoid, rhomboid, parallelogram, triangular, star, X-shaped, Y-shaped, Z-shaped, C-shaped, S-shaped, sigmoidal, polygon, pentagon and/or hexagon.

B29. The sheet of embodiment B24, wherein the quadrilateral, square, rectangular, trapezoid, rhomboid, parallelogram, triangular, star, X-shaped, Y-shaped, Z-shaped, polygon, pentagon and hexagon portions comprise linear and/or curved sides, and comprise pointed and/or curved edges.

B30. The sheet of any one of embodiments B1 to B24, which comprises voids.

B30.1. The sheet of embodiment B30, wherein the sheet is netted.

B30.2. The sheet of embodiment B30, wherein the sheet is webbed.

B31. The sheet of embodiment B30, wherein each of the voids comprises a center, the centers of each of four quadrilaterally arranged holes in the array of holes define a cross point, and the centers of the voids coincide with the cross points.

B32. The sheet of embodiment B30 or B31, wherein the voids are circular, oval, quadrilateral, square, rectangular, trapezoid, rhomboid, parallelogram, triangular, star, X-shaped, Y-shaped, Z-shaped, C-shaped, S-shaped, sigmoidal, polygon, pentagon and/or hexagon.

B33. The sheet of embodiment B32, wherein the quadrilateral, square, rectangular, trapezoid, rhomboid, parallelogram, triangular, star, X-shaped, Y-shaped, Z-shaped, polygon, pentagon and hexagon voids comprise linear and/or curved sides, and comprise pointed and/or curved edges.

B34. The sheet of any one of embodiments B1 to B33, wherein the thickness at one or more holes of the sheet is about 0.0001 inches to about 0.25 inches.

B34.1. The sheet of embodiment B34, wherein the sheet comprises a uniform thickness or substantially uniform thickness.

B35. The sheet of any one of embodiments B1 to B34.1, wherein the sheet is flexible.

B36. The sheet of any one of embodiments B1 to B35, wherein the sheet comprises a polymer.

B37. The sheet of embodiment B36, wherein the sheet comprises one or more materials chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC), polyethylene, a metal and aluminum.

C1. The sheet of any one of embodiments B1 to B37, comprising an array of retained pipette tips.

C2. The sheet of embodiment C1, wherein all of the holes in the sheet are in association with pipette tips.

C3. The sheet of embodiment C1 or C2, wherein the pipette tips are reversibly retained in the holes of the sheet.

C4. The sheet of any one of embodiments C1 to C3, wherein:

each of the holes comprise a hole edge, and the hole edge, or portion thereof, of holes in the sheet is in engagement with an exterior surface of each of the pipette tips.

C5. The sheet of embodiment C4, wherein the hole edge, or portion thereof, retains each pipette tip by friction with a contact zone on the exterior surface of each pipette tip.

C6. The sheet of embodiment C5, wherein the hole edge, or portion thereof, is configured to retain a pipette tip by an interference fit.

C7. The sheet of embodiment C5 or C6, wherein the friction between the hole edge, or portion thereof, and the exterior surface of the pipette tip is greater than the force of gravity exerted on the pipette tip when the first surface of the sheet is oriented downwards towards the ground and parallel to the ground.

C8. The sheet of any one of embodiments C4 to C7, wherein the diameter or the effective diameter of each of the holes (X) is less than or equal to the outer diameter of the pipette tip exterior surface (Y) in contact with the hole edge, or portion thereof.

C9. The sheet of embodiment C8, wherein the difference by subtraction between X and Y is about 0.01 inches or less, wherein the difference by subtraction between X and Y is determined when pipette tips are not engaged in holes of the sheet.

C10. The sheet of embodiment C9, wherein the difference by subtraction between X and Y is about 0.005 inches or less.

C11. The sheet of embodiment C9, wherein the difference by subtraction between X and Y is about 0.001 inches or less.

C12. The sheet of embodiment C9, wherein the difference by subtraction between X and Y is about 0.0005 inches or less.

C13. The sheet of embodiment C9, wherein the difference by subtraction between X and Y is about 0.0001 inches or less.

C14. The sheet of any one of embodiments C4 to C13, wherein the holes in the sheet are configured to engage pipette tips whereby distal rib edge termini of ribs on each of the pipette tips are in contact with a first surface of the sheet.

C15. The sheet of any one of embodiments C1 to C3, wherein portions around the holes on the second surface are joined to the proximal terminus of the pipette tips.

D1. An assembly comprising two or more sheets of any one of embodiments B1 to B37 and C1 to C15.

D2. The assembly of embodiment D1, wherein each sheet comprises a shorter edge and a longer edge.

D3. The assembly of embodiment D2, wherein the two or more sheets are joined at the shorter edge or the longer edge.

D4. The assembly of embodiment D2, wherein the two or more sheets are joined at the shorter edge and the longer edge.

D5. The assembly of any one of embodiments D1 to D4, wherein the assembly is arranged in a coil.

D6. The assembly of any one of embodiments D1 to D4, wherein the assembly is arranged in a stacked arrangement.

D7. The assembly of embodiment D6, wherein one edge of each sheet is joined to an edge of another sheet in the stacked arrangement.

D8. The assembly of embodiment D6, wherein none of the edges of the sheets are joined in the stacked arrangement.

D9. The assembly of embodiment D1, D2 or D8, comprising two or more sheets of any one of embodiments C1 to C15.

D10. The assembly of embodiment D9, comprising two or more sheets of any one of embodiments C1 to C14.

D11. The assembly of embodiment D10, wherein:
- the assembly comprises a first sheet and a second sheet oriented distal to the first sheet,
- the first sheet retains a first array of pipette tips and the second sheet retains a second array of pipette tips, and
- the first array or pipette tips are inserted in the second array of pipette tips.

D12. The assembly of embodiment D10, wherein:
- the assembly comprises a first sheet and a second sheet oriented distal to the first sheet,
- the first sheet retains a first array of pipette tips and the second sheet retains a second array of pipette tips, and
- pipette tips in the first array or pipette tips are offset horizontally with respect to pipette tips in the second array of pipette tips.

D13. The assembly of embodiment D12, wherein the second surface of the first sheet opposes the second surface of the second sheet.

D14. The assembly of embodiment D12, wherein the second surface of the first sheet opposes the first surface of the second sheet.

D15. The assembly of any one of embodiments D12 to D14, wherein the distal terminus of each of the pipette tips in the first array of pipette tips contacts the first surface or the second surface of the second sheet.

D16. The assembly of embodiment D15, wherein the distal terminus of each of the pipette tips in the first array of pipette tips contacts the first surface of the second sheet.

D17. The assembly of embodiment D15, wherein the distal terminus of each of the pipette tips in the first array of pipette tips contacts the second surface of the second sheet.

D18. The assembly of embodiment D17, wherein the distal terminus of pipette tips in the second array of pipette tips contacts the second surface of the first sheet.

D19. The assembly of any one of embodiments D12 to D18, wherein an edge of the first sheet is offset from a corresponding edge of the second sheet.

D20. The assembly of any one of embodiments D12 to D18, wherein corresponding edges of sheets are contiguous and not offset.

D21. The assembly of any one of embodiments D12 to D20, wherein the number of holes in each sheet is greater than the number of pipette tips retained in each sheet.

D22. The assembly of embodiment D21, wherein each sheet in the assembly has the same geometry, is in the same orientation and is spaced vertically.

D23. The assembly of embodiment D21 or D22, wherein:
- pipette tips in the first array are retained in a first set of holes in the first sheet,
- pipette tips in the second array are retained in a second set of holes in the second sheet, and
- holes in the first set of holes are in different locations than holes in the second set of holes.

D24. The assembly of embodiment D23, wherein:
- the first sheet includes a third set of holes and the second sheet includes a fourth set of holes,
- the third set of holes and the fourth set of holes do not retain pipette tips,
- the fourth set of holes are located directly below the first set of holes, and
- the distal region of pipette tips retained in the first set of holes extend through the fourth set of holes.

D25. The assembly of embodiment D24, wherein the diameter or effective diameter of each of the holes in the first sheet and the second sheet are equal.

D26. The assembly of any one of embodiments D23 to D25, wherein
- the first set of holes and the second set of holes are arranged in adjacent rows of each sheet, and
- each of the first sheet and the second sheet retain pipette tips in alternating rows.

D27. The assembly of any one of embodiments D19 to D26, wherein
- the second surface of the first sheet opposes the first surface of the second sheet, and
- the first sheet is proximal to the second sheet.

D28. The assembly of any one of embodiments D12 to D20, wherein sheets in the assembly include one or more different hole-to-edge offset distances.

D29. The assembly of embodiment D28, wherein the hole-to-edge offset distance is the shortest distance between the outer perimeter of a hole and the nearest edge of a sheet.

D30. The assembly of embodiment D28 or D29, wherein:
- the hole diameters or effective diameters are the equal in a sheet,
- the holes in terminal rows parallel to each side of a sheet are aligned, and
- the offset distance to a first side of a sheet for the holes in the terminal rows parallel to the first side of the sheet are different than the offset distance to a second side of the sheet for the holes in the terminal rows parallel to the second side of the sheet, wherein the first side and the second side are opposing and are parallel.

D31. The assembly of embodiment D30, wherein:
- the hole diameters or effective diameters are the equal in a sheet,
- the holes in terminal rows parallel to a short side of a sheet are aligned, and
- the offset distances to the short side of a sheet for the holes in the terminal rows parallel to the short side of the sheet are the same or differ from one another.

D32. The assembly of embodiment D30, wherein:
- the hole diameters or effective diameters are the equal in a sheet,
- the holes in terminal rows parallel to a long side of a sheet are aligned, and
- the offset distances to the long side of a sheet for the holes in the terminal rows parallel to the long side of the sheet are the same or differ from one another.

D33. The assembly of any one of embodiments D28 to D32, wherein the first sheet is rotationally oriented 180 degrees in a horizontal plane with respect to the second sheet.

D34. The assembly of any one of embodiments D28 to D33, wherein the distal terminus of each of the pipette tips in the first array contacts the first surface of the second sheet.

D35. The assembly of any one of embodiments D1 to D34, which comprises a container, wherein the two or more sheets are contained within the container.

D36. A pipette tip reload component comprising a sheet of any one of embodiments C1 to C15 or an assembly of any one of embodiments D1 to D35.

E1. A pipette tip tray comprising a rack, a pipette tip receptacle plate affixed to the rack, and a sheet of any one of embodiments B1 to B37 in association with a surface of the pipette tip receptacle plate.

E2. The pipette tip tray of embodiment E1, which comprises a lid.

E3. The pipette tip tray of embodiment E1 or E2, wherein:

the pipette tip receptacle plate comprises holes, and the holes of the sheet are concentric with the holes of the pipette tip receptacle plate.

E4. The pipette tip tray of any one of embodiments E1 to E3, which comprises two or more sheets.

E5. A pipette tip tray comprising a rack, a pipette tip receptacle plate affixed to the rack, and a sheet of any one of embodiments C1 to C15 in association with a surface of the pipette tip receptacle plate.

E6. The pipette tip tray of embodiment E5, which comprises a lid.

E7. The pipette tip tray of embodiment E5 or E6, wherein:

the pipette tip receptacle plate comprises holes, and the holes of the sheet are concentric with the holes of the pipette tip receptacle plate.

E8. The pipette tip tray of any one of embodiments E5 to E7, which comprises two or more sheets.

E9. A pipette tip tray comprising a rack and a sheet in association with the rack, wherein:

the sheet functions as a pipette tip receptacle plate, and the sheet is a sheet of any one of embodiments B1 to B37, a sheet of any one of embodiments C1 to C15, a sheet from an assembly of any one of embodiments D1 to D35 comprising or not comprising retained pipette tips, or a sheet from a reload component of embodiment D36 comprising or not comprising retained pipette tips.

E10. The pipette tip tray of embodiment E9, comprising a lid.

E11. The pipette tip tray of embodiment E9 or E10, wherein the sheet is reversibly associated with the tray.

E12. The pipette tip tray of any one of embodiments E9 to E11, wherein the sheet is not adhered to the rack and is not irreversibly connected to the rack.

E13. The pipette tip tray of embodiment E11 or E12, wherein the sheet is associated with the rack under the force of gravity.

E14. The pipette tip tray of any one of embodiments E9 to E13, wherein the sheet is of substantially uniform thickness.

E15. The pipette tip tray of any one of embodiments E9 to E14, wherein the thickness of the sheet is about 0.01 inches to about 0.25 inches.

E16. The pipette tip tray of embodiment E15, wherein the thickness of the sheet is about 0.01 inches to about 0.1 inches.

E17. The pipette tip tray of embodiment E15, wherein the thickness of the sheet is about 0.03 inches to about 0.7 inches.

E18. The pipette tip tray of embodiment E15, wherein the thickness of the sheet is about 0.04 inches to about 0.06 inches.

E19. The pipette tip tray of any one of embodiments E9 to E18, wherein the second surface of the sheet is in reversible contact with a proximal surface of the rack.

E20. The pipette tip tray of any one of embodiments E9 to E19, wherein the sheet includes one or more first alignment members and the rack includes one or more second alignment member counterparts to the first alignment members.

F1. A method for dispensing a fluid, comprising:

(a) engaging nozzles of a pipette tip fluid dispensing device with pipette tips retained by a sheet of any one of embodiments C1 to C15, in an assembly of any one of embodiments D1 to D35, a reload component of embodiment D36, or in a tray of any one of embodiments E1 to E20; and (b) dispensing fluid from pipette tips in engagement with the nozzles, wherein the pipette tips in engagement with nozzles are retained by the sheet.

F2. The method of embodiment F1, which comprises ejecting the pipette tips in engagement with the nozzles from the nozzles, wherein the pipette tips ejected from the nozzles are retained by the sheet.

F3. The method of embodiment F1 or F2, wherein the pipette tip dispensing device is a manual device.

F4. The method of embodiment F1 or F2, wherein the pipette tip dispensing device is an automated device.

G1. A method for manufacturing a sheet of any one of embodiments B1 to B37, comprising:

(a) providing a sheet material having no holes, and (b) introducing the holes in the sheet.

G2. The method of embodiment G1, wherein the holes are introduced to the sheet by a process chosen from die cutting, laser cutting, roto-cutting and drilling.

G3. A method for manufacturing a sheet of any one of embodiments B1 to B37, comprising:

(a) providing a mold comprising structures configured to mold the holes of the sheet;

(b) introducing a moldable polymer to the mold;

(c) curing the polymer in the mold, thereby producing the sheet; and (d) removing the sheet from the mold.

G4. A method for manufacturing a sheet of any one of embodiments C1 to C15, comprising inserting the distal region of pipette tips into holes of the sheet.

G5. The method of embodiment G4, wherein an edge of each hole contacts an exterior surface of the distal region of each of the pipette tips.

G6. A method for manufacturing a sheet of any one of embodiments C1 to C15, comprising joining the proximal terminus of each of the pipette tips to a region surrounding each of the holes on the second surface of the sheet.

G7. The method of embodiment G6, wherein the region surround each of the holes comprises an adhesive.

G8. The method of embodiment G7, wherein the adhesive is chosen from liquid rivet, ultraviolet light activated adhesive, heat activated adhesive, rubber cement, contact glue, super glue, spray glue, acrylic cement, weld-on cement, wood glue, craft glue, fabric glue and polyurethane adhesive.

G9. The method of embodiment G6, wherein the proximal terminus of each of the pipette tips is welded to the region surrounding each of the holes.

G10. The method of embodiment G6, wherein the proximal terminus of each of the pipette tips is welded sonically to the region surrounding each of the holes.

H1. An assembly comprising a sheet that includes a first surface and a second surface and an array of pipette tips joined to second surface of the sheet, wherein:

each of the pipette tips in the array of pipette tips comprises an exterior surface, an interior surface, a proximal region, a proximal region terminus, a distal region, a proximal opening and a distal opening;

the proximal region terminus of each pipette tip is joined to the second surface of the sheet; and the sheet includes no holes in association with the pipette tips.

H2. The assembly of embodiment H1, wherein a portion on the second surface of the sheet at which each pipette tip is joined comprises an adhesive.

H3. The assembly of embodiment H1 or H2, wherein the distance between the center of each pipette tip proximal opening to an adjacent pipette tip proximal opening is uniform.

H4. The assembly of embodiment H3, wherein the center-to-center distance between each pipette tip proximal opening to an adjacent pipette tip proximal opening is about 0.05 inches or greater.

H5. The assembly of embodiment H4, wherein the center-to-center distance between each pipette tip proximal opening to an adjacent pipette tip proximal opening is about 0.05 inches to about 0.20 inches.

H6. The assembly of embodiment H5, wherein the center-to-center distance between each pipette tip proximal opening to an adjacent pipette tip proximal opening is about 0.10 inches to about 0.14 inches.

H7. The assembly of embodiment H6, wherein the center-to-center distance between each pipette tip proximal opening to an adjacent pipette tip proximal opening is about 0.12 inches.

H8. The assembly of any one of embodiments H1 to H7, wherein the sheet comprises portions of the first surface or the second surface, or the first surface and the second surface, of reduced thickness.

H9. The assembly of embodiment H8, wherein each of the portions comprises a center, the centers of each of four quadrilaterally arranged pipette tip proximal openings define a cross point, and the centers of the portions coincide with the cross points.

H10. The assembly of embodiment H8 or H9, wherein the portions are circular, oval, quadrilateral, square, rectangular, trapezoid, rhomboid, parallelogram, triangular, star, X-shaped, Y-shaped, Z-shaped, C-shaped, S-shaped, sigmoidal, polygon, pentagon and/or hexagon.

H11. The assembly of embodiment H10, wherein the quadrilateral, square, rectangular, trapezoid, rhomboid, parallelogram, triangular, star, X-shaped, Y-shaped, Z-shaped, polygon, pentagon and hexagon portions comprise linear and/or curved sides, and comprise pointed and/or curved edges.

H12. The assembly of any one of embodiments H8 to H11, wherein the portions of reduced thickness are in association with the pipette tip proximal openings.

H13. The assembly of any one of embodiments H1 to H12, which comprises voids.

H14. The assembly of embodiment H13, wherein the sheet is netted.

H15. The assembly of embodiment H13, wherein the sheet is webbed.

H16. The assembly of any one of embodiments H13 to H15, wherein each of the voids comprises a center, the centers of each of quadrilaterally arranged pipette tip proximal openings define a cross point, and the centers of the voids coincide with the cross points.

H17. The assembly of any one of embodiments H13 to H16, wherein the voids are circular, oval, quadrilateral, square, rectangular, trapezoid, rhomboid, parallelogram, triangular, star, X-shaped, Y-shaped, Z-shaped, C-shaped, S-shaped, sigmoidal, polygon, pentagon and/or hexagon.

H18. The assembly of embodiment H17, wherein the quadrilateral, square, rectangular, trapezoid, rhomboid, parallelogram, triangular, star, X-shaped, Y-shaped, Z-shaped, polygon, pentagon and hexagon voids comprise linear and/or curved sides, and comprise pointed and/or curved edges.

H19. The assembly of any one of embodiments H1 to H18, wherein the sheet comprises a uniform thickness or substantially uniform thickness of about 0.001 inches to about 0.02 inches.

H20. The assembly of any one of embodiments H1 to H19, wherein the sheet is flexible.

H21. The assembly of any one of embodiments H1 to H20, wherein the sheet comprises a polymer.

H22. The assembly of embodiment H21, wherein the sheet comprises one or more materials chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE).

H23. The assembly of any one of embodiments H1 to H22, wherein the sheet comprises a metal.

H24. The assembly of embodiment H23, wherein the metal is aluminum.

H25. The assembly of any one of embodiments H1 to H24, wherein the sheet comprises a foil.

H26. The assembly of embodiment H25, wherein the sheet comprises aluminum foil.

H27. The assembly of any one of embodiments H1 to H26, which comprises multiple sheets.

H28. The assembly of embodiment H27, wherein each sheet comprises a shorter edge and a longer edge.

H29. The assembly of embodiment H28, wherein the two or more sheets are joined at the shorter edge or the longer edge.

H30. The assembly of embodiment H28, wherein the two or more sheets are joined at the shorter edge and the longer edge.

H31. The assembly of any one of embodiments H27 to H30, wherein the assembly is arranged in a coil.

H32. The assembly of any one of embodiments H27 to H31, wherein the assembly is arranged in a stacked arrangement.

H33. The assembly of embodiment H32, wherein one edge of each sheet is joined to an edge of another sheet in the stacked arrangement.

H34. The assembly of embodiment H32, wherein none of the edges of the sheets are joined in the stacked arrangement.

H35. The assembly of embodiment H32 or H34, wherein pipette tips associated with one sheet are vertically nested with respect to pipette tips associated with another sheet in the assembly.

H36. The assembly of embodiment H35, wherein pipette tips associated with one sheet are nested in pipette tips associated with another sheet in the assembly.

H37. The assembly of embodiment H32 or H34, wherein pipette tips associated with one sheet are horizontally nested with respect to pipette tips associated with another sheet in the assembly.

H38. The assembly of embodiment H37, wherein pipette tips associated with one sheet are nested side-by-side with pipette tips associated with another sheet in the assembly.

H39. The assembly of embodiment H37 or H38, wherein:

the assembly comprises a first sheet and a second sheet oriented distal to the first sheet, the first sheet retains a first array of pipette tips and the second sheet retains a second array of pipette tips, and pipette tips in the first array or pipette tips are offset horizontally with respect to pipette tips in the second array of pipette tips.

H40. The assembly of embodiment H39, wherein the second surface of the first sheet opposes the second surface of the second sheet.

H41. The assembly of embodiment H39, wherein the second surface of the first sheet opposes the first surface of the second sheet.

H42. The assembly of any one of embodiments H39 to H41, wherein the distal terminus of each of the pipette tips in the first array of pipette tips contacts the first surface or the second surface of the second sheet.

H43. The assembly of embodiment H42, wherein the distal terminus of each of the pipette tips in the first array of pipette tips contacts the first surface of the second sheet.

H44. The assembly of embodiment H42, wherein the distal terminus of each of the pipette tips in the first array of pipette tips contacts the second surface of the second sheet.

H45. The assembly of embodiment H44, wherein the distal terminus of pipette tips in the second array of pipette tips contacts the second surface of the first sheet.

H46. The assembly of any one of embodiments H39 to H45, wherein an edge of the first sheet is offset from a corresponding edge of the second sheet.

H47. The assembly of any one of embodiments H39 to H46, wherein corresponding edges of sheets are contiguous and not offset.

H48. The assembly of any one of embodiments H39 to H47, wherein the number of holes in each sheet is greater than the number of pipette tips retained in each sheet.

H49. The assembly of embodiment H48, wherein each sheet in the assembly has the same geometry, is in the same orientation and is spaced vertically.

H50. The assembly of embodiment H48 or H49, wherein:
- pipette tips in the first array are retained in a first set of holes in the first sheet,
- pipette tips in the second array are retained in a second set of holes in the second sheet, and
- holes in the first set of holes are in different locations than holes in the second set of holes.

H51. The assembly of embodiment H50, wherein:
- the first sheet includes a third set of holes and the second sheet includes a fourth set of holes,
- the third set of holes and the fourth set of holes do not retain pipette tips,
- the fourth set of holes are located directly below the first set of holes, and
- the distal region of pipette tips retained in the first set of holes extend through the fourth set of holes.

H52. The assembly of embodiment H51, wherein the diameter or effective diameter of each of the holes in the first sheet and the second sheet are equal.

H53. The assembly of any one of embodiments H50 to H52, wherein
- the first set of holes and the second set of holes are arranged in adjacent rows of each sheet, and
- each of the first sheet and the second sheet retain pipette tips in alternating rows.

H54. The assembly of any one of embodiments H48 to H53, wherein
- the second surface of the first sheet opposes the first surface of the second sheet, and
- the first sheet is proximal to the second sheet.

H55. The assembly of any one of embodiments H39 to H54, wherein sheets in the assembly include one or more different hole-to-edge offset distances for vertically oriented terminal rows of holes and for horizontally oriented terminal rows of holes.

H56. The assembly of embodiment H55, wherein the hole-to-edge offset distance is the shortest distance between the outer perimeter of a hole and the nearest edge of a sheet.

H57. The assembly of embodiment H55 or H56, wherein:
- the hole diameters or effective diameters are the equal in a sheet,
- the holes in terminal rows parallel to a short side of a sheet are parallel, and
- the offset distance to a first side of a sheet for the holes in the terminal rows parallel to the first side of the sheet are different than the offset distance to a second side of the sheet for the holes in the terminal rows parallel to the second side of the sheet, wherein the first side and the second side are opposing and are parallel.

H58. The assembly of embodiment H57, wherein:
- the hole diameters or effective diameters are the equal in a sheet,
- the holes in terminal rows parallel to a short side of a sheet are parallel, and
- the offset distances to the short side of a sheet for the holes in the terminal rows parallel to the short side of the sheet are the same or differ from one another.

H59. The assembly of embodiment H57, wherein:
- the hole diameters or effective diameters are the equal in a sheet,
- the holes in terminal rows parallel to a long side of a sheet are parallel, and
- the offset distances to the long side of a sheet for the holes in the terminal rows parallel to the long side of the sheet are the same or differ from one another.

H60. The assembly of any one of embodiments H55 to H59, wherein the first sheet is rotationally oriented 180 degrees in a horizontal plane with respect to the second sheet.

H61. The assembly of any one of embodiments H55 to H60, wherein the distal terminus of each of the pipette tips in the first array contacts the first surface of the second sheet.

H62. The assembly of any one of embodiments H1 to H61, which comprises a container, wherein the two or more sheets are contained within the container.

H63. The assembly of any one of embodiments H1 to H62, which is a pipette tip reload component.

H64. An assembly comprising a pipette tip tray, which tray comprises a rack and a pipette tip receptacle plate in association with the rack, and an assembly of any one of embodiments H1 to H63, wherein a proximal region of pipette tips in the assembly are in association with a proximal surface of the pipette tip receptacle plate.

H65. The assembly of embodiment H65, which comprises a lid.

H66. The assembly of embodiment H64 or H65, which comprises two or more sheets.

H67. The assembly of any one of embodiments H64 to H66, wherein the assembly of any one of embodiments H1 to H63 is in reversible association with the tray.

I1. A method for manufacturing an assembly that includes a sheet and an array of pipette tips, comprising: piercing a sheet comprising a first surface and a second surface with pipette tips, wherein:
- the sheet includes no holes at locations pierced by the pipette tips,
- the proximal region of the pipette tips are proximal of the first surface, and the distal region of the pipette tips are distal of the second surface, thereby generating an assembly in which the sheet retains the pipette tips.

I2. A method for manufacturing an assembly, comprising:

providing a sheet comprising a first surface and a second surface, and joining the proximal terminus of pipette tips in an array of pipette tips to the second surface of the sheet, wherein the sheet includes no holes in association with the proximal opening of the pipette tips.

I3. The method of embodiment I1 or I2, wherein the sheet comprises a foil.

I4. The method of embodiment I3, wherein the sheet comprises an aluminum foil.

I5. The method of any one of embodiments I2 to I4, wherein the sheet comprises an adhesive on the second surface.

I6. The method of embodiment I5, wherein the adhesive is a contact adhesive.

J1. A method for dispensing a fluid, comprising:

(a) engaging nozzles of a pipette tip fluid dispensing device with pipette tips retained in an assembly of any one of embodiments H1 to H67, wherein the nozzles pierce the sheet in the assembly; and (b) dispensing fluid from pipette tips in engagement with the nozzles, wherein the pipette tips in engagement with nozzles are retained by the sheet.

J2. The method of embodiment J1, which comprises ejecting the pipette tips in engagement with the nozzles from the nozzles, wherein the pipette tips ejected from the nozzles are retained by the sheet.

J3. The method of embodiment J1 or J2, wherein the pipette tip dispensing device is a manual device.

J4. The method of embodiment J1 or J2, wherein the pipette tip dispensing device is an automated device.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A method for dispensing a liquid, said method comprising:

engaging a plurality of nozzles of a dispensing device with a corresponding array of pipette tips, wherein each of the pipette tips in the array of pipette tips is adhered to a flexible sheet defining an array of holes, and wherein each of the pipette tips in the array of pipette tips is located, in part, within a corresponding hole of the array of holes in the flexible sheet; and drawing liquid into, and dispensing liquid from, the pipette tips in the array of pipette tips while the pipette tips in the array of pipette tips are in engagement with the plurality of nozzles;

wherein the pipette tips in the array of pipette tips are sufficiently adhered to the flexible sheet when drawing the liquid into, and dispensing the liquid from, the pipette tips in the array of pipette tips to remain adhered to the flexible sheet upon certain flexion of the flexible sheet.

2. The method of claim 1, further comprising:

Ejecting the pipette tips in the array of pipette tips from the plurality of nozzles after dispensing the liquid from the pipette tips in the array of pipette tips, wherein the pipette tips in the array of pipette tips ejected from the plurality of nozzles remain adhered to the flexible sheet upon the ejection of the array of pipette tips from the plurality of nozzles.

3. The method of claim 1, wherein:

the flexible sheet comprises a first surface and a second surface opposing the first surface;

the holes of the array of holes are through holes which extend through and between the first surface and the second surface; and each of the pipette tips in the array of pipette tips comprises an exterior surface, an interior surface, a first end, a first end terminus, a second end distal to the first end, a first end opening, and a second end opening distal to the first end opening.

4. The method of claim 3, wherein:

the first end opening of each of the pipette tips of the array of pipette tips is concentric with a center of the corresponding hole of the array of holes of the flexible sheet.

5. The method of claim 4, wherein:

a portion of the second surface of the flexible sheet circumscribes and at least partially defines each of the holes is in contact with the first end terminus of each corresponding pipette tip of the array of pipette tips.

6. The method of claim 3, wherein:

each of the holes of the array of holes in the flexible sheet comprises a hole edge and has a diameter or an effective diameter;

the hole edge, or portion of the hole edge, of each of the holes of the array of holes in the flexible sheet is in engagement with at least a portion of the exterior surface of a corresponding pipette tip in the array of pipette tips;

the diameter or effective diameter of each of the holes of the array of holes is less than an outer diameter of the exterior surface of the corresponding pipette tip with which the hole of the array of holes is engaged; and the hole edge of each of the holes of the array of holes provides an interference fit with the corresponding pipette tip of the array of pipette tips.

7. The method of claim 6, wherein:

a difference between (a) the diameter or the effective diameter of each hole in the array of holes in the flexible sheet, and (b) a first opening diameter of each pipette tip in the array of pipette tips, is 0.01 inches or less.

8. The pipette tip tray of claim 7, wherein:

the difference is 0.003 inches or less.

9. The pipette tip tray of claim 8, wherein:

the difference is 0.001 inches or less.

10. The method of claim 1, wherein:

the certain flexion of the flexible sheet includes a non-zero amount up to at least one inch of vertical deflection of a first edge of the flexible sheet from a second, opposing edge of the flexible sheet.

11. The pipette tip tray of claim 10, wherein:

the flexible sheet comprises a thickness at a portion of the flexible sheet defining one of the array of holes, and the thickness is 0.0001 inches to 0.25 inches.

12. The pipette tip tray of claim 11, wherein:

the thickness of the flexible sheet is a uniform thickness.

* * * * *